(12) United States Patent
Nozaki et al.

(10) Patent No.: US 9,970,092 B2
(45) Date of Patent: May 15, 2018

(54) GALVANIZED STEEL SHEET AND METHOD OF MANUFACTURING THE SAME

(71) Applicant: NIPPON STEEL & SUMITOMO METAL CORPORATION, Tokyo (JP)

(72) Inventors: Takayuki Nozaki, Tokyo (JP); Manabu Takahashi, Tokyo (JP); Nobuhiro Fujita, Tokyo (JP); Masafumi Azuma, Tokyo (JP); Chisato Wakabayashi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 650 days.

(21) Appl. No.: 14/347,120

(22) PCT Filed: Sep. 28, 2012

(86) PCT No.: PCT/JP2012/075244
§ 371 (c)(1),
(2) Date: Mar. 25, 2014

(87) PCT Pub. No.: WO2013/047836
PCT Pub. Date: Apr. 4, 2013

(65) Prior Publication Data
US 2014/0234658 A1 Aug. 21, 2014

(30) Foreign Application Priority Data
Sep. 30, 2011 (JP) .................. 2011-217811

(51) Int. Cl.
*B32B 15/01* (2006.01)
*C22C 33/00* (2006.01)
(Continued)

(52) U.S. Cl.
CPC .............. *C23C 2/02* (2013.01); *B32B 15/013* (2013.01); *C21D 8/0205* (2013.01);
(Continued)

(58) Field of Classification Search
CPC .. B32B 15/01; C21D 9/46; C21D 9/48; C23C 2/06
(Continued)

(56) References Cited

U.S. PATENT DOCUMENTS

2004/0202889 A1* 10/2004 Fujita ...................... C23C 2/02
428/659
2007/0095444 A1 5/2007 Nonaka et al.
(Continued)

FOREIGN PATENT DOCUMENTS

| CN | 101035921 A | 9/2007 |
| CN | 102149840 A | 8/2011 |

(Continued)

OTHER PUBLICATIONS

Extended European Search Report for European Application No. 12836743.0, dated Sep. 22, 2015.
(Continued)

*Primary Examiner* — David Sample
*Assistant Examiner* — Xiaobei Wang
(74) *Attorney, Agent, or Firm* — Birch, Stewart, Kolasch & Birch, LLP

(57) ABSTRACT

A galvanized steel sheet includes a steel sheet and a plating layer on the surface of the steel sheet, in which the steel sheet includes, as a steel chemical composition, by mass %, C: 0.05 to 0.40%, Si: 0.5 to 3.0% and Mn: 1.5 to 3.0%, a microstructure of the steel sheet includes ferrite, bainite, by volume fraction, 30% or more of a tempered martensite, and 8% or more of an austenite, and tensile strength of the steel sheet is 980 MPa or more, and the plating layer includes an oxide including at least one chemical element selected from Si, Mn and Al, and when seen at a cross section including the steel sheet and the plating layer in a plate thickness direction, a projection area fraction of the oxide is 10% or more.

20 Claims, 3 Drawing Sheets

(51) Int. Cl.

| | |
|---|---|
| *C21D 9/46* | (2006.01) |
| *C23C 2/06* | (2006.01) |
| *C23C 2/02* | (2006.01) |
| *C23C 2/28* | (2006.01) |
| *C23C 2/40* | (2006.01) |
| *C22C 38/06* | (2006.01) |
| *C21D 8/02* | (2006.01) |
| *C21D 9/48* | (2006.01) |
| *C22C 38/00* | (2006.01) |
| *C22C 38/02* | (2006.01) |
| *C22C 38/04* | (2006.01) |
| *C22C 18/00* | (2006.01) |
| *C22C 18/02* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/38* | (2006.01) |

(52) U.S. Cl.
CPC ............ *C21D 8/0263* (2013.01); *C21D 9/46* (2013.01); *C21D 9/48* (2013.01); *C22C 18/00* (2013.01); *C22C 18/02* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01); *Y10T 428/12799* (2015.01)

(58) Field of Classification Search
USPC .......................................................... 428/659
See application file for complete search history.

(56) References Cited

U.S. PATENT DOCUMENTS

| | | | | |
|---|---|---|---|---|
| 2008/0000555 | A1* | 1/2008 | Nonaka | B21B 3/02 |
| | | | | 148/328 |
| 2009/0214892 | A1 | 8/2009 | Kawamura et al. | |
| 2010/0282374 | A1* | 11/2010 | Mataigne | C23C 2/28 |
| | | | | 148/533 |
| 2011/0008546 | A1 | 1/2011 | Suzuki et al. | |
| 2011/0076512 | A1* | 3/2011 | Yamamoto | C21C 7/0006 |
| | | | | 428/639 |
| 2011/0146852 | A1 | 6/2011 | Matsuda et al. | |
| 2011/0315279 | A1 | 12/2011 | Kaneko et al. | |
| 2012/0118438 | A1* | 5/2012 | Nakagaito | C21D 8/0226 |
| | | | | 148/533 |
| 2012/0222781 | A1 | 9/2012 | Azuma et al. | |

FOREIGN PATENT DOCUMENTS

| | | |
|---|---|---|
| EP | 1980638 A1 | 10/2008 |
| EP | 2246456 A1 | 11/2010 |
| EP | 1482006 B1 | 5/2011 |
| JP | 59-219473 A | 12/1984 |
| JP | 11-293383 A | 10/1999 |
| JP | 2001-234281 A | 8/2001 |
| JP | 2002-18531 A | 1/2002 |
| JP | 2007-231373 A | 9/2007 |
| JP | 2007-270176 * | 10/2007 |
| JP | 2007-270176 A | 10/2007 |
| JP | 2008-24980 A | 2/2008 |
| JP | 2010-209392 A | 9/2010 |
| JP | 2011-111673 A | 6/2011 |
| JP | 2011-117040 * | 6/2011 |
| JP | 4949536 B2 | 6/2012 |
| RU | 2322518 C2 | 4/2008 |
| RU | 2418090 C2 | 5/2011 |
| TW | 200932948 A | 8/2009 |
| WO | WO 2010/103936 A1 | 9/2010 |
| WO | WO 2011/065591 A1 | 6/2011 |

OTHER PUBLICATIONS

Russian Notice of Allowance for Russian Application No. 2014117661/02, dated Sep. 11, 2015, with an English translation.
Korean Office Action, dated May 28, 2015, for Korean Application No. 10-2014-7008474, with an English translation.
Taiwanese Notice of Allowance dated Apr. 3, 2014, issued in Taiwanese Patent Application No. 101136122.
Chinese Office Action and Search Report, dated Apr. 1, 2015, for Chinese Application No. 201280047117.4, along with a partial English translation of the Chinese Search Report.
Advances in Delayed Fracture Solution, The Iron and Steel Institute of Japan, Jan. 1997, 25 pages With English Translation.
Hayashi et al., "Evaluation of Hydrogen Embrittlement Susceptibility for High Strength Sheet Steel", Materia, vol. 44, No. 3 (2005), pp. 254-256, with English Translation.
Office Action issued in JP 2013-513432, dated Jun. 18, 2013, With English translation.
PCT/ISA/210—International Search Report dated Dec. 25, 2012, issued in PCT/JP2012/075244, with English Translation.
Yamazaki et al., "Effect of Microstructure on Formability and Delayed Cracking of Super High Strength Cold Rolled Steel Sheet", CAMP-ISIJ, vol. 5, No. 6, pp. 1839 to 1842, (Oct. 1992), Published by, The Iron and Steel Institute of Japan, with English Translation.

* cited by examiner $A(\%) = \{1-(l_1+l_2+l_3)/L\} \times 100$

GALVANIZED STEEL SHEET AND METHOD OF MANUFACTURING THE SAME

TECHNICAL FIELD

The present invention relates to a galvanized steel sheet which has tensile strength (TS) of 980 MPa or more and is excellent in delayed fracture resistance, plating adhesion, elongation, and hole expansibility. The galvanized steel sheet according to the present invention is particularly suitable for structural members, reinforcing members, and suspension members for automobiles. Here, the galvanized steel sheet (zinc coated steel sheet) according to the present invention can be divided into a hot-dip galvanized steel sheet (galvanized steel sheet) and a galvannealed steel sheet.

Priority is claimed on Japanese Patent Application No. 2011-217811, filed on Sep. 30, 2011, and the content of which is incorporated herein by reference.

BACKGROUND ART

In members such as cross members and side members for automobiles, a weight reduction has been investigated to respond to a recent trend toward a reduction in fuel consumption, and it has been attempted to increase the strength of a steel sheet from the viewpoint of ensuring the strength and collision safety of automobiles even when a thinner steel sheet is used for the members. However, since increasing the strength of the steel sheet leads to a deterioration of the formability of materials, in order to realize the weight reduction of the members, it is necessary to manufacture a steel sheet which satisfies both press formability and high strength.

Particularly, when the steel sheet is formed as structural members or reinforcing members for automobiles which have a complex shape, the steel sheet having excellent ductility is required. In recent years, a steel sheet having a tensile strength of 440 MPa class or 590 MPa class has been mainly used for frameworks of automobiles, and development of a steel sheet having a tensile strength of 980 MPa or more is desired in the future to achieve a further weight reduction.

When a steel sheet of 590 MPa class is replaced with a steel sheet of 980 MPa class, the same elongation as the elongation of the steel sheet of 590 MPa class is required in the steel sheet of 980 MPa class. Thus, development of a steel sheet which has a tensile strength of 980 MPa or more and has excellent elongation is desired.

As a steel sheet excellent in total elongation (El) in a tensile test, there is a multi-phase structure steel sheet which has a microstructure in which residual austenite as a secondary phase is dispersed in soft ferrite that is a primary phase. In the multi-phase structure steel sheet, the ductility is ensured by the ferrite and the strength is ensured by the martensitic transformation of the residual austenite, and the residual austenite is transformed into martensite at plastic working. There is a steel, which is applied the transformation, such as a transformation induced plasticity (TRIP) steel and the applications of the TRIP steel have been expanded in recent years.

Since the TRIP steel has a particularly excellent elongation compared to precipitation strengthened steel and dual phase (DP) steel (steel is consisting of ferrite and martensite), the applications of the TRIP steel is strongly desired to be expanded. Although the TRIP steel shows excellent strength and ductility, the TRIP steel has a feature of low hole expansibility in general.

Further, in order to promote a weight reduction of an automobile body in the future, a usable strength level of a high strength steel sheet should be increased as compared with that of conventional one. For example, in order to use the high strength steel sheet for a hard-to-form member such as a suspension part, formability such as hole expansibility should be improved.

In addition, when a steel sheet of 980 MPa or more is applied to the member for an automobile, in addition to properties of strength and workability, delayed fracture resistance is required. The delayed fracture is caused by stress applied to steel or hydrogen brittleness and is a phenomenon in which a structure is fractured by accumulating diffused hydrogen in a stress concentration area of the steel used as the structure.

Specifically, examples of the delayed fracture include a suddenly fractured phenomenon that a member, such as a prestressed concrete (PC) steel wire or a bolt, is suffered high stress load under the usage condition.

It is known that delayed fracture is closely related to the hydrogen which penetrates into the steel from the environment. As the hydrogen which penetrates into the steel from the environment, there are various types of hydrogen sources such as hydrogen which is contained in the atmosphere, hydrogen generated in a corrosive environment. When the hydrogen penetrates into the steel from any of the hydrogen sources, the hydrogen may induce the delayed fracture.

For this reason, as the usage environment of the steel, an environment in absence of hydrogen is desired. However, when a steel is applied to the structure or the automobile, the steel is used outdoors and the penetration of hydrogen cannot be avoided.

As the stress which acts on the steel used as the structure, a stress which is loaded on the structure and a residual stress, that some of stress generated at the forming remains inside of the steel, are included. Particularly, in the steel used as a member after forming such as a thin steel sheet for an automobile or the like, the residual stress is a significant problem compared to a thick steel plate or a steel bar (for example, a bolt) that is a product used as is with being applied no deformation. Accordingly, when a steel sheet that the delayed fracture is a problem is formed, it is desirable to form a steel sheet such that the residual stress does not remain.

For example, in Patent Document 1, there is disclosed a hot press forming method of a metal plate of which strength is increased by heating a steel sheet at a high temperature and by processing the steel sheet and then by quenching the steel sheet using a die. In this hot press forming method of a metal plate, since the steel sheet is processed at a high temperature, residual stress is alleviated by recovering dislocation which causes the residual stress and which is introduced at the processing, or by causing transformation after the processing. Therefore, very little residual stress remains in a formed product. It is possible to improve the delayed fracture resistance of the steel sheet by strengthening the steel sheet using this method. However, in this method, since it is necessary to perform heating before the pressing, the energy cost and the facility cost are high compared to cold forming. In addition, since the formed product is directly quenched at a high temperature of 600° C. or higher, the properties of the steel sheet (for example, plating properties in a plated steel sheet) are easily changed and it is difficult to control properties other than the strength and the delayed fracture resistance.

In addition, since the residual stress is present on a cutting surface in machining such as cutting or punching, there is a concern of causing delayed fracture. Thus, when a high strength steel sheet having a tensile strength of 980 MPa or more is processed, the steel sheet is cut by a method using a laser or the like which is not accompanied by direct machining, and the generation of residual stress is avoided. However, the laser cutting costs more compared to shear cutting or punching.

Therefore, it is required that the delayed fracture resistance of the steel sheet is ensured not by the forming method but by the development of materials depending on the properties required.

In product categories of a steel bar, a steel rod, and a thick steel plate, a material capable of avoiding delayed fracture by improving hydrogen embrittlement resistance has been developed. For example, in Non-Patent Document 1, there is disclosed a high strength bolt having excellent hydrogen embrittlement resistance in which fine precipitates of elements such as Cr, Mo, V and the like, which exhibit temper softening resistance, are coherently precipitated in martensite. In the high strength bolt, the steel is quenched from austenite single phase at high temperature so as to obtain a martensite single phase microstructure, and then the above fine precipitates are coherently precipitated in the martensite by tempering.

In the high strength bolt, the hydrogen penetrated into the steel is inhibited from being diffused or being concentrated on an area as a starting point of delayed fracture where stress is concentrated by using the hydrogen penetrated into the steel being trapped around the fine precipitates such as VC and the like which are coherently precipitated in the martensite. Conventionally, steel having high strength and excellent in delayed fracture resistance has been developed by utilizing such fine precipitates in the steel.

In order to improve the delayed fracture resistance by utilizing the precipitates as hydrogen trap sites such as VC and the like, it is necessary to coherently precipitate the precipitates in the martensite structure.

However, several hours or more of heat treatment is necessary to precipitate the precipitates, and there is a problem in manufacturability. That is, in a steel sheet manufactured by using general manufacturing facilities for a thin steel sheet such as continuous annealing facilities or continuous hot dip galvanizing facilities, texture control is performed in a short period of time such as several tens of minutes at most. Thus, when the thin steel sheet is manufactured, it is difficult to improve delayed fracture resistance by the precipitates.

In addition, when precipitates that are precipitated in a hot rolling process are utilized, even if the above precipitates are precipitated in the hot rolling process, an orientation relationship between the precipitates and a base structure (ferrite and martensite) is lost due to recrystallization during the subsequent cold rolling and continuous annealing. That is, in this case, the precipitates are not coherent precipitates. As a result, the delayed fracture resistance of the obtained steel sheet is significantly deteriorated.

A high strength steel sheet in which there is concern of generation of delayed fracture usually has a microstructure mainly including martensite. Although the martensite can be formed in a low temperature region, the precipitates including VC as the hydrogen trap sites in the temperature region cannot be precipitated.

As a result, when the coherent precipitates such as VC are participated in the thin steel sheet in order to improve the delayed fracture resistance, it is necessary to precipitate the precipitates by additionally performing heat treatment after the microstructure of the steel is formed by using the continuous annealing facilities or the continuous hot dip galvanizing facilities. This process brings about a significant increase in manufacturing cost.

In addition, when the above heat treatment is additionally performed on the microstructure mainly including martensite, the martensite is drastically softened. As a result, it is difficult to utilize the coherent precipitates such as VC in order to improve the delayed fracture resistance of the high strength thin steel sheet.

Here, since the steel described in Non-Patent Document 1 is steel including 0.4% or more of C and a large amount of alloy elements, the workability and the weldability which are required for the thin steel sheet are deteriorated.

In Patent Document 2, there is disclosed a thick steel plate in which hydrogen defects are reduced by oxides mainly including Ti, and Mg. However, in the thick steel plate disclosed in Patent Document 2, only the hydrogen defects that are caused by hydrogen trapped in the steel at manufacturing are reduced, and thus, hydrogen brittleness resistance (delayed fracture resistance) is not considered. Further, both the high formability and hydrogen brittleness resistance, which are required for a thin steel sheet, are not considered at all.

Conventionally, in a thin steel sheet, (1) since the sheet thickness is thin, even when hydrogen penetrates into the thin steel sheet, the hydrogen is released to the outside in a short period of time. Further, (2) since workability is prioritized, a steel sheet having a tensile strength of 900 MPa or more has not been used before. For this reason, problems of delayed fracture have been small. However, since a demand for using the high strength steel sheet as a workpiece is rapidly increasing, the development of a high strength steel sheet having excellent hydrogen brittleness resistance has been required.

As described above, the technologies for improving the hydrogen brittleness resistance that are mostly related to steel such as bolts, steel bars, and plate steel have been developed. The steel is not almost subjected to forming and is often used at proof stress or yield stress or less. Therefore, in the related art, both of the workability required for automobile members, such as cuttability or member formability (press formability), and the hydrogen embrittlement resistance after processing are not considered.

In a member after forming, a stress that is referred to as a residual stress remains the inside of the member. Although the residual stress is present in the local, the residual stress has a high value exceeding the yield stress of material in some cases. For this reason, it is required that hydrogen embrittlement not generate in the thin steel sheet under high residual stress.

Regarding the hydrogen brittleness of the thin steel sheet, for example, Non-Patent Document 2 reports the aggravation of hydrogen brittleness due to strain induced transformation of residual austenite. In Non-Patent Document 2, a formation of thin steel sheet has been considered, but an amount of the residual austenite is significantly reduced by suppressing the concentration of C in the austenite so as not to cause deterioration in the hydrogen brittleness resistance.

In addition, in the technology described in Non-Patent Document 2, since the microstructure of the high strength thin steel sheet is limited to a very narrow range, only hydrogen brittleness which is generated in a relatively short period of time is evaluated. Thus, it is difficult to fundamentally solve the problem of hydrogen brittleness when the steel sheet is actually used in a member for an automobile.

Further, in the technology described in Non-Patent Document 2, the residual austenite cannot be actively utilized and the application of the steel sheet is limited.

As described above, when a large amount of residual austenite that easily occurs hydrogen brittleness is included in the steel sheet, it is very difficult to obtain a steel sheet which simultaneously demonstrates high corrosion resistance, high tensile strength, excellent delayed fracture resistance and high ductility.

CITATION LIST

Patent Literature

[Patent Document 1] Japanese Unexamined Patent Application, First Publication No. 2002-18531
[Patent Document 2] Japanese Unexamined Patent Application, First Publication No. H11-293383

Non-Patent Documents

[Non-Patent Document 1] "Advances in Delayed Fracture Solution" (the Iron and Steel Institute of Japan, January 1997)
[Non-Patent Document 2] CAMP-ISIJ, Vol. 5, No. 6, Pages 1839 to 1842, Yamazaki et al., October 1992, issued by the Iron and Steel Institute of Japan

SUMMARY OF INVENTION

Problems to be Solved by the Invention

An object of the present invention is to provide a galvanized steel sheet (including a hot-dip galvanized steel sheet and a galvannealed steel sheet) which has a tensile strength (TS) of 980 MPa or more and which has excellent delayed fracture resistance, excellent plating adhesion, high elongation and excellent hole expansibility.

Means for Solving the Problem

The inventors have been investigated. As a result, the inventors have found that when plating capable of improving delayed fracture resistance is performed as means for improving the delayed fracture resistance without influence on steel quality, the delayed fracture resistance of the steel is improved.

Specifically, when the hydrogen which penetrates from the environment is trapped with the oxide by dispersing an oxide including at least one chemical element selected from a group consisting of Si, Mn, and Al in a plating layer, it has been found that diffusion of hydrogen into a stress concentration area and delayed fracture caused by the diffusion of hydrogen into the stress concentration area can be delayed.

In addition, in order to achieve both tensile strength (TS) of 980 MPa or more and excellent formability, it has been found that it is important to form a tempered martensite with a volume fraction of 30% or more and a residual austenite with a volume fraction of 8% or more in a microstructure by fully utilizing Si which is a strengthening element.

That is, the present invention can provide a galvanized steel sheet which has tensile strength (TS) of 980 MPa or more and has excellent delayed fracture resistance, excellent plating adhesion, high elongation and excellent hole expansibility, and the gist of the invention is as follows.

(1) A galvanized steel sheet according to an aspect of the present invention includes: a steel sheet; and a plating layer on a surface of the steel sheet, in which the steel sheet includes, as a steel chemical composition, by mass %, C: 0.05 to 0.40%, Si: 0.5 to 3.0%, Mn: 1.5 to 3.0%, P: limited to 0.04% or less, S: limited to 0.01% or less, N: limited to 0.01% or less, Al: limited to 2.0% or less, O: limited to 0.01% or less, and a balance consisting of Fe and unavoidable impurities, a microstructure of the steel sheet includes a ferrite, a bainite, by volume fraction, 30% or more of a tempered martensite, 8% or more of an austenite, and limited to 10% or less of a pearlite, in which a total volume fraction of the tempered martensite and the bainite is 40% or more, and an area fraction of grains having a grain size of more than 35 μm occupied per unit area of the microstructure is 10% or less, and a tensile strength of the steel sheet is 980 MPa or more; and a plating metal in the plating layer includes, as a plating chemical composition, limited to 15 mass % or less of Fe, limited to 2 mass % or less of Al, and the balance consisting of Zn and unavoidable impurities, the plating layer includes an oxide including at least one chemical element selected from Si, Mn, and Al, and when seen at a cross section including the steel sheet and the plating layer in a thickness direction, a projection area fraction obtained by dividing a length in which the oxide is projected onto an interface between the plating layer and the steel sheet by a length of the interface between the plating layer and the steel sheet is 10% or more and a coverage of the plating layer to the steel sheet is 99% or more.

(2) In the galvanized steel sheet according to (1), the steel may further include, as the steel chemical composition, by mass %, at least one selected from: Mo: 0.01 to 1.0%, Cr: 0.05 to 1.0%, Ni: 0.05 to 1.0%, Cu: 0.05 to 1.0%, Nb: 0.005 to 0.3%, Ti: 0.005 to 0.3%, V: 0.005 to 0.5%, B: 0.0001 to 0.01%, and a total of at least one of elements selected from Ca, Mg, and REM: 0.0005 to 0.04%.

(3) In the galvanized steel sheet according to (1) or (2), the plating layer may be a hot dip galvanized layer.

(4) In the galvanized steel sheet according to (1) or (2), the plating layer may be a galvannealed layer.

(5) In the galvanized steel sheet according to any one of (1) to (3), an amount of Fe may be limited to less than 7 mass % in a plating chemical composition.

(6) In the galvanized steel sheet according to any one of (1) to (4), the plating chemical composition may include 7 mass % to 15 mass % of Fe.

(7) In the galvanized steel sheet according to any one of (1) to (6), the plating chemical composition may include more than 0 mass % and 2 mass % or less of Al.

(8) A method of manufacturing a galvanized steel sheet according to another aspect of the present invention, the method includes: a first process of casting a steel which includes, as a steel chemical composition, by mass %, C: 0.05 to 0.40%, Si: 0.5 to 3.0%, Mn: 1.5 to 3.0%, P: limited to 0.04% or less, S: limited to 0.01% or less, N: limited to 0.01% or less, Al: limited to 2.0% or less, O: limited to 0.01% or less, and a balance consisting of Fe and unavoidable impurities; a second process of heating the steel directly or after once cooled; a third process of hot-rolling the steel so that the hot rolling is completed at a temperature of an $Ar_3$ transformation point or higher; a fourth process of coiling the steel at 300° C. to 700° C.; a fifth process of pickling the steel; a sixth process of cold rolling the steel by a cold rolling mill having a work roll with a roll size of 1,400 mm or less with a cumulative rolling reduction of 30% or more and less than 100%; a seventh process of heating the steel and retaining the steel at 550° C. to 750° C. for 20 seconds or more; an eighth process of annealing the steel at 750° C. to 900° C.; a ninth process of cooling the steel to an intermediate cooling temperature in a temperature range of 500° C. or higher and lower than 750° C. at a first average cooling rate of 0.1° C./s to 30° C./s and cooling the steel from the intermediate cooling temperature to a cooling stop temperature of 100° C. or higher and lower than 350° C. at a second average cooling rate which is equal to or higher than the first average cooling rate; a tenth process of controlling a temperature of the steel within a temperature range of a temperature, which is lower than a plating bath temperature by 40° C., or higher and a temperature, which is higher than the plating bath temperature by 40° C., or lower; an eleventh process of galvanizing by immersing the steel into a hot dip galvanizing bath flowing at a flow rate of 10 m/min to 50 m/min; and a twelfth process of cooling the steel to a temperature of lower than 100° C.; wherein the second average cooling rate is 1° C./s to 100° C./s, and a time when the temperature of the steel is within a temperature range of 350° C. to 500° C. is 20 seconds or more in the processes after the ninth process.

(9) In the method of manufacturing a galvanized steel sheet according to (8), the steel may further include, as the steel chemical composition, by mass %, at least one selected from Mo: 0.01 to 1.0%, Cr: 0.05 to 1.0%, Ni: 0.05 to 1.0%, Cu: 0.05 to 1.0%, Nb: 0.005 to 0.3%, Ti: 0.005 to 0.3%, V: 0.005 to 0.5%, B: 0.0001 to 0.01%, and a total of at least one of elements selected from Ca, Mg, and REM: 0.0005 to 0.04%.

(10) In the method of manufacturing a galvanized steel sheet according to (8) or (9), in the ninth process, when the first average cooling rate is equal to the second average cooling rate, the first average cooling rate may be more than 1° C./s and 30° C./s or less.

(11) In the method of manufacturing a galvanized steel sheet according to any one of (8) to (10) may further include a process of reheating and holding the steel in the temperature range of 350° C. to 500° C. after the tenth process.

(12) The method of manufacturing a galvanized steel sheet according to any one of (8) to (11) may further include a process of heating the steel to 460° C. to 600° C. to perform alloy treatment after the twelfth process.

Effects of the Invention

According to the above aspects of the present invention, it is possible to provide the galvanized steel sheet (including a hot-dip galvanized steel sheet and a galvannealed steel sheet) which is suitable for structural members, reinforcing members, and suspension members for automobiles and which has a tensile strength of 980 MPa or more, excellent delayed fracture resistance, excellent plating adhesion, high elongation and excellent hole expansibility, at a low cost.

DESCRIPTION OF EMBODIMENTS

The inventors have been investigated so as to solve the above problems. As a result, the inventors have found that when an oxide which includes at least one of Si, Mn, and Al is dispersed in a plating layer, the oxide can be utilized as a hydrogen trap site and the delayed fracture resistance of a steel sheet (galvanized steel sheet) is improved. In addition, the inventors also have found that when the steel sheet is held at 550° C. to 750° C. during heating in annealing, and the oxide which includes at least one of Si, Mn, and Al is formed on the outermost layer of the steel sheet, it is possible to obtain a galvanized steel sheet having a plating layer that the oxide is dispersed by the subsequent plating or by the subsequent plating and alloy treatment.

Further, the inventors have found that when the oxide on the surface of the steel sheet is utilized, it is easy to control the oxide morphology such as the size or the number density of the oxide. As a method of dispersing the oxide in the plating layer, a method of plating a steel sheet with molten zinc (molten metal) including the oxide is possible, but it is difficult to use the method for the following reasons.

For example, even when the oxide is dispersed in the molten zinc, the oxide forms a cluster by Van der Waals force and grows into a large oxide having a size of several to several hundreds of μm. As a result, since the large oxide causes non-plating or flaws, it is not preferable to disperse the oxide in a plating bath. In addition, in order to increase plating adhesion, a clean surface is generally obtained by removing an oxide on the surface of the steel sheet before plating, and the oxide is not usually formed on the steel sheet before plating on purpose.

Generally, in the hot dip galvanizing bath, an oxide film of Zn or Al floats. Here, the oxide film of Zn or Al is called as scum and causes non-plating or alloying delay. The inventors have found that when the oxide is present on the surface of the steel sheet, it is easy that the scum adheres onto the steel sheet during immersion in the bath, and thus non-plating is easily generated.

In addition, the inventors have found a problem that the scum adhering onto the steel sheet causes not only non-plating, but also alloying delay. This problem becomes significant in a steel sheet which includes a large amount of Si and Mn. Although a detailed mechanism is not clear, it has been considered that the oxides of Si and Mn formed on the surface of the steel sheet react with or interact with the scum that is as an oxide, to promote non-plating or alloying delay.

The inventors have found that when the molten metal flows in the hot dip galvanizing bath, the reaction or the interaction between the oxides is suppressed so as to inhibit non-plating.

Hereinafter, a galvanized steel sheet according to an embodiment of the present invention will be described in detail.

Figure 3:
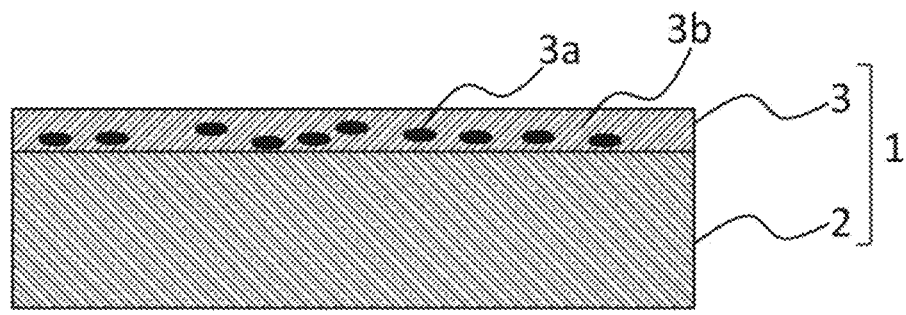
FIG. 3 is a vertical cross-sectional view schematically illustrating the galvanized steel sheet according to the embodiment.

The galvanized steel sheet 1 according to the embodiment (hereinafter, referred to as the "plated steel sheet 1") includes a steel sheet 2, and a plating layer 3 on a surface of the steel sheet 2, as shown in FIG. 3. Here, the plated steel sheet 1 may further include various coating layers such as an organic layer, an inorganic layer, and the like on the surface of the plating layer 3. When such a coating film layer is not formed on the plated steel sheet 1, the plated steel sheet 1 consists of the steel sheet 2 and the plating layer 3 on the surface of the steel sheet 2. In addition, the plating layer 3 is formed by solidification of molten metal, and the plating layer 3 may be hot-dip galvanized layer (galvanized layer) which is not subjected to an alloy treatment, or may be a galvannealed layer which is subjected to an alloy treatment.

First, the plating layer 3 will be described.

The plating layer 3 contains an oxide 3a including at least one chemical element selected from Si, Mn, and Al. It is most important to disperse such an oxide 3a in the plating layer 3. Particularly, when the oxide 3a is dispersed in a region of the plating layer 3 within 5 µm from an interface between the steel sheet 2 and the plating layer 3, a hydrogen trapping effect becomes remarkable.

Although a detailed mechanism is not clear, the oxide 3a includes large number of defects, and thus, the oxide 3a in the plating layer 3 traps hydrogen which penetrates from the surface of the plated steel sheet 1 (for example, hydrogen generated by corrosion reaction or hydrogen in the atmosphere), and the penetration of the hydrogen into the steel sheet 2 is delayed. As a result, it is considered that delayed fracture resistance is improved.

In addition, since a steel sheet for an automobile is used in an environment where a wet environment and a dry environment are repeated (a wet-dry environment), the hydrogen that is trapped by the oxide 3a (that is, the oxide 3a above the steel sheet 2) in the plating layer 3 in the wet environment is released to the atmosphere in the dry environment. Therefore, in an actual environment where an automobile is used, it is possible to continuously use a hydrogen trapping effect by the above oxide, and it is considered that the above plated steel sheet 1 exhibits a high effect due to delayed fracture resistance.

The effect is remarkably exhibited by dispersing the oxide 3a including at least one chemical element selected from Si, Mn, and Al in plating layer 3. Particularly, an oxide of Si, an oxide of Mn, an oxide of Al, and a composite oxide of at least two types of chemical elements selected from Si, Mn and Al have a high melting point compared to zinc and are easily dispersed in the plating layer 3 as oxides having a high hydrogen trapping effect.

The oxide 3a in the plating layer 3 is an oxide including one or a combination of Si, Mn, and Al (hereinafter, simply referred to as the oxide 3a in some cases). However, unavoidable impurities which are mixed in a steel during manufacturing (for example, unavoidable oxides including Zn and Al from the plating bath and unavoidable oxides including chemical elements (excluding Si, Mn, and Al) due to the chemical composition of the steel sheet 2) may be included in the oxide 3a.

Therefore, for example, the oxide 3a may include one of or a combination of Si, Mn, and Al (that is, include at least one thereof), and a balance consisting of O (oxygen) and unavoidable impurities.

Here, examples of the oxide 3a including one or a combination of Si, Mn, and Al include $SiO_2$, $MnO$, $Al_2O_3$, and $Mn_2SiO_4$, and the oxide 3a preferably includes $SiO_2$ or $Mn_2SiO_4$.

A projection area fraction of the oxide 3a that the oxide 3a is projected onto the surface of the steel sheet 2 is 10% or more. The projection area fraction is an apparent coverage of the oxide 3a that a shadow is formed on the surface of the steel sheet 2 when seen the steel sheet 2 from the upper side of the surface of the plated steel sheet 1. The larger the projection area fraction of the oxide 3a is, the more the hydrogen which penetrates from the surface of the plated steel sheet 1 can be trapped in the plating layer 3. Thus, it is preferable that the oxide 3a be present in the plating layer 3, and on a surface parallel to the surface of the steel sheet 2 as much as possible. Here, the projection area fraction is set to be 10% or more. The projection area fraction is preferably 15% or more and is more preferably 20% or more. In addition, the upper limit of the projection area fraction is not particularly limited and may be 100%. However, in order to improve plating adhesion or in order to increase alloying rate, the projection area fraction may be 90% or less, and preferably 80% or less.

When the projection area fraction is 10% or more, the shape of the oxide 3a is not partially limited. For example, the shape of the oxide 3a may be any of a film shape, a granular shape, and a string shape. The film-shaped oxide can increase the projection area fraction of the oxide 3a per volume. Therefore, when the fraction of the film-shaped oxide to the total oxide 3a is large, it is possible to increase the projection area fraction. Accordingly, it is preferable that the shape of the oxide 3a be a film shape.

Figure 1:
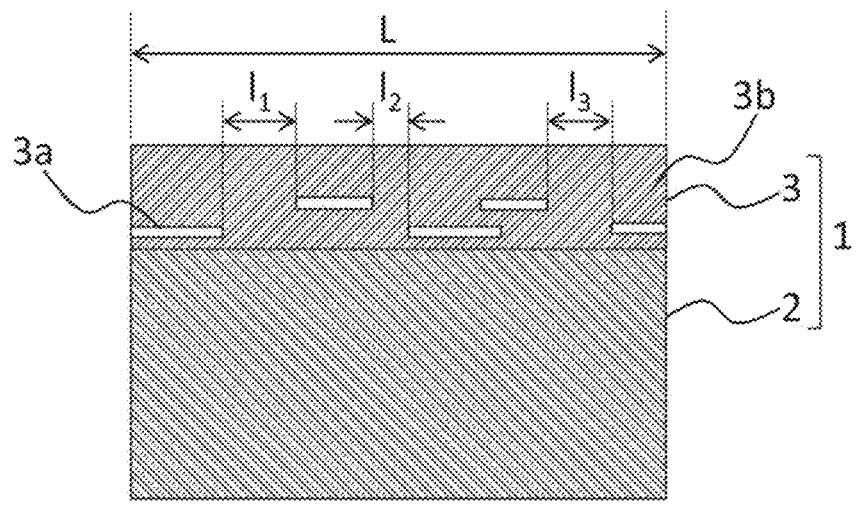
FIG. 1 is a view schematically illustrating a method of calculating a projection area fraction of an oxide in a plating layer of a galvanized steel sheet according to an embodiment of the present invention.

The projection area fraction of the oxide 3a can be easily measured by observing the cross section of the plated steel sheet 1 (the cross section including the steel sheet 2 and the plating layer 3 in a thickness direction). For example, as shown in FIG. 1, when the oxide 3a is vertically projected onto an interface between the plating layer 3 and the steel sheet 2 (a linearly approximated interface), the projection area fraction A (%) can be evaluated from the ratio of a projection length of the projected oxide 3a (shadow) (for example, a length ($L-l_1-l_2-l_3$) in FIG. 1) to a length of the interface between the plating layer 3 and the steel sheet 2 (for example, a length L in FIG. 1). That is, when an example of FIG. 1 is generalized and it is presumed that a length of an i-th (i is a natural number of 1 or more and n or less) non-projection area is set as $l_i$ in a case where there are n (n is a natural number) areas onto which the oxide 3a is not projected (a non-projection area), the projection area fraction A can be expressed by the following expression using the measured above length of the interface.

[Expression 1]

$$A = 100 \times \left(1 - \frac{\sum_{i=1}^{n} l_i}{L}\right) \quad \text{(Expression 1)}$$

In the embodiment, the ratio of the length was measured at five visual fields at a magnification of 10000 times, and an average value thereof was defined as the projection area fraction.

The chemical composition and the area fraction of the oxide 3a can be evaluated by observing the structure in the cross section of the plated steel sheet 1. For example, there is a method that after the plated steel sheet 1 is processed to a flake using a focused ion beam working device (FIB working device) so as to include the plating layer 3 (the cross section of the plated steel sheet 1 in the thickness direction), the surface of the flake is observed using a field emission type transmission electron microscope (FE-TEM) and the composition analysis is performed using an energy distributed X-ray detector (EDX).

Figure 2:
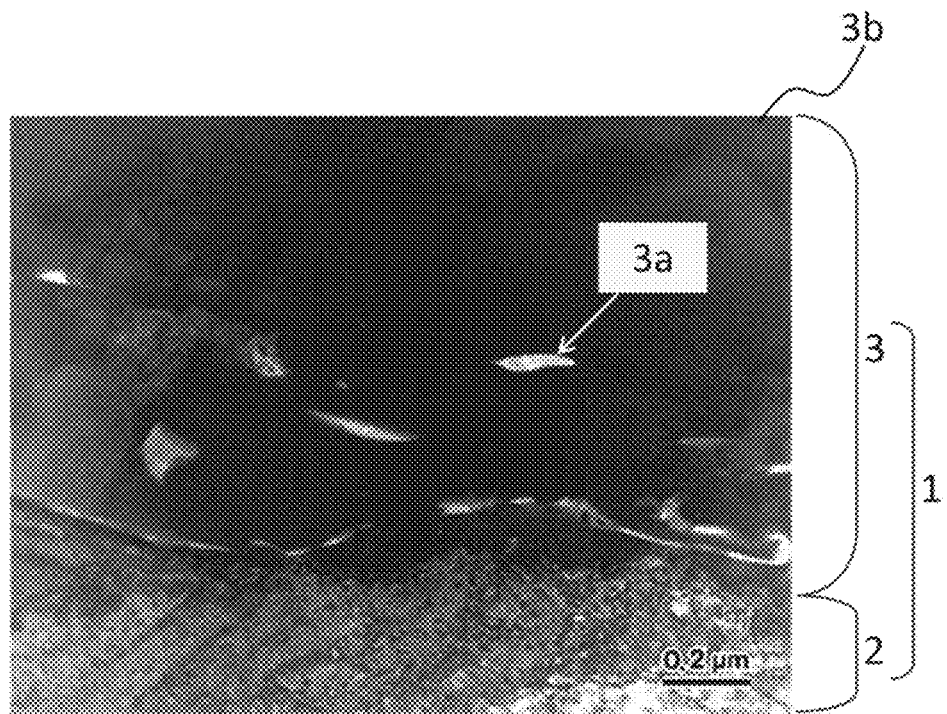
FIG. 2 is a view illustrating a state in which the oxide is dispersed in the plating layer on a cross section of the galvanized steel sheet (galvannealed steel sheet) according to the embodiment.

For example, in FIG. 2, an observation sample was prepared using the FIB, and then the oxide 3a was observed using the FE-TEM at a magnification of 50,000 times. In addition, it is possible to identify the oxide $3a$ by analyzing the oxide $3a$ using the EDX.

The plating layer 3 includes a plating metal $3b$, and the plating metal $3b$ has a chemical composition (plating chemical composition) that the amount of Fe is limited to 15 mass % or less, the amount of Al is limited to 2 mass % or less and a balance consisting of Zn and unavoidable impurities. When the amount of Fe in the plating metal $3b$ is more than 15 mass %, the adhesion of the plating layer 3 is deteriorated in the plated steel sheet 1, and the plating layer 3 is fractured or detached during forming. When the fractured or detached plating layer 3 adheres to a die, a flaw is caused during forming. In this manner, when the amount of Al in the plating metal $3b$ is more than 2 mass %, a thick Fe—Al—Zn-based barrier layer is formed and the adhesion of the plating layer 3 is deteriorated. In this case, it is arisen a problem that it is difficult to control the amount of Fe after alloy treatment.

In addition, when the plating layer 3 is a galvannealed layer, Fe in the steel sheet 2 is incorporated in the plating layer 3, and thus, it is possible to increase spot weldability and paintability. Particularly, when the amount of Fe in the plating metal $3b$ of the plating layer 3 after alloy treatment is 7 mass % or more, it is possible to increase spot weldability sufficiently. Accordingly, when the alloy treatment is performed, the amount of Fe in the plating metal $3b$ may be 7 mass % to 15 mass %. In addition, when the alloy treatment is performed, for example, the amount of Al may be 0.05 mass % or more in order to control the amount of Fe in the plating metal $3b$ more flexibly by controlling the alloying rate.

Even when the amount of Fe in the plating metal $3b$ is less than 7 mass %, the corrosion resistance, formability, and hole expansibility of the plated steel sheet 1 are satisfactory. In addition, when the plating metal $3b$ includes Fe, the amount of Fe may be controlled to be more than 0 mass % and 15 mass % or less, and when the plating metal $3b$ includes Al, the amount of Al may be controlled to be more than 0 mass % and 2 mass % or less. In addition, the amount of Zn in the plating metal $3b$ is, for example, 80 mass % or more and 100 mass % or less.

Here, as examples of the above unavoidable impurities in the plating metal $3b$ of the plating layer 3, for example, unavoidable impurities mixed at manufacturing (for example, unavoidable impurities in the plating bath, chemical elements (excluding Fe, Al, and Zn) due to the chemical composition of the steel sheet 2, and chemical elements (Ni, Cu, and Co) in optional pre-plating) are included. Therefore, in addition to Zn, the plating metal $3b$ may include at least one chemical element of Fe and Al as an optional element or an unavoidable impurity and chemical elements as Mg, Mn, Si, Cr, Ni, Cu and the like as unavoidable impurities.

The amount of the plating layer 3 (plating amount) per unit area (1 $m^2$) of the surface of the steel sheet 2 is not particularly limited, but the plating amount per surface at one side is preferably 5 $g/m^2$ or more from the viewpoint of increasing corrosion resistance. In addition, from the viewpoint of increasing plating adhesion, the plating amount per surface at one side is preferably 100 $g/m^2$ or less. Here, for the purpose of further improving properties such as paintability, weldability and the like, coating films formed by various coating film treatments (for example, an upper plating layer formed by electroplating or the like, a chromate coating film formed by chromate treatment, a phosphate coating film formed by phosphate treatment, a lubrication coating film, and a coating film for improving weldability) may be provided on the surface of the plating layer 3.

In addition, in order to secure corrosion resistance and hydrogen brittleness resistance when the plated steel sheet is used as a structure, a defect (non-plating) that reaches the steel sheet 2 in the plating layer 3 is limited. Specifically, when the surface of the plated steel sheet 1 (however, a region of ⅜ of the sheet width toward both edges from the central position of the sheet width) is observed at three view fields or more at a magnification of 100 times using a stereomicroscope, a coverage of the plating layer 3 to the steel sheet 2 (a share of an area, where the outermost surface of the plated steel sheet 1 is the plating layer 3, to a surface area of the plated steel sheet 1) is 99% or more. That is, the share of an area (defect rate), where the outermost surface of the plated steel sheet 1 is the steel sheet 2, to the outermost surface of the plated steel sheet 1 may be limited to less than 1.0%. The coverage is preferably 100% (that is, the defect rate is preferably 0%). When the coverage is 99% or more and less than 100%, for example, a defective area may be trimmed when the plated steel sheet is applied to components.

The amount of Fe and the amount of Al in the plating layer 3 may be measured by dissolving the plating layer 3 with an acid, removing an undissolved oxide and the like, and then performing chemical analysis of an obtained solution. With respect to the galvannealed steel sheet, for example, the plated steel sheet 1 which is cut in a size of 30 mm×40 mm is immersed into a 5% aqueous HCl solution to which an inhibitor is added, and while liquation of the chemical elements in the steel sheet 2 are suppressed, it is possible to obtain a solution by dissolving only the plating layer 3. An undissolved oxide and the like are removed from the obtained solution, and then, the amount of Fe and the amount of Al may be quantified from the signal intensity obtained by ICP emission analysis of the solution and a calibration curve prepared from a solution of known concentration.

In addition, in this case, measurement values of at least three samples cut from the same galvannealed steel sheet in consideration of unevenness in measurement among respective samples may be averaged.

Next, the chemical composition of the steel sheet 2 will be described. Here, % in the chemical composition of the steel sheet 2 means mass %.

(C: 0.05 to 0.40%)

C is an element which increases the strength of the steel sheet 2. When the amount of C is less than 0.05%, it is difficult to achieve both tensile strength of 980 MPa or more and workability. In addition, when the amount of C is more than 0.40%, the amounts of martensite and cementite in the microstructure increase, and sufficient elongation and hole expansibility cannot be obtained. In addition, in this case, it is difficult to ensure spot weldability. Therefore, the amount of C is set to 0.05 to 0.40%. When the strength of the steel sheet 2 is further increased, the amount of C is preferably 0.08% or more, and more preferably 0.10% or more, and still more preferably 0.12% or more. In addition, when the spot weldability of the steel sheet 2 is further increased, the amount of C is preferably 0.38% or less, and more preferably 0.35% or less, and still more preferably 0.32% or less.

(Si: 0.5 to 3.0%)

Si is an important element for improving the hydrogen brittleness resistance. When the amount of Si is less than 0.5%, the amount of the oxide $3a$ in the plating layer 3 is insufficient and delayed fracture resistance is not improved. Therefore, the lower limit of the amount of Si is set to 0.5%.

When the amount of Si is more than 3.0%, the microstructure cannot be controlled due to an excessive generation of ferrite, or workability is deteriorated. Therefore, the amount of Si is set to 0.5 to 3.0%. In addition, Si is an element which increases the strength of the steel sheet 2. Therefore, when the strength of the steel sheet 2 is further increased, the amount of Si is preferably 0.6% or more, and more preferably 0.7% or more, and still more preferably 0.8% or more. In addition, when the workability of the steel sheet 2 is further increased, the amount of Si is preferably 2.8% or less, and more preferably 2.5% or less, and still more preferably 2.2% or less.

(Mn: 1.5 to 3.0%)

Mn is an element which forms an oxide, and is an element which increases the strength of the steel sheet 2. When the amount of Mn is less than 1.5%, it is difficult to obtain tensile strength of 980 MPa or more. When a large amount of Mn is included, a common segregation of Mn and P and Mn and S is promoted to deteriorate workability. Therefore, the upper limit of the amount of Mn is set to 3.0%. When the strength of the steel sheet 2 is further increased, the amount of Mn is preferably 1.6% or more, and more preferably 1.8% or more, and still more preferably 2.0% or more. In addition, when the workability of the steel sheet is further increased, the amount of Mn is preferably 2.8% or less, and more preferably 2.7% or less, and still more preferably 2.6% or less.

In addition, in the chemical composition of the steel sheet 2, the amounts of the following chemical elements (O, P, S, Al, and N) are limited. Here, all lower limits of these five types of chemical elements are 0% and are not limited. Therefore, only the upper limits of these five types of chemical elements are limited.

(O: 0 to 0.01%)

O forms oxides in steel and deteriorates elongation, bendability, and hole expansibility, and thus, it is necessary to suppress the amount of O in the steel. Particularly, the oxides are present as inclusions in many cases and when the oxides are present at a punched edge surface or a cutting surface, a notched flaw or a coarse dimple is formed on the end surface. The flaw or the dimple causes stress concentration during hole expansion or hard working and becomes a starting point of the generation of cracks, and thus, hole expansibility or bendability is significantly deteriorated.

When the amount of O is more than 0.01%, the above tendency becomes significant, and thus, the upper limit of the amount of O is set to 0.01%. The lower limit of the amount of O is not particularly limited, but when the amount of O is less than 0.0001%, costs increase excessively. Thus, the lower limit of the amount of O may be set to 0.0001%. In order to further increase the workability of the steel sheet 2, the amount of O is preferably limited to 0.008% or less, and more preferably limited to 0.006% or less, and still more preferably limited to 0.005% or less.

(P: 0 to 0.04%)

P is segregated in the center area of the steel sheet in the thickness direction and is an element which causes embrittlement of the welded zone. When P is more than 0.04%, the embrittlement of the welded zone becomes significant, so the upper limit is set to 0.04%. The amount of P is not particularly limited. However, when the amount of P is less than 0.0001%, costs increase. Thus, the amount of P is preferably 0.0001% or more. In order to further improve the weldability of the steel sheet 2, the amount of P is preferably limited to 0.035% or less, and more preferably limited to 0.03% or less, and still more preferably limited to 0.02% or less.

(S: 0 to 0.01%)

S is an element which has a detrimental effect on the weldability and the manufacturability of the steel sheet 2 at casting and at hot rolling. For this reason, the upper limit of the amount of S is set to 0.01%. The lower limit of the amount of S is not particularly limited. However, when the amount of S is less than 0.0001%, costs increase, and thus, the amount of S was preferably 0.0001% or more. In addition, since S bonds with Mn to form coarse MnS and deteriorates bendability and hole expansibility, the amount of S has to be reduced as much as possible. In order to further increase the workability of the steel sheet 2, the amount of S is preferably limited to 0.008% or less, and more preferably limited to 0.005% or less, and still more preferably limited to 0.004% or less.

(Al: 0 to 2.0%)

Al is an element which can be utilized as an oxide to improve delayed fracture resistance. In addition, Al is an element which can be utilized as a deoxidizer. However, when an excessive amount of Al is added, the number of Al-based coarse inclusions are increased, a deterioration in hole expansibility and surface flaws are caused, and thus, the upper limit of the amount of Al is set to 2.0%. Although the lower limit of the amount of Al is not particularly limited, it is difficult to set the amount of Al to 0.0005% or less. Thus, the lower limit of the amount of Al may be 0.0005%. The amount of Al is preferably 1.8% or less, and more preferably 1.5% or less, and still more preferably 1.2% or less.

(N: 0 to 0.01%)

N forms coarse nitrides and is an element which deteriorates bendability and hole expansibility. Therefore, the amount of N has to be suppressed. When the amount of N is more than 0.01%, the above tendency becomes significant, and thus, the upper limit of the amount of N is set to 0.01%. In addition, a small amount of N is preferable since N generates a blowhole during welding. The lower limit of N is not particularly limited. However, when the amount of N is less than 0.0005%, the manufacturing cost increases remarkably, and thus, the lower limit of the amount of N may be set to 0.0005%. In order to further improve the weldability of the steel sheet 2, the amount of N is preferably limited to 0.008% or less, and more preferably limited to 0.005% or less, and still more preferably limited to 0.004% or less.

Here, all Al and Si are elements which suppress formation of cementite. Therefore, when the total amount of Al and Si is controlled, it is advantageous to control the microstructure which will be described later. When the total amount thereof is 0.5% or more, it is possible to more easily suppress the formation of cementite. Thus, the total amount of Al and Si is preferably 0.5% or more, and more preferably 0.6% or more, and still more preferably 0.8% or more.

The above described chemical elements are base components (base elements) of the steel sheet 2 in the embodiment, and the chemical composition in which the base elements are controlled (included or limited) and the balance that consists of Fe and unavoidable impurities is a base composition of the steel sheet 2 in the embodiment. However, in addition to the base composition (instead of some of Fe in the balance), in the embodiment, the following chemical elements (optional elements) may further be contained in the steel sheet 2 as necessary. In addition, even when the optional elements are unavoidably mixed in the steel sheet 2 (for example, the amount of each optional element that is less than preferred lower limit thereof), the effect of the embodiment is not impaired.

That is, the steel sheet 2 may contain at least one of Mo, Cr, Ni, Cu, Nb, Ti, V, B, Ca, Mg, and REM as the optional elements or the unavoidable impurities. Here, since the chemical elements are not necessarily added in the steel sheet 2, the lower limits of the eleven chemical elements are 0% and are not limited. Therefore, only the upper limits of the eleven chemical elements are limited.

(Mo: 0 to 1.0%)

Mo is a strengthening element and is an important element for improving hardenability. In the case where Mo is added in the steel, when the amount of Mo is less than 0.01%, the effect of the addition cannot be obtained and thus, the lower limit of Mo may be 0.01%. When the amount of Mo is more than 1.0%, the manufacturability of the steel sheet 2 is deteriorated at manufacturing and at hot rolling, and thus, the upper limit of the amount of Mo is set to 1.0%. From the viewpoint of the manufacturability of the steel sheet 2 and the cost, the upper limit of the amount of Mo is preferably 0.8%, and more preferably 0.5%, and still more preferably 0.3%.

(Cr: 0 to 1.0%)

Cr is a strengthening element and is an important element for improving hardenability. In the case where Cr is added in the steel, when the amount of Cr is less than 0.05%, the effect of the addition cannot be obtained and thus, the lower limit of Cr may be 0.05%. When the amount of Cr is more than 1.0%, the manufacturability of the steel sheet 2 is deteriorated at manufacturing and at hot rolling, and thus, the upper limit of the amount of Cr is set to 1.0%. From the viewpoint of the manufacturability of the steel sheet 2 and the cost, the upper limit of the amount of Cr is preferably 0.9%, and more preferably 0.8%, and still more preferably 0.5%.

(Ni: 0 to 1.0%)

Ni is a strengthening element and is an important element for improving hardenability. In the case where Ni is added in the steel, when the amount of Ni is less than 0.05%, the effect of the addition cannot be obtained and thus, the lower limit of Ni may be 0.05%. When the amount of Ni is more than 1.0%, the manufacturability of the steel sheet 2 is deteriorated at manufacturing and at hot rolling, and thus, the upper limit of the amount of Ni is set to 1.0%. In addition, Ni improves the wettability of the steel sheet 2 or promotes alloying reaction. Therefore, the amount of Ni may be 0.2% or more.

On the other hand, Ni is an element which is not easily oxidized compared to Fe. Thus, in order to flexibly control the size and the amount of the oxide 3a in the plating layer 3 or appropriately control plating properties by preventing Fe oxidization, the upper limit of the amount of Ni may be further limited. For example, the upper limit of the amount of Ni may be 0.9%.

(Cu: 0 to 1.0%)

Cu is a strengthening element and is an important element for improving hardenability. In the case where Cu is added in the steel, when the amount of Cu is less than 0.05%, the effect of the addition cannot be obtained and thus, the lower limit of Cu may be 0.05%. When the amount of Cu is more than 1.0%, the manufacturability of the steel sheet 2 is deteriorated at manufacturing and at hot rolling, and thus, the upper limit of the amount of Cu is set to 1.0%. In addition, Cu improves the wettability of the steel sheet 2 or promotes alloying reaction. Therefore, the amount of Cu may be 0.2% or more. Similar to Ni, Cu is an element which is not easily oxidized compared to Fe. Therefore, the upper limit of the amount of Cu may be 0.9%.

(B: 0 to 0.01%)

B is effective element for strengthening a grain boundary and improving the strength of the steel sheet 2. In the case where B is added in the steel, when the amount of B is less than 0.0001%, the effect of the addition cannot be obtained and thus, the lower limit of B may be 0.0001%. On the other hand, when the amount of B is more than 0.01%, not only is the effect of the addition saturated, but also the manufacturability of the steel sheet 2 is deteriorated at manufacturing and at hot rolling. Thus, the upper limit of the amount of B is set to 0.01%. From the viewpoint of the manufacturability of the steel sheet 2 and the cost, the upper limit of the amount of B is preferably 0.008%, and more preferably 0.006%, and still more preferably 0.005%.

(Ti: 0 to 0.3%)

Ti is a strengthening element. Ti contributes to an increase in the strength of the steel sheet 2 through precipitate strengthening, grain-refining strengthening by suppressing ferrite grain growth, and dislocation strengthening through the suppression of recrystallization. In the case where Ti is added in the steel, when the amount of Ti is less than 0.005%, the effect of the addition cannot be obtained and thus, the lower limit of Ti may be 0.005%. On the other hand, when the amount of Ti is more than 0.3%, heavy precipitation of carbonitrides are caused and formability is deteriorated. Thus, the upper limit of the amount of Ti is set to 0.3%. In order to further increase the formability of the steel sheet 2, the upper limit of the amount of Ti is preferably 0.25%, and more preferably 0.20%, and still more preferably 0.15%.

(Nb: 0 to 0.3%)

Nb is a strengthening element. Nb contributes to an increase in the strength of the steel sheet 2 through precipitate strengthening, grain-refining strengthening by suppressing ferrite grain growth, and dislocation strengthening through the suppression of recrystallization. In the case where Nb is added in the steel, when the amount of Nb is less than 0.005%, the effect of the addition cannot be obtained and thus, the lower limit of the amount of Nb may be 0.005%. On the other hand, when the amount of Nb is more than 0.3%, heavy precipitation of carbonitrides are caused and formability is deteriorated. Thus, the upper limit of the amount of Nb is set to 0.3%. In order to further increase the formability of the steel sheet 2, the upper limit of the amount of Nb is preferably 0.25%, and more preferably 0.20%, and still more preferably 0.15%.

(V: 0 to 0.5%)

V is a strengthening element. V contributes to an increase in the strength of the steel sheet 2 through precipitate strengthening, grain-refining strengthening by suppressing ferrite grain growth, and dislocation strengthening through the suppression of recrystallization. In the case where V is added in the steel, when the amount of V is less than 0.005%, the effect of the addition cannot be obtained and thus, the lower limit of the amount of V may be 0.005%. On the other hand, when the amount of V is more than 0.5%, heavy precipitation of carbonitrides is caused and formability is deteriorated. Thus, the upper limit of the amount of V is set to 0.5%. In order to further increase the formability of the steel sheet 2, the upper limit of the amount of V is preferably 0.4%, and more preferably 0.3%, and still more preferably 0.2%.

(Total Amount of at Least One of Ca, Mg, and REM: 0 to 0.04%)

At least one of Ca, Mg, and rare earth metal (REM) may be added to 0.04% at most as a total content thereof. Ca, Mg, and REM are elements used for deoxidation, and one, two or three types selected from Ca, Mg, and REM as the total content thereof may be contained 0.0005% or more in the steel.

When the total amount of at least one selected from Ca, Mg, and REM is more than 0.04%, formability is deteriorated, and thus, the upper limit of the total amount is set to 0.04%. Here, REM is generally added in the steel as mischmetal. In addition to La and Ce, at least one of lanthanoid series elements may be contained in some cases. The steel sheet 2 may contain lanthanoid series elements other than La and Ce as unavoidable impurities or metallic La and metallic Ce may be added in the steel. In order to further improve the formability of the steel sheet 2, the upper limit of the total amount of at least one selected from Ca, Mg, and REM may be preferably 0.03%, and more preferably 0.02%, and still more preferably 0.01%.

As described above, the steel sheet 2 includes, as a chemical composition, the above-described base elements, and the balance consisting of Fe and unavoidable impurities, or includes, as a chemical composition, the above-described base elements, at least one selected from the above-described optional elements, and the balance consisting of Fe and unavoidable impurities.

Next, the microstructure of the steel sheet 2 which is a material to be plated will be described. Here, % in microstructure of the steel sheet 2 means volume % (volume fraction, that is, area % in observed cross section). In addition, each structure in the microstructure (six types of tempered martensite, austenite, ferrite, bainite, pearlite and martensite) is referred to as a "phase" for convenience.

The microstructure of the steel sheet 2 includes ferrite, bainite, tempered martensite, and residual austenite.

In order to achieve both ductility and hole expansibility after the tensile strength of 980 Mpa or more is achieved, the amount of the tempered martensite is set to 30% or more. The tempered martensite can increase tensile strength compared to ferrite and can increase hole expansibility compared to martensite.

Generally, the larger the hardness difference between the structures is, the lower the hole expansibility is. For example, in a steel including ferrite and martensite, since strain is concentrated in an interface between the ferrite and the martensite during deformation and voids are generated, hole expansibility is low. Then, by controlling the amount of the tempered martensite which is softer than martensite, the generation of voids is suppressed during deformation so as to improve hole expansibility. The tempered martensite is a martensite which includes an iron-based carbide such as cementite therein and has low strength (tensile strength) and excellent hole expansibility compared to martensite as quenched (also referred to as fresh martensite) having the same chemical composition.

When the amount of the tempered martensite is less than 30%, it is difficult to ensure tensile strength of 980 MPa after the ductility and the hole expansibility are achieved. In order to further increase the tensile strength, the amount of the tempered martensite is preferably 32% or more, and more preferably 35% or more, and still more preferably 38% or more. In this case, it is further preferable that the volume fraction of the tempered martensite be larger than the volume fraction of the phases other than the tempered martensite. On the other hand, since the microstructure includes 8% or more of austenite, ferrite, and bainite, the amount of the tempered martensite may be less than 92% in terms of volume fraction.

Meanwhile, since the tempered martensite includes a large number of dislocations, the tempered martensite has high strength, but the ductility is deteriorated. Here, the ductility is improved using the transformation induced plasticity of the residual austenite. When the volume fraction of the residual austenite is less than 8%, a sufficient ductility (total elongation El) cannot be obtained. Therefore, the lower limit of the amount of the residual austenite is set to 8%. On the other hand, since the microstructure includes (a total of) 40% or more of tempered martensite and bainite, and ferrite, the amount of the residual austenite may be less than 60% in terms of volume fraction. In order to ensure higher elongation, the amount of the residual austenite is preferably 9% or more, and more preferably 10% or more.

In addition, the microstructure includes ferrite. The ferrite is effective for increasing the amount of C in austenite. For example, in an embodiment of the manufacturing method which will be described later, ferrite is formed by cooling after dual phase annealing or single phase region annealing so as to stabilize the residual austenite. Here, the higher the volume fraction of the ferrite is, the lower the strength is. Therefore, the volume fraction of the ferrite is preferably limited to 30% or less. In addition, the amount of the ferrite may be more than 0%, and may be preferably 1% or more. For example, when it is necessary to allow the austenite to remain in the microstructure after processing so as to increase impact absorption capacity when used as a component, the increasing of the amount of the residual austenite and the increasing of the amount of C in the residual austenite are effective. Therefore, in response to such a request, the volume fraction of the ferrite may be 10% or more, and preferably 20% or more.

Further, the microstructure includes bainite. The bainite is effective for increasing the amount of C in residual austenite. The amount of bainite is not particularly limited. However, in order to obtain tensile strength of 980 MPa or more, a total amount of the tempered martensite and the bainite is set to 40% or more. The amount of bainite may be more than 0%, and may be preferably 1% or more. For example, when it is necessary to allow the austenite to remain in the microstructure after processing so as to increase impact absorption capacity when used as a component, the increasing of the amount of the residual austenite and the increasing of the amount of C in the residual austenite is effective. Therefore, in response to such a request, the volume fraction of the bainite may be 2% or more, and preferably 5% or more. On the other hand, since the microstructure includes 30% or more of tempered martensite, ferrite, and 8% or more of austenite, the amount of the bainite is less than 62% in terms of volume fraction.

In addition, the volume fraction of pearlite in the microstructure is limited to 10% or less. The pearlite is formed by the transformation of austenite. For this reason, since the pearlite reduces the amount of austenite and the amount of C in the austenite, strength and ductility are deteriorated. Therefore, it is preferable that the microstructure does not contain the pearlite. However, when the volume fraction of the pearlite is limited to 10% or less, it is possible to ensure tensile strength of 980 MPa or more and ductility. Thus, the upper limit of the amount of the pearlite is set to 10%. When C is more effectively utilized, the volume fraction of the pearlite is preferably limited to 5% or less. The lower limit of the volume fraction of the pearlite is 0% without limitation.

In order to sufficiently ensure elongation and hole expansibility, it is preferable that martensite be not included in the microstructure. Specifically, the volume fraction of the martensite may be limited to 10% or less. In order to further increase elongation and hole expansibility, the volume fraction of the martensite is preferably limited to 8% or less, and more preferably limited to 7% or less, and still more preferably limited to 5% or less. The lower limit of the volume fraction of the martensite is 0% without limitation.

Accordingly, for example, the steel sheet 2 may has the microstructure including the tempered martensite whose volume fraction is 30% or more, the austenite (residual austenite) whose volume fraction is 8% or more, the pearlite whose volume fraction is limited to 10% or less, the martensite whose volume fraction is limited to 10% or less as necessary, and the balance consisting of ferrite and bainite, and the total volume fraction of the tempered martensite and the bainite may be 40% or more.

Further, in order to improve hole expansibility, a share of an area (coarse grain fraction) that grains (coarse grains) having a grain size of more than 35 μm occupies per unit area with respect to all constitutional elements (the respective phases) of the microstructure is limited to 10% or less. When the number of the grains whose grain sizes are large increases, tensile strength is decreased and local deformability is also deteriorated. Accordingly, it is preferable that the size of the grain be as small as possible. In addition, since the hole expansibility is improved by all the grains receiving strain evenly and equally, the local strain in the grain can be suppressed by limiting the amount of the coarse grain. Here, at this time, the grain size is evaluated as a region surrounded by a grain boundary of 15° or more that is measured be using an electron back scattering pattern (EBSP).

In addition, each phase (the bainite, the martensite, the tempered martensite, the residual austenite, the ferrite, and the pearlite) of the above-described microstructure and the structure of the reminder are identified and existence positions of each phase are observed so as to measure an area fraction of each phase (corresponding to the volume fraction of each phase). In the measurement, a cross section of the steel sheet 2 in a rolling direction or a cross section in the right angle direction of the rolling direction was etched using a nital reagent and a reagent disclosed in Japanese Unexamined Patent Application, First Publication No. S59-219473 and are observed using an optical microscope (at a magnification of 1,000 times), or a scanning type or transmission type electron microscope (at a magnification of 1000 to 100000 times) so as to quantify each phase. In this case, the area fraction of each phase (that is, corresponding to the volume fraction of each phase) can be obtained using a point count method or using image analysis by observing each 20 view fields or more.

As described above, by controlling the chemical composition and the microstructure of the steel sheet 2, the plated steel sheet 1 (steel sheet 2) having tensile strength of 980 MPa, excellent ductility and excellent hole expansibility can be obtained.

Here, the thickness of the steel sheet 2 is not particularly limited, but the upper limit of the thickness may be 6.0 mm. The lower limit of the thickness of the steel sheet 2 may be, for example, 0.5 mm depending on the application.

Here, when tensile strength is increased, elongation and hole expansibility are generally deteriorated, and thus, the elongation and the hole expansibility are evaluated as follows.

After an elongation index is obtained from a product of tensile strength TS (MPa) and total elongation El (%), when the product is 16000 (MPa×%) or more (TS×El≥16000 MPa×%, the elongation is evaluated to be excellent. When the elongation is emphasized, the product (TS×El) is preferably 18000 MPa×% or more, and more preferably 20000 MPa×% or more.

After a hole expansibility index is obtained from a product of the tensile strength TS (MPa) and hole expansion ratio λ (%), when the product is 40000 (MPa×%) or more (TS×λ≥40000 MPa×%), the hole expansibility is evaluated to be excellent. When the hole expansibility is emphasized, the product (TS×λ) is preferably 45000 MPa×% or more, and more preferably 50000 MPa×% or more.

The galvanized steel sheet 1 according to the embodiment has tensile strength TS of 980 MPa or more and is excellent in delayed fracture resistance, in plating adhesion, in elongation and hole expansibility. The galvanized steel sheet (material) 1 according to the embodiment adopts a product manufactured through each process of smelting, steelmaking (refining), casting, hot rolling, and cold rolling which are common iron making processes used in principle and can be suitably obtained by the manufacturing method according to the embodiment which will be described later. However, even with a product that is manufactured by omitting a part of or all the iron making processes, as long as the product satisfies the conditions of the embodiment, the effect described in the embodiment can be obtained. Thus, the galvanized steel sheet 1 according to the embodiment is not necessarily limited by the manufacturing method.

In addition, when the galvanized steel sheet 1 according to the embodiment is used as a component, for example, a part of the plating layer 3 may be removed in order to ensure weldability and the galvanized steel sheet can be processed properly depending on purpose.

Next, a manufacturing method of a galvanized steel sheet according to an embodiment of the present invention will be described in detail.

Figure 4A:
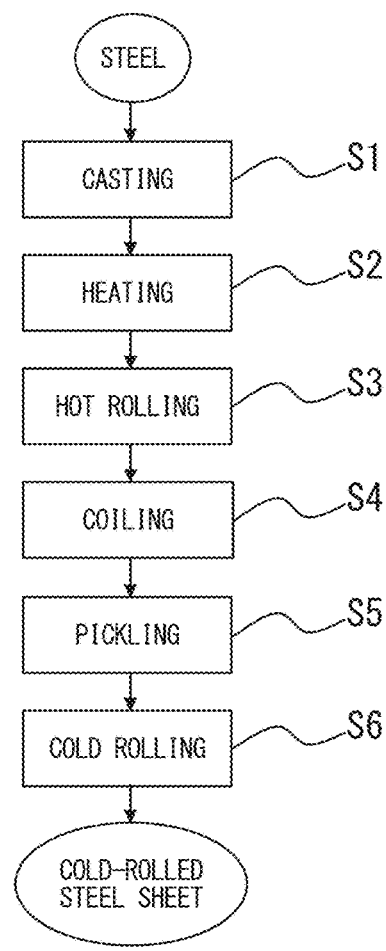
FIG. 4A is a flow chart illustrating an example of a manufacturing method of a galvanized steel sheet according to an embodiment of the present invention.
Figure 4B:
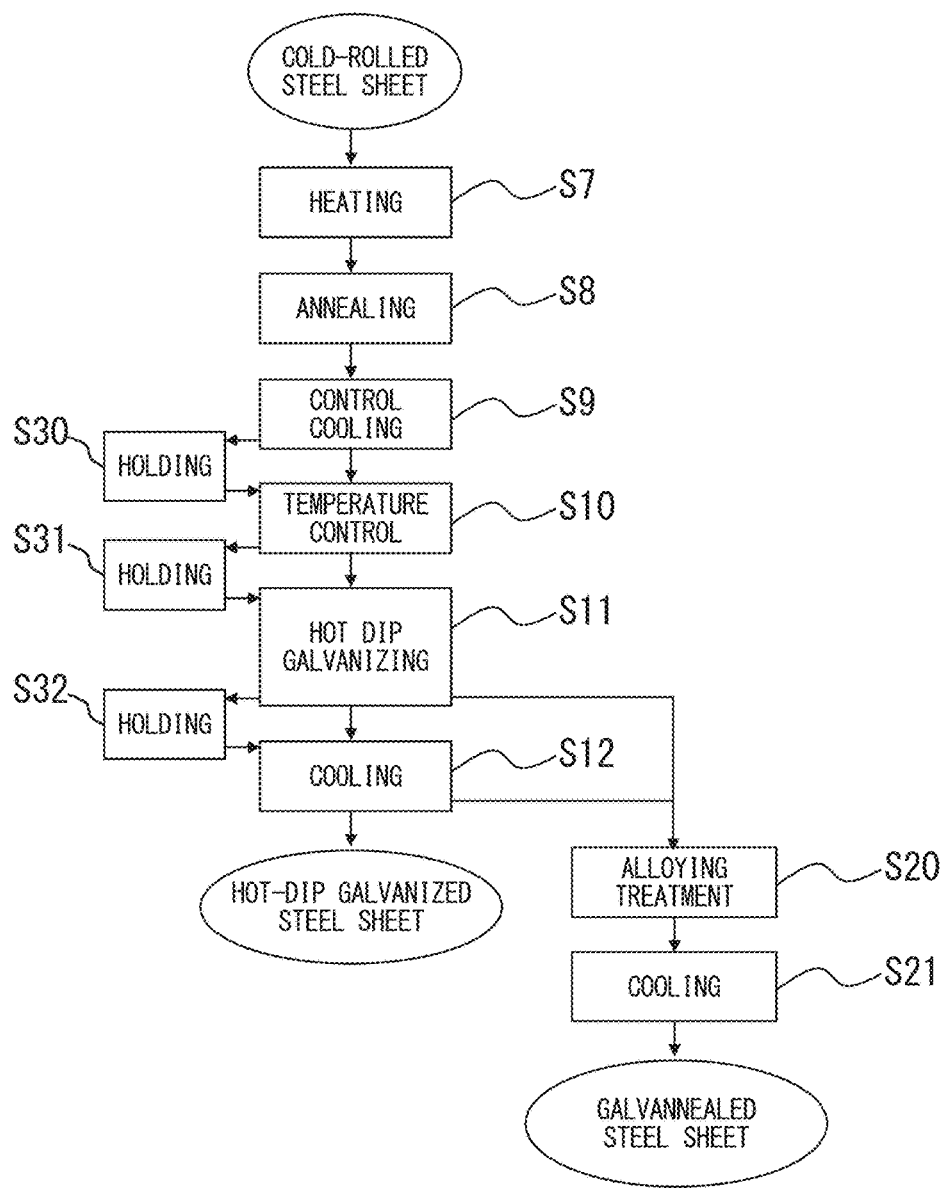
FIG. 4B is a flow chart (subsequent to FIG. 4A) illustrating an example of a manufacturing method of a galvanized steel sheet according to an embodiment of the present invention.

FIGS. 4A and 4B show a flow chart of an example of the manufacturing method of a galvanized steel sheet according to the embodiment. As shown in the flow chart, in the embodiment, a galvanized steel sheet is manufactured by the following processes. That is, steel (slab) is casted (S1), heated (S2), and hot-rolled (S3). After the hot rolling (S3), the steel (steel sheet, hot-rolled steel sheet) is coiled (S4), pickled (S5), and cold-rolled (S6). After the cold rolling (S6), the steel (steel sheet, cold-rolled steel sheet) is heated so as to recrystallize ferrite (S7), and annealing (S8) and control cooling (S9) are performed. Then, the temperature is controlled based on a plating bath temperature (S10) and hot dip galvanizing is performed (S11). After the hot dip galvanizing (S11), the steel (steel sheet, plated steel sheet) is cooled (S12) so as to obtain a hot-dip galvanized steel sheet as a final product. Further, when the steel (steel sheet, plated steel sheet) is subjected to alloying treatment (S20) after the hot dip galvanizing (S11), a galvannealed steel sheet is obtained as a final product after cooling (S21). In addition, after the control cooling (S9), the steel (steel sheet, cold-rolled steel sheet or plated steel sheet) may be heated and held as necessary (S30, S31, and S32) in some cases.

Here, in order to control the projection area fraction of the oxide 3a in the plating layer of the galvanized steel sheet according to the above embodiment to be limited to 10% or more, and thus, in the embodiment, at least, the conditions of the cold rolling (S6), the conditions of the heating (S7), and the conditions of the hot dip galvanizing (S11) are appropriately controlled as described below.

Hereinafter, each process of the embodiment will be described.

In the embodiment, steel having the chemical composition described in the above embodiment is manufactured in the usual method and casted (S1).

After the steel (slab) after the casting is directly or once cooled, the steel is heated (S2) and provided for hot rolling (S3). Although the heating temperature before the hot rolling is not particularly limited, the temperature is preferably 1150° C. or higher, and more preferably 1200° C. or higher so as to more uniform chemical composition in the steel. The hot rolling is completed at the temperature of $Ar_3$ transformation point or higher in order to prevent the microstructure from being uneven by rolling in a dual phase region. Here, the $Ar_3$ transformation point ($Ar_3$) and $Ac_3$ transformation point ($Ac_3$) which will be detailed later in Table 1 can be calculated respectively from the following Expressions 2 and 3 using the amount of C (% C), the amount of Mn (% Mn), the amount of Si (% Si), and the amount of Cr (% Cr).

$$Ar_3=901-325\times(\% \text{ C})-92\times(\% \text{ Mn})+33\times(\% \text{ Si})-20\times(\% \text{ Cr}) \quad \text{(Expression 2)}$$

$$Ac_3=910-203\times(\% \text{ C})^{0.5}+44.7\times(\% \text{ Si})-30\times(\% \text{ Mn})-11\times(\% \text{ Cr}) \quad \text{(Expression 3)}$$

When the steel sheet does not contain Cr as the optional element, the $Ar_3$ transformation point and the $Ac_3$ transformation point can be calculated respectively from the following Expressions 4 and 5.

$$Ar_3=901-325\times(\% \text{ C})-92\times(\% \text{ Mn})+33\times(\% \text{ Si}) \quad \text{(Expression 4)}$$

$$Ac_3=910-203\times(\% \text{ C})^{0.5}+44.7\times(\% \text{ Si})-30\times(\% \text{ Mn}) \quad \text{(Expression 5)}$$

Next, the steel (steel sheet, hot-rolled steel sheet) after the hot rolling is coiled at a coiling temperature of 300° C. to 700° C. (S4). When the coiling temperature in the hot rolling is more than 700° C., the microstructure of the hot-rolled steel sheet is a coarse ferrite-pearlite structure and each phase of the microstructure of the final steel sheet after the subsequent processes (for example, cold rolling, annealing, and galvanizing and alloying heat treatment) become the uneven microstructure. As a result, the above coarse grain fraction cannot be controlled sufficiently and excellent hole expansibility cannot be obtained. Thus, the upper limit of the coiling temperature is set to 700° C. The coiling temperature is preferably 650° C. or lower.

Although the lower limit of the coiling temperature is not particularly defined, when the coiling temperature is 300° C. or higher, it is possible to obtain the strength of the hot-rolled steel sheet which is suitable for cold rolling. Therefore, the coiling temperature is preferably 300° C. or higher.

The hot-rolled steel sheet manufactured in this manner is subjected to pickling (S5). Since the pickling removes oxides on the surface of the steel sheet, the pickling is important to improve plating properties. The steel sheet may be pickled once or may be pickled a plurality of times in a divided manner.

The pickled hot-rolled steel sheet is cold-rolled (S6) by a roll (work roll) having a roll size of 1400 mm or less under a cumulative rolling reduction of 30% or more and passes through a continuous hot-dip galvanizing line. It is possible to promote ferrite recrystallization and formation of an oxide resulting from the recrystallization (an oxide necessary for forming the above-described oxide 3a) by the cold rolling during heating (retention) in the following process.

Under a cumulative rolling reduction of less than 30%, since the recrystallization is not sufficiently promoted during heating (retention) in the following process, the oxide is not sufficiently formed in the following process and sufficient hydrogen brittleness resistance cannot be obtained. Therefore, the cumulative rolling reduction (lower limit) is set to 30% or more. Preferably, the cumulative rolling reduction is 40% or more. On the other hand, the upper limit of the cumulative rolling reduction of the cold rolling is not particularly defined (less than 100%), but the cumulative rolling reduction is preferably 80% or less so as to perform cold rolling with suppressing an increase of cold rolling load. Since the plating adhesion, elongation, strength hole expansibility, and hydrogen brittleness resistance are hardly affected by the number of rolling passes or the rolling reduction in the respective passes, the number of rolling passes or the rolling reduction in the respective passes is not particularly defined. Here, when an inlet thickness before an initial pass in the cold rolling is set as a reference, the cumulative rolling reduction is a percentage of a cumulative rolling reduction amount to this reference (a difference between an inlet thickness before an initial pass in the cold rolling and an outlet thickness after a final pass in the cold rolling).

In addition, the strain necessary for the recrystallization increases with an increase in a deformation rate (hereinafter, an average deformation rate) of the steel sheet per unit sheet thickness. Thus, in order to obtain average deformation rate sufficiently, a roll having a small roll size that a surface area which contacts with a material to be rolled and the amount of elastic deformation of the roll on this surface are small is used. In the cold rolling under the cumulative rolling reduction of 30% or more, when the a roll having a roll size of 1400 mm or less is used, it is possible to form an oxide that is necessary for obtaining sufficient hydrogen brittleness resistance. The smaller the roll size is, the higher the above average deformation rate is. Thus, a recrystallization rate can be increased by reducing the time before the recrystallization is started, and the amount of the oxide to be formed is also increased. The effect of increasing the recrystallization rate and the effect of the oxide formation are caused when the roll size is 1400 mm or less. Therefore, the roll size is set to 1400 mm or less. The roll size is preferably 1200 mm or less, and more preferably 1000 mm or less.

The steel (steel sheet, cold-rolled steel sheet) after the cold rolling is heated (S7). Since the plating adhesion, elongation, strength, hole expansibility, and hydrogen brittleness resistance are hardly affected by the heating rate (average heating rate) at the time when the steel sheet passes through the plating line, the heating rate is not particularly defined. When the heating rate is 0.5° C./s or more, it is possible to ensure sufficient productivity, and thus, the heating rate is preferably 0.5° C./s or more. When the heating rate is 100° C./s or less, the embodiment can be implemented in a usual facility investment, and thus, the heating rate is preferably 100° C./s from a viewpoint of cost.

During the heating, the steel sheet is retained at 550° C. to 750° C. for 20 seconds or more. This is because the oxide can be dispersed by retaining the steel sheet in the temperature range. It is considered that the oxide formation is closely related to the recrystallization of the cold-worked ferrite. That is, since Si, Al and Mn which form the oxides are supplied by diffusion (particularly, grain boundary diffusion) from the inside of the steel sheet, the oxide which includes one of or a combination of Si, Mn, and Al tends to be formed in the grain boundary of the ferrite on the surface of the steel sheet. The fine ferrite grain boundary formed by recrystallization as described above is utilized as an oxide forming site. In addition, as described above, since the oxide is preferentially formed in the ferrite grain boundary, the oxide generally has a network structure and easily becomes a formation (projection area fraction) which is capable of effectively trapping hydrogen.

Further, in a temperature range of 550° C. to 750° C., a ferrite recrystallization rate is higher than an oxide formation rate. Therefore, when the temperature of the steel sheet after the cold rolling is controlled within the temperature range, the recrystallization is started before the oxide is formed. Thus, it is possible to form a sufficient amount (area) of oxides on the surface of the steel sheet.

When retaining temperature is lower than 550° C., it takes long time for the recrystallization and also, only the as-worked ferrite which is greatly extended is present. Thus, a grain boundary with a sufficient amount (density) for forming oxides is not present. In addition, when the retaining temperature is more than 750° C., the oxide formation rate is higher than ferrite recrystallization rate and granular oxides are formed in the grain boundary in the middle of recrystallization and grain growth, or reversible transformation, and thus, it is difficult to form a sufficient amount (area) of oxides on the surface of the steel sheet. Here, the time when the temperature of the steel (steel sheet) is within the temperature range of 550° C. to 750° C. is controlled. If the time when the temperature of the steel sheet is within the temperature range of 550° C. to 750° C. is less than 20 seconds, a sufficient amount of oxides (particularly, oxides having a form advantageous in the projection area fraction) cannot be obtained and in a final product, the projection area fraction of the above oxides is less than 10%. In order to further increase the hydrogen brittleness resistance of the steel sheet, the retaining time is preferably 30 seconds or more.

Here, the time when the temperature of the steel sheet is within the temperature range of 550° C. to 750° C. may be controlled by isothermal holding or may be controlled by heating (temperature rising). The upper limit of the time when the temperature of the steel sheet is within the temperature range of 550° C. to 750° C. is not particularly limited and may be 2000 seconds, or maybe 1000 seconds.

On the other hand, in the as-cold rolled steel sheet, the ferrite grain is elongated in a rolling direction, the ferrite grain size is large, and the amount of the ferrite grain boundary is small. As a result, even when the as-cold rolled steel sheet in which most of the ferrite is unrecrystallized ferrite is annealed, it is difficult to ensure an oxide projection area fraction of 10% or more. Therefore, as described above, the ferrite grain size can be refined by controlling the time when the temperature of the steel sheet is within the temperature range of 550° C. to 750° C. and recrystallizing the ferrite before oxide formation.

Further, the steel sheet after the recrystallization is annealed at an annealing temperature (highest heating temperature) of 750° C. to 900° C. (S8). When the annealing temperature is lower than 750° C., it takes a long time to perform re-solid solution of carbides formed during the hot rolling, and the carbides remain, and thus, hardenability of the steel sheet is deteriorated. Therefore, a sufficient amount of the tempered martensite and the austenite cannot be ensured and it is difficult to ensure tensile strength of 980 MPa or more. Therefore, the lower limit of the annealing temperature is 750° C.

Excessive high-temperature heating causes not only an increase of cost but also troubles such as deterioration of a sheet shape when the steel sheet passes through the plating line at a high temperature and a decrease in the life of the roll. Therefore, the upper limit of the annealing temperature is set to 900° C. A heat treatment time (annealing time) at the above temperature range (750° C. to 900° C.) is not particularly limited but is preferably 10 seconds or more for dissolution of carbide.

In order to suppress costs, the heat treatment time is preferably 600 seconds or less. The steel sheet may be annealed by performing isothermal holding at the highest heating temperature or the steel sheet may be annealed by starting cooling immediately after gradient heating is performed and the temperature reaches the highest heating temperature.

When an atmosphere in an annealing process of the continuous hot-dip galvanizing line is controlled, it is possible to flexibly control the oxide formed on the surface of the steel sheet (oxide including at least one chemical element selected from Si, Mn, and Al) can be controlled. That is, when a $H_2$ concentration and a dew point in the annealing atmosphere are managed, it is possible to control an oxygen potential which is important for reaction control. For example, the dew point may be set as −20° C. or higher in the $N_2$ atmosphere with a $H_2$ concentration of 20 volume % or less, which is applied in usual annealing conditions. In this case, the amount and the shape of the oxide including at least one chemical element selected from Si, Mn, and Al can be more flexibly controlled.

In order to ensure a sufficient amount of the tempered martensite and the austenite, it is important to control cooling conditions so as not to excessively form structures other than tempered martensite and austenite (for example, ferrite, pearlite, and bainite) in the cooling process after the annealing. Particularly, it is preferable that the austenite is stabilized by controlling the cooling conditions (for example, control of ferrite transformation and control of pearlite transformation) so that the amount of C in the austenite can be increased.

Therefore, the steel sheet after the annealing is subjected to controlled cooling by one-step or two-step cooling (S9).

First, when the two-step cooling is performed, the steel sheet is cooled to a predetermined temperature (hereinafter, referred to as an intermediate cooling temperature) in a temperature range from 500° C. or higher to lower than 750° C. after the above annealing is completed at an average cooling rate of 0.1° C./s to 30° C./s (hereinafter, referred to as a first average cooling rate) (first step of cooling). The first step of cooling will be described in detail below.

In order to ensure sufficient productivity, the first average cooling rate is 0.1° C./s or more. In order to further increase productivity, the first average cooling rate is preferably 0.2° C./s or more, and more preferably 0.5° C./s or more, and still more preferably 0.8° C./s or more. In addition, the first average cooling rate is set to 30° C./s or less in order to form ferrite. In order to increase the amount of austenite and stability of austenite by further increasing the amount of ferrite, the first average cooling rate is preferably 25° C./s or less, and more preferably 22° C./s or less, and still preferably 20° C./s or less. Accordingly, the first average cooling rate is set to 0.1 to 30° C./s. In addition, when the first average cooling rate is 30° C./s or less and the intermediate cooling temperature is lower than 500° C., structures other than austenite and martensite (for example, ferrite and bainite) are excessively formed, and thus, in a final product, 30% or more of tempered martensite and 8% or more of austenite (residual austenite) cannot be ensured. However, when the first average cooling rate is 0.1° C./s to 0.8° C./s, the intermediate cooling temperature is preferably $Ar_3°$ C. or higher and lower than 750° C. in order to ensure productivity and not to form pearlite. On the other hand, when the intermediate cooling temperature is 750° C. or higher, manufacturing cost increases and also the ferrite is not formed in some cases. In order to form the ferrite more stably, the intermediate cooling temperature is preferably 740° C. or lower, and more preferably 730° C. or lower. Accordingly, the intermediate cooling temperature is 500° C. or higher and lower than 750° C.

Next, after the first step of cooling is completed, the steel sheet is cooled to a cooling stop temperature of 100° C. or higher and lower than 350° C. from the intermediate cooling temperature at an average cooling rate of 1° C./s to 100° C./s (hereinafter, referred to as a second average cooling rate), which is higher than the above first average cooling rate (second step of cooling). The second step of cooling will be described in detail below.

In order to ensure the martensite which is necessary for obtaining 30% or more of tempered martensite in a final product, the cooling stop temperature is set to lower than 350° C. In order to ensure more tempered martensite in a final product, the cooling stop temperature is preferably 340° C. or lower, and more preferably 320° C. or lower, and still more preferably 300° C. or lower. In addition, in order to ensure austenite which is necessary for obtaining 8% or more of austenite (residual austenite) in a final product, the cooling stop temperature is set to 100° C. or higher. In order to ensure more austenite in a final product, the cooling stop temperature is preferably 120° C. or higher, and more preferably 150° C. or higher, and still more preferably 180° C. or higher. Particularly, the cooling stop temperature is further preferably set to a temperature or higher, and the temperature is lower than 100° C. of a temperature ($M_s$ point) that martensite transformation is started. Accordingly, the cooling stop temperature is 100° C. or higher and lower than 350° C. By controlling the cooling stop temperature in this manner, among austenite which was existed in a steel sheet immediately after the completion of the first step of cooling, an appropriate amount of the austenite can be transformed into martensite. In order to ensure the martensite which is necessary for obtaining of 30% or more of tempered martensite in a final product, the second average cooling rate is set to 1° C./s or more. When the second average cooling rate is less than 1° C./s, not only is productivity deteriorated but also structures other than austenite and martensite are excessively formed. In order to ensure a large amount of tempered martensite and austenite in a final product, the second average cooling rate is preferably 2° C./s or more, and more preferable 5° C./s or more, and still more preferably 10° C./s or more, and most preferably 20° C./s or more. Particularly, when the above first average cooling rate is 0.1° C./s to 0.8° C./s, it is preferable to increase the second average cooling rate as described above. In addition, to sufficiently suppress manufacturing cost (facility cost), the second average cooling rate is set to 100° C./s or less. The second average cooling rate is preferably 80° C./s or less and more preferably 50° C./s or less. Accordingly, the second average cooling rate is set to 1° C./s to 100° C./s. In addition, when the two-step cooling is performed so as to increase productivity and suppress formation of phases other than austenite and martensite as much as possible, the second average cooling rate may be higher than the first average cooling rate. In order to increase the amount of C in the austenite after the first step of cooling and after the second step of cooling and to increase the amount of the martensite and the austenite after the second step of cooling, it is preferable that a difference between the second average cooling and the first average cooling rate be large.

On the other hand, when one-step cooling is performed, from the same reason as the cooling conditions in the above-described two-step cooling, the steel sheet may be cooled to a cooling stop temperature of 100° C. or higher and lower than 350° C. at an average cooling rate of 1° C./s to 30° C./s. The condition of the one-step cooling corresponds to a case that the first average cooling rate is equal to the second average cooling rate (in this case, the intermediate cooling temperature is included in the temperature range of 500° C. or higher and lower than 750° C.) in the above conditions of the two-step cooling. The average cooling rate in the one-step cooling is preferably more than 10° C./s, and more preferably 12° C./s or more, and still more preferably 15° C./s or more, and most preferably 20° C./s or more.

In addition to each average cooling rate as described above, it is preferable that a cooling rate for every second satisfy the conditions of the above-described average cooling rates.

Further, after the above controlled cooling, the steel sheet is re-heated. Subsequently, the steel sheet is immersed into a hot dip galvanizing bath and then cooled at room temperature. In the processes after the above controlled cooling, the time when the temperature of the steel sheet is within a temperature range of 350° C. to 500° C. is controlled to be 20 seconds or more. By controlling the time to 20 seconds or more, the transformation from austenite to bainite (bainite transformation) proceeds sufficiently, and thus, the amount of C in the non-transformed austenite can be increased. As a result, the stability of the austenite is increased and 8% or more of austenite (residual austenite) can be ensured in a final product. On the other hand, when the time is less than 20 seconds, the transformation from austenite to bainite (bainite transformation) does not proceed sufficiently, and thus, the stability of the austenite is deteriorated and 8% or more of austenite (residual austenite) cannot be ensured in a final product. In order to further increase the volume fraction of the austenite, the time when the temperature of the steel sheet is within the temperature range of 350° C. to 500° C. is preferably controlled to 25 seconds or more, and more preferably controlled to 30 seconds or more. In addition, the upper limit of the time when the steel sheet is within the temperature range of 350° C. to 500° C. is not particularly limited, and for example, from the viewpoint of productivity, the upper limit may be 1000 seconds, or 500 seconds. Here, the temperature range of 350° C. to 500° C. is a temperature range where the bainite transformation is promoted at a sufficient rate. That is, in each process after the second step of cooling such as steel sheet temperature regulation before the steel sheet is immersed into the plating bath, the immersion of the steel sheet into the plating bath, and plating layer alloying treatment, the time when the temperature of the steel sheet is within the temperature range of 350° C. to 500° C. may be controlled to be 20 seconds or more in total. In order to more reliably control the time when the temperature of the steel sheet is within the temperature range of 350 to 500° C. to be 20 seconds or more, a process of holding the steel sheet in the temperature range of 350° C. to 500° C. (S30, S31, and S32) may be further added after the second step of cooling. The time when the temperature of the steel sheet is held in the temperature range of 350° C. to 500° C. in the holding process is not particularly limited, but for example, may be 20 seconds or more.

In addition, before the steel sheet is immersed into the hot dip galvanizing bath, by re-heating, the temperature of the steel sheet (sheet temperature) is controlled within a temperature range from a temperature or higher which is lower than a plating bath temperature by 40° C. to a temperature or lower which is higher than the plating bath temperature by 40° C. (S10). When the sheet temperature is lower than the plating bath temperature by 40° C. or higher, a temperature of molten zinc around the surface of the steel sheet at the time when the steel sheet is immersed into the plating bath decreases significantly and some of the molten zinc is solidified. The solidification deteriorates plating appearance and the sheet temperature by re-heating is restored to (plating bath temperature—40° C.). In addition, when the sheet temperature is higher than the plating temperature by 40° C. or higher, an operational problem is arisen during galvanizing, and thus, the sheet temperature is set to (plating bath temperature+40° C.).

After the temperature of the steel sheet is controlled in this manner, the steel is immersed into a hot dip galvanizing bath (plating bath) having molten metal which flows at a flow rate of 10 m/min to 50 m/min and is subjected to hot dip galvanizing (S11).

By setting the flow rate of the molten metal to 10 m/min to 50 m/min, it is possible to form a plating layer including an oxide while non-plating is prevented. When the flow rate of the molten metal is less than 10 m/min, a contact ratio of the molten metal in the plating bath cannot be increased by suppressing an adhesion of the oxide in the plating bath onto the surface of the steel sheet. Thus, non-plating cannot be prevented and the appearance of the plating layer is deteriorated. On the other hand, when the flow rate of the molten metal is more than 50 m/min, excessive facility investment is required for obtaining such a flow rate and also, a pattern caused by the flowing of the molten metal is generated on the plating layer. Thus, the appearance of the plating layer is deteriorated. Accordingly, the flow rate of the molten metal is set from 10 m/min to 50 m/min. As a result of controlling the flow rate of the molten metal in this manner, while suppressing the adhesion of zinc oxide in the plating bath to the surface of the steel sheet, and the zinc oxide has high chemical affinity with the oxide formed on the surface of the steel sheet, it is possible to incorporate an oxide, which is an easily oxidizable element formed on the surface of the steel sheet, in the plating layer. Therefore, it is possible to disperse the oxide in the plating layer having a good appearance.

In addition, during heating before the above-mentioned annealing, since an oxide including at least one chemical element selected from Si, Mn and Al is formed on the surface of the steel sheet, non-plating (a defect in plating, an unplated area) easily occurs after the steel sheet is drawn up from the plating bath. Here, in the plating bath, the molten metal is flowed at a flow rate of 10 m/min to 50 m/min. By allowing the molten metal (jet flow) to flow at such a flow rate, non-plating can be prevented. In addition, when the oxide is formed on the surface of the steel sheet, in a case where the plating layer is alloyed, the alloying is delayed. However, the alloying can be promoted by controlling the above flow rate of the molten metal. Here, a flow direction of the molten metal is not particularly limited, and only the flow rate of the molten metal may be limited.

In addition, the molten metal in the plating bath may be pure zinc (zinc and unavoidable impurities) or may contain Al (for example, 2 mass % or less) as the optional element or the unavoidable impurities and chemical elements such as, Fe, Mg, Mn, Si, Cr, and the like as the unavoidable impurities.

For example, when the galvannealed steel sheet is manufactured (when the alloying of the plating layer is performed), the amount of effective Al in the plating bath is preferably controlled to 0.05 mass % to 0.500 mass % so as to control the properties of the plating layer. Here, the amount of effective Al in the plating bath is a value obtained by subtracting the amount of Fe in the plating bath from the amount of Al in the plating bath.

When the amount of the effective Al is 0.05 mass % to 0.500 mass %, the plating layer having a good appearance can be obtained and productivity can be also increased sufficiently. That is, when the amount of the effective Al is 0.05 mass % or more, dross generation can be suppressed and the plating layer having a good appearance can be obtained. Further, when the amount of the effective Al is 0.500 mass % or less, the alloying can be effectively performed and thus, it is possible to increase productivity.

In the molten metal, a Zn oxide and an Al oxide are present as the unavoidable impurities. It is preferable to remove the oxides as much as possible or to suppress the reaction with the steel sheet. However, the oxides may be unavoidably mixed in the plating layer after galvanization.

Further, the steel sheet which is immersed into the plating bath is drawn up from the plating bath and is wiped as necessary. When the steel sheet is wiped, it is possible to control the amount of plating (plating deposition amount) to adhere onto the surface of the steel sheet. Although the plating deposition amount is not particularly limited, from the viewpoint of further increasing corrosion resistance, the plating deposition amount per one side of a surface is preferably 5 g/m$^2$ or more. In addition, from the viewpoint of further increasing plating adhesion, the plating deposition amount per one side of a surface is preferably 100 g/m$^2$ or less.

After subjected to hot dip galvanizing, the steel sheet is cooled to a temperature of less than 100° C. (for example, room temperature) (S12). The cooling stop temperature in the cooling is not particularly limited as long as the microstructure is stabilized, and for example, the temperature may be 0° C. or higher (for example, water temperature or room temperature or higher) from a view point of cost.

After the cooling, it is possible to obtain a hot-dip galvanized steel sheet as the plated steel sheet. In order to further increase the spot weldability and the paintability of the plated steel sheet, the obtained plated steel sheet may be subjected to alloying treatment (S20). Since Fe in the steel sheet is incorporated in the plating layer by the alloying treatment, after the cooling (S21), a galvanized steel sheet (that is, a galvannealed steel sheet) which is excellent in paintability and spot weldability can be obtained.

In this manner, when the alloying of the plating layer is performed, the plated steel sheet may be heated to 460° C. or higher. When the temperature of the alloying treatment (alloying temperature) is 460° C. or higher, the alloying is effectively performed at a high alloying rate, and thus, it is possible to sufficiently increase productivity. Meanwhile, when the alloying temperature is higher than 600° C., carbides are formed and the volume fraction of austenite is decreased in the steel in a final product. Thus, it is difficult to ensure 8% or more of austenite. Therefore, the upper limit of the alloying temperature is set to 600° C. That is, the highest temperature in the process after the second step of cooling may be limited to 600° C. or lower.

Although the basic configuration of the embodiment of the method of manufacturing a galvanized steel sheet has been described above, addition of the configuration may be made within a range not departing from the gist of the present invention. For example, upper layer plating (additional plating, for example, electro plating) may be performed on the galvanized steel sheet for the purpose of improving paintability and weldability, or various treatments (for example, chromate treatment, phosphate treatment, a treatment for improving lubrication and a treatment for improving weldability) may be performed.

In addition, for example, in order to further improving plating adhesion, the steel sheet may be subjected to plating including one of or a combination of Ni, Cu, Co, and Fe (plating including at least one chemical element selected form the elements and unavoidable impurities) between the cold rolling and the annealing. The plating is performed on purpose, but the amount of the chemical element mixed in the plating layer by the plating is small enough to be determined as an impurity.

Further, for example, the plated steel sheet that is cooled to lower than 100° C. may be subjected to skin pass rolling. The cumulative rolling reduction of the skin pass rolling is preferably 0.1% to 1.5%. When the cumulative rolling reduction is 0.1% or more, it is possible to further improve the appearance of the plated steel sheet by the skin pass, and the cumulative rolling reduction is easily controlled. Therefore, the cumulative rolling reduction is preferably 0.1% or more. When the cumulative rolling reduction is 1.5% or less, sufficient productivity can be ensured, and thus, the cumulative rolling reduction is preferably 1.5% or less. The skin pass may be may be performed at in-line or may be performed at off-line. In order to obtain a desired cumulative rolling reduction, the skin pass may be performed once or may be performed at divided into a plurality of times. Here, when an inlet thickness before an initial pass in the skin pass rolling is set as a reference, the cumulative rolling reduction is a percentage of a cumulative rolling reduction amount to the reference (a difference between an inlet thickness before an initial pass in the skin pass rolling and an outlet thickness after a final pass in the skin pass rolling).

Here, detailed methods from a process of pickling the steel sheet to a process of immersing the steel sheet into a plating bath are not particularly limited as long as the above conditions are satisfied. For example, as such methods, the Sendzimir process of "After degreasing and pickling, heating in a non-oxidizing atmosphere, annealing in the reducing atmosphere containing $H_2$ and $N_2$, then, cooling to near a plating bath temperature, and immersing in a plating bath," the total reduction furnace method of "Regulating the atmosphere during annealing, once oxidizing a steel sheet surface, then performing reduction of the surface of steel sheet (here, an oxide of an easily oxidizable element is not reduced) so as to perform cleaning of the surface of steel sheet, and thereafter immersing in a plating bath;" the flux process of "Degreasing and pickling a steel sheet, performing flux treatment using ammonium chloride or the like, and immersing in a plating bath." may be applied with changes according to each process of the embodiment as necessary.

EXAMPLES

Next, examples of the present invention will be described in detail.

The hot-rolled steel sheets obtained by hot-rolling the continuously cast slabs having chemical compositions (however, a balance includes Fe and unavoidable impurities) shown in Table 1 under the conditions of hot rolling shown in Tables 2 and 5 (in Tables, slab heating temperature and finish rolling temperature) were water-cooled in a water-cooling zone, and then, coiled at the temperature shown in Tables 2 and 5 (in Tables, coiling temperature). The thickness of the hot rolled steel sheets was 2 mm to 4.5 mm.

The hot rolled steel sheets were pickled and then cold rolled to have a thickness of 1.2 mm after cold rolling under the conditions of cold rolling shown in Tables 2 and 5 (in Tables, roll size and cold rolling reduction), and thus, cold-rolled steel sheets were formed. Then, the cold-rolled steel sheets were subjected to various heat treatments and hot dip galvanizing treatment in a continuous galvannealing line under the conditions shown in Tables 3 (the continuation of Table 2) and 6 (the continuation of Table 5).

As shown in Table 3 and 6, in the heat treatment after cold rolling, the cold-rolled steel sheets were heated so that the time when the temperature of the cold-rolled steel sheets is within a temperature range of 550° C. to 750° C. (in Table, $t_A$) is a predetermined time. Then, the cold-rolled steel sheets were annealed under predetermined annealing conditions (in Tables, annealing temperature (however, highest heating temperature), $H_2$ concentration, and dew point). Further, the cold-rolled steel sheets were cooled from the annealing temperature in Tables 3 and 6 to a predetermined intermediate cooling temperature at a primary cooling rate, and then, cooled to a predetermined cooling stop temperature at a predetermined secondary cooling rate (one-step or two-step control cooling). In addition, as shown in Tables 4 (the continuation of Table 3) and 7 (the continuation of Table 6), as necessary, the cold-rolled steel sheets were re-heated to a predetermined temperature range and held in the temperature range for a predetermined holding time.

Then, the cold-rolled steel sheets controlled to a predetermined temperature (in Tables, regulated temperature before plating) were immersed into a hot dip galvanizing bath controlled to predetermined conditions shown in Tables 4 and 7 (in Tables, plating bath temperature and plating bath flow rate), and obtained steel sheets (plated steel sheets) were cooled at room temperature. The amount of Al in the molten metal (molten zinc) in the plating bath was 0.09 mass % to 0.17 mass %. Some of the steel sheets were subjected to alloying treatment under the respective conditions (in Tables, alloying temperature) after being immersed into the hot dip galvanizing bath and the obtained steel sheets were cooled to room temperature. The plating amount (the amount of plating layer) on both surfaces at this time was about 35 $g/m^2$. Finally, the obtained steel sheets were subjected to skin pass rolling under a cumulative rolling reduction of 0.4%. Here, $t_B$ in Tables 4 and 7 represents a total of the time when the temperature of the steel sheets is 350° C. to 500° C. after control cooling is completed. In addition, with respect to product sheet types in Tables 4 and 7, "GI" represents a hot-dip galvanized steel sheet (Galvanized steel sheet) and "GA" represents a galvannealed steel sheet.

TABLE 1

| COMPOSITION NO. | CHEMICAL COMPOSITION (MASS %) | | | | | | | | | | | $Ac_3$ (° C.) | $Ar_3$ (° C.) | |
|---|---|---|---|---|---|---|---|---|---|---|---|---|---|---|
| | C | Si | Mn | P | S | Al | N | B | O | Si + Al | OTHERS | | | |
| A | 0.081 | 1.12 | 2.58 | 0.010 | 0.0030 | 0.010 | 0.0031 | 0 | 0.0024 | 1.13 | | 825 | 674 | EXAMPLE |
| B | 0.122 | 0.61 | 2.28 | 0.011 | 0.0029 | 0.490 | 0.0029 | 0 | 0.0022 | 1.10 | | 798 | 672 | EXAMPLE |
| C | 0.145 | 0.73 | 2.51 | 0.008 | 0.0033 | 0.910 | 0.0028 | 0 | 0.0020 | 1.64 | | 790 | 647 | EXAMPLE |
| D | 0.133 | 1.29 | 2.03 | 0.009 | 0.0028 | 0.011 | 0.0026 | 0 | 0.0019 | 1.30 | Cr = 0.28 | 830 | 708 | EXAMPLE |
| E | 0.128 | 1.33 | 1.92 | 0.011 | 0.0028 | 0.013 | 0.0025 | 0 | 0.0029 | 1.34 | Cr = 0.91 | 829 | 708 | EXAMPLE |
| F | 0.121 | 1.22 | 2.16 | 0.013 | 0.0032 | 0.012 | 0.0022 | 0 | 0.0023 | 1.23 | Ni = 0.33 | 829 | 703 | EXAMPLE |
| G | 0.131 | 1.41 | 2.02 | 0.011 | 0.0030 | 0.010 | 0.0029 | 0 | 0.0024 | 1.42 | Ni = 0.88 | 839 | 719 | EXAMPLE |
| H | 0.153 | 1.33 | 2.16 | 0.015 | 0.0038 | 0.013 | 0.0033 | 0 | 0.0025 | 1.34 | Mo = 0.06 | 825 | 696 | EXAMPLE |

TABLE 1-continued

| COMPOSITION NO. | CHEMICAL COMPOSITION (MASS %) | | | | | | | | | | Ac₃ (° C.) | Ar₃ (° C.) | |
|---|---|---|---|---|---|---|---|---|---|---|---|---|---|
| | C | Si | Mn | P | S | Al | N | B | O | Si + Al | OTHERS | | |
| I | 0.162 | 1.41 | 1.96 | 0.009 | 0.0030 | 0.011 | 0.0029 | 0 | 0.0022 | 1.42 | Mo = 0.21 | 833 | 715 | EXAMPLE |
| J | 0.161 | 1.32 | 2.11 | 0.013 | 0.0025 | 0.010 | 0.0027 | 0 | 0.0023 | 1.33 | Nb = 0.12 | 824 | 698 | EXAMPLE |
| K | 0.160 | 1.44 | 2.10 | 0.013 | 0.0021 | 0.009 | 0.0031 | 0 | 0.0027 | 1.45 | Ti = 0.009 | 830 | 703 | EXAMPLE |
| L | 0.140 | 1.53 | 2.11 | 0.010 | 0.0029 | 0.010 | 0.0030 | 0 | 0.0016 | 1.54 | Ti = 0.020 | 839 | 712 | EXAMPLE |
| M | 0.144 | 1.45 | 2.03 | 0.010 | 0.0030 | 0.010 | 0.0033 | 0.003 | 0.0020 | 1.46 | Ti = 0.022 | 837 | 715 | EXAMPLE |
| N | 0.171 | 1.21 | 2.33 | 0.011 | 0.0030 | 0.009 | 0.0029 | 0 | 0.0023 | 1.22 | Ca = 0.0011 | 810 | 671 | EXAMPLE |
| O | 0.151 | 1.61 | 2.22 | 0.009 | 0.0023 | 0.011 | 0.0023 | 0 | 0.0020 | 1.62 | Ni = 0.4 Cu = 0.8 | 836 | 701 | EXAMPLE |
| P | 0.161 | 1.39 | 2.19 | 0.008 | 0.0028 | 0.013 | 0.0019 | 0 | 0.0019 | 1.40 | V = 0.11 | 825 | 693 | EXAMPLE |
| Q | 0.159 | 1.55 | 2.30 | 0.009 | 0.0030 | 0.008 | 0.0021 | 0 | 0.0021 | 1.56 | REM = 0.0013 | 829 | 689 | EXAMPLE |
| R | 0.188 | 1.44 | 2.22 | 0.010 | 0.0031 | 0.010 | 0.0030 | 0 | 0.0036 | 1.45 | | 820 | 683 | EXAMPLE |
| S | 0.171 | 1.02 | 2.77 | 0.013 | 0.0025 | 0.012 | 0.0026 | 0 | 0.0023 | 1.03 | | 789 | 624 | EXAMPLE |
| T | 0.200 | 2.13 | 2.43 | 0.010 | 0.0032 | 0.011 | 0.0033 | 0 | 0.0021 | 2.14 | | 842 | 683 | EXAMPLE |
| U | 0.280 | 1.62 | 1.81 | 0.011 | 0.0027 | 0.010 | 0.0030 | 0 | 0.0031 | 1.63 | | 821 | 697 | EXAMPLE |
| V | 0.310 | 1.55 | 1.53 | 0.007 | 0.0019 | 0.051 | 0.0021 | 0 | 0.0019 | 1.60 | | 820 | 711 | EXAMPLE |
| W | 0.010 | 1.32 | 2.28 | 0.008 | 0.0020 | 0.020 | 0.0018 | 0 | 0.0022 | 1.34 | | 880 | 732 | COMPARATIVE EXAMPLE |
| X | 0.151 | 0.41 | 2.41 | 0.011 | 0.0029 | 0.060 | 0.0017 | 0 | 0.0014 | 0.47 | | 777 | 644 | COMPARATIVE EXAMPLE |
| Y | 0.188 | 3.20 | 2.30 | 0.009 | 0.0017 | 0.010 | 0.0029 | 0 | 0.0017 | 3.21 | | 896 | 734 | COMPARATIVE EXAMPLE |
| Z | 0.229 | 1.55 | 0.08 | 0.010 | 0.0022 | 0.009 | 0.0022 | 0 | 0.0017 | 1.56 | | 880 | 870 | COMPARATIVE EXAMPLE |
| AA | 0.177 | 1.39 | 3.21 | 0.012 | 0.0029 | 0.019 | 0.0019 | 0 | 0.0027 | 1.41 | | 790 | 594 | COMPARATIVE EXAMPLE |
| AB | 0.411 | 1.02 | 2.10 | 0.009 | 0.0029 | 0.031 | 0.0030 | 0 | 0.0013 | 1.05 | | 762 | 608 | COMPARATIVE EXAMPLE |

THE UNDERLINES INDICATE THAT THE VALUES DO NOT SATISFY THE CONDITIONS OF THE PRESENT INVENTION.

TABLE 2

| STEEL NO. | COMPOSITION NO. | SLAB HEATING TEMPERATURE (° C.) | FINISH ROLLING TEMPERATURE (° C.) | Ar₃ (° C.) | COILING TEMPERATURE (° C.) | ROLL SIZE (mm) | COLD ROLLING REDUCTION (%) | |
|---|---|---|---|---|---|---|---|---|
| A-1 | A | 1230 | 890 | 674 | 550 | 1100 | 45 | EXAMPLE |
| A-2 | A | 1220 | 930 | 674 | 710 | 1100 | 55 | COMPARATIVE EXAMPLE |
| A-3 | A | 1250 | 950 | 674 | 550 | 1100 | 55 | COMPARATIVE EXAMPLE |
| A-4 | A | 1230 | 890 | 674 | 560 | 1100 | 50 | COMPARATIVE EXAMPLE |
| A-5 | A | 1200 | 890 | 674 | 600 | 1100 | 60 | COMPARATIVE EXAMPLE |
| A-6 | A | 1200 | 910 | 674 | 550 | 1100 | 45 | COMPARATIVE EXAMPLE |
| A-7 | A | 1250 | 930 | 674 | 550 | 1100 | 55 | COMPARATIVE EXAMPLE |
| A-8 | A | 1210 | 930 | 674 | 550 | 1100 | 55 | COMPARATIVE EXAMPLE |
| A-9 | A | 1230 | 940 | 674 | 570 | 1100 | 45 | EXAMPLE |
| A-10 | A | 1260 | 950 | 674 | 580 | 1100 | 58 | COMPARATIVE EXAMPLE |
| A-11 | A | 1170 | 900 | 674 | 640 | 1700 | 50 | COMPARATIVE EXAMPLE |
| A-12 | A | 1200 | 980 | 674 | 600 | 1100 | 50 | COMPARATIVE EXAMPLE |
| A-13 | A | 1210 | 870 | 674 | 520 | 1100 | 50 | COMPARATIVE EXAMPLE |
| B-1 | B | 1220 | 890 | 672 | 580 | 600 | 55 | EXAMPLE |
| B-2 | B | 1200 | 930 | 672 | 630 | 600 | 45 | EXAMPLE |
| B-3 | B | 1250 | 970 | 672 | 550 | 600 | 45 | COMPARATIVE EXAMPLE |
| B-4 | B | 1210 | 1020 | 672 | 510 | 600 | 55 | COMPARATIVE EXAMPLE |
| B-5 | B | 1230 | 960 | 672 | 490 | 600 | 58 | EXAMPLE |
| B-6 | B | 1190 | 890 | 672 | 640 | 1700 | 40 | COMPARATIVE EXAMPLE |
| B-7 | B | 1220 | 920 | 672 | 540 | 800 | 50 | COMPARATIVE EXAMPLE |
| C-1 | C | 1260 | 960 | 647 | 550 | 800 | 45 | EXAMPLE |
| C-2 | C | 1220 | 930 | 647 | 510 | 800 | 45 | EXAMPLE |
| C-3 | C | 1200 | 930 | 647 | 580 | 800 | 45 | COMPARATIVE EXAMPLE |
| C-4 | C | 1220 | 940 | 647 | 570 | 800 | 45 | COMPARATIVE EXAMPLE |
| D-1 | D | 1250 | 950 | 708 | 580 | 800 | 58 | EXAMPLE |
| D-2 | D | 1230 | 890 | 708 | 580 | 800 | 55 | EXAMPLE |
| E-1 | E | 1200 | 890 | 708 | 600 | 800 | 60 | EXAMPLE |
| E-2 | E | 1200 | 910 | 708 | 550 | 800 | 45 | EXAMPLE |
| E-3 | E | 1250 | 930 | 708 | 730 | 1700 | 45 | COMPARATIVE EXAMPLE |
| E-4 | E | 1210 | 870 | 708 | 550 | 1100 | 45 | EXAMPLE |
| F-1 | F | 1230 | 1020 | 703 | 510 | 1100 | 55 | EXAMPLE |
| F-2 | F | 1210 | 950 | 703 | 580 | 1100 | 58 | EXAMPLE |
| G-1 | G | 1210 | 890 | 719 | 580 | 1100 | 55 | EXAMPLE |
| G-2 | G | 1230 | 890 | 719 | 600 | 1100 | 60 | EXAMPLE |
| G-3 | G | 1220 | 910 | 719 | 550 | 1100 | 45 | COMPARATIVE EXAMPLE |
| G-4 | G | 1200 | 940 | 719 | 570 | 1100 | 45 | EXAMPLE |

TABLE 2-continued

| STEEL NO. | COMPOSITION NO. | SLAB HEATING TEMPERATURE (° C.) | FINISH ROLLING TEMPERATURE (° C.) | Ar₃ (° C.) | COILING TEMPERATURE (° C.) | ROLL SIZE (mm) | COLD ROLLING REDUCTION (%) | |
|---|---|---|---|---|---|---|---|---|
| H-1 | H | 1230 | 950 | 696 | 580 | 1100 | 58 | EXAMPLE |
| H-2 | H | 1220 | 910 | 696 | 510 | 1100 | 55 | EXAMPLE |
| I-1 | I | 1210 | 920 | 715 | 570 | 1100 | 55 | EXAMPLE |
| I-2 | I | 1250 | 930 | 715 | 550 | 1100 | 45 | EXAMPLE |
| I-3 | I | 1250 | 920 | 715 | 550 | 1100 | 50 | EXAMPLE |
| J-1 | J | 1220 | 950 | 698 | 510 | 1100 | 55 | EXAMPLE |
| K-1 | K | 1230 | 960 | 703 | 540 | 1100 | 55 | EXAMPLE |
| K-2 | K | 1200 | 960 | 703 | 550 | 1100 | 45 | EXAMPLE |
| K-3 | K | 1250 | 930 | 703 | 560 | 1100 | 55 | EXAMPLE |
| K-4 | K | 1250 | 930 | 703 | 560 | 1100 | 55 | EXAMPLE |

THE UNDERLINES INDICATE THAT THE VALUES DO NOT SATISFY THE CONDITIONS OF THE PRESENT INVENTION.

TABLE 3

| STEEL NO. | $t_4$ (s) | ANNEALING TEMPERATURE (° C.) | H₂ CONCEN-TRATION (%) | DEW POINT (° C.) | PRIMARY COOLING RATE (° C./s) | INTERMEDIATE COOLING TEMPERATURE (° C.) | SECONDARY COOLING RATE (° C./s) | COOLING STOP TEMPERATURE (° C.) | |
|---|---|---|---|---|---|---|---|---|---|
| A-1 | 30 | 820 | 5 | 6 | 2 | 700 | 45 | 220 | EXAMPLE |
| A-2 | 25 | 820 | 5 | 3 | 2 | 710 | 45 | 440 | COMPARATIVE EXAMPLE |
| A-3 | 30 | 730 | 4 | -2 | 10 | 620 | 20 | 230 | COMPARATIVE EXAMPLE |
| A-4 | 35 | 780 | 8 | 10 | 2 | 480 | 50 | 250 | COMPARATIVE EXAMPLE |
| A-5 | 20 | 880 | 2 | 8 | 20 | 700 | 40 | 190 | COMPARATIVE EXAMPLE |
| A-6 | 25 | 790 | 8 | 7 | 20 | 650 | 80 | 220 | COMPARATIVE EXAMPLE |
| A-7 | 10 | 780 | 8 | -8 | 5 | 700 | 20 | 240 | COMPARATIVE EXAMPLE |
| A-8 | 24 | 820 | 10 | 12 | 2 | 650 | 40 | 400 | COMPARATIVE EXAMPLE |
| A-9 | 31 | 830 | 6 | 7 | 5 | 630 | 30 | 180 | EXAMPLE |
| A-10 | 30 | 820 | 7 | 6 | 15 | 650 | 60 | 420 | COMPARATIVE EXAMPLE |
| A-11 | 25 | 810 | 4 | 5 | 2 | 700 | 50 | 220 | COMPARATIVE EXAMPLE |
| A-12 | 350 | 860 | 3 | 8 | 0.2 | 680 | 0.2 | 250 | COMPARATIVE EXAMPLE |
| A-13 | 400 | 820 | 2 | 1 | 2 | 700 | 20 | 25 | COMPARATIVE EXAMPLE |
| B-1 | 25 | 850 | 2 | 3 | 2 | 720 | 45 | 250 | EXAMPLE |
| B-2 | 35 | 800 | 9 | -2 | 5 | 700 | 70 | 225 | EXAMPLE |
| B-3 | 25 | 710 | 10 | 4 | 10 | 600 | 30 | 250 | COMPARATIVE EXAMPLE |
| B-4 | 25 | 850 | 12 | -1 | 3 | 750 | 40 | 275 | COMPARATIVE EXAMPLE |
| B-5 | 35 | 850 | 14 | -6 | 2 | 750 | 50 | 190 | EXAMPLE |
| B-6 | 35 | 800 | 3 | 5 | 30 | 700 | 40 | 200 | COMPARATIVE EXAMPLE |
| B-7 | 120 | 820 | 3 | 5 | 0.2 | 720 | 0.2 | 200 | COMPARATIVE EXAMPLE |
| C-1 | 30 | 850 | 6 | 7 | 10 | 730 | 50 | 225 | EXAMPLE |
| C-2 | 20 | 850 | 11 | 7 | 4 | 700 | 40 | 250 | EXAMPLE |
| C-3 | 25 | 860 | 2 | -8 | 10 | 480 | 30 | 190 | COMPARATIVE EXAMPLE |
| C-4 | 10 | 860 | 7 | 12 | 5 | 720 | 45 | 520 | COMPARATIVE EXAMPLE |
| D-1 | 26 | 830 | 8 | 7 | 20 | 730 | 45 | 225 | EXAMPLE |
| D-2 | 25 | 840 | 8 | 6 | 10 | 660 | 45 | 225 | EXAMPLE |
| E-1 | 32 | 820 | 4 | -1 | 10 | 650 | 45 | 210 | EXAMPLE |
| E-2 | 30 | 860 | 3 | -6 | 20 | 650 | 60 | 230 | EXAMPLE |
| E-3 | 27 | 850 | 5 | 7 | 5 | 750 | 45 | 210 | COMPARATIVE EXAMPLE |
| E-4 | 24 | 800 | 5 | 6 | 5 | 700 | 50 | 230 | EXAMPLE |
| F-1 | 31 | 830 | 3 | 5 | 2 | 680 | 45 | 220 | EXAMPLE |
| F-2 | 30 | 850 | 4 | 8 | 10 | 700 | 40 | 220 | EXAMPLE |
| G-1 | 25 | 830 | 6 | 1 | 5 | 730 | 30 | 230 | EXAMPLE |
| G-2 | 30 | 790 | 1 | 3 | 20 | 650 | 50 | 225 | EXAMPLE |
| G-3 | 20 | 850 | 1 | -2 | 5 | 730 | 50 | 200 | COMPARATIVE |

TABLE 3-continued

| STEEL NO. | $t_4$ (s) | ANNEALING TEMPERATURE (° C.) | $H_2$ CONCEN-TRATION (%) | DEW POINT (° C.) | PRIMARY COOLING RATE (° C./s) | INTERMEDIATE COOLING TEMPERATURE (° C.) | SECONDARY COOLING RATE (° C./s) | COOLING STOP TEMPERATURE (° C.) | |
|---|---|---|---|---|---|---|---|---|---|
| | | | | | | | | | EXAMPLE |
| G-4 | 25 | 830 | 12 | 4 | 5 | 710 | 20 | 220 | EXAMPLE |
| H-1 | 30 | 830 | 3 | 1 | 5 | 730 | 50 | 230 | EXAMPLE |
| H-2 | 27 | 810 | 3 | 3 | 5 | 710 | 60 | 200 | EXAMPLE |
| I-1 | 27 | 830 | 5 | −2 | 5 | 730 | 40 | 190 | EXAMPLE |
| I-2 | 24 | 840 | 3 | 5 | 10 | 700 | 60 | 220 | EXAMPLE |
| I-3 | 30 | 780 | 5 | 7 | 5 | 620 | 50 | 230 | EXAMPLE |
| J-1 | 25 | 800 | 4 | 7 | 15 | 650 | 45 | 225 | EXAMPLE |
| K-1 | 30 | 850 | 6 | −8 | 20 | 650 | 45 | 220 | EXAMPLE |
| K-2 | 30 | 880 | 7 | 12 | 10 | 700 | 50 | 230 | EXAMPLE |
| K-3 | 27 | 830 | 8 | 12 | 10 | 710 | 45 | 200 | EXAMPLE |
| K-4 | 27 | 830 | 8 | 12 | 24 | 550 | 24 | 200 | EXAMPLE |

THE UNDERLINES INDICATE THAT THE VALUES DO NOT SATISFY THE CONDITIONS OF THE PRESENT INVENTION.

TABLE 4

| STEEL NO. | HOLDING TEMPERATURE (° C.) | HOLD-ING TIME (s) | REGULATED TEMPERATURE BEFORE PLATING (° C.) | PLATING BATH TEMPERATURE (° C.) | PLATING BATH FLOW RATE (m/min) | ALLOYING TEMPERATURE (° C.) | $t_s$ (s) | PRODUCT SHEET TYPE | |
|---|---|---|---|---|---|---|---|---|---|
| A-1 | 400 | 50 | 480 | 470 | 20 | — | 70 | GI | EXAMPLE |
| A-2 | 380 | 90 | 480 | 460 | 40 | — | 110 | GI | COMPARATIVE EXAMPLE |
| A-3 | 360 | 200 | 470 | 460 | 30 | — | 220 | GI | COMPARATIVE EXAMPLE |
| A-4 | 430 | 175 | 490 | 460 | 35 | — | 200 | GI | COMPARATIVE EXAMPLE |
| A-5 | 300 | 100 | 480 | 460 | 35 | — | 13 | GI | COMPARATIVE EXAMPLE |
| A-6 | 530 | 100 | 480 | 460 | 35 | — | 18 | GI | COMPARATIVE EXAMPLE |
| A-7 | 450 | 10 | 470 | 460 | 20 | — | 15 | GI | COMPARATIVE EXAMPLE |
| A-8 | 400 | 60 | 460 | 460 | 5 | — | 85 | GI | COMPARATIVE EXAMPLE |
| A-9 | 380 | 150 | 450 | 440 | 20 | 470 | 160 | GA | EXAMPLE |
| A-10 | 420 | 85 | 460 | 450 | 20 | 540 | 95 | GA | COMPARATIVE EXAMPLE |
| A-11 | 395 | 490 | 470 | 460 | 20 | 620 | 550 | GA | COMPARATIVE EXAMPLE |
| A-12 | 420 | 100 | 480 | 460 | 20 | 490 | 125 | GA | COMPARATIVE EXAMPLE |
| A-13 | 375 | 250 | 480 | 460 | 20 | 470 | 275 | GA | COMPARATIVE EXAMPLE |
| B-1 | 400 | 25 | 470 | 460 | 30 | — | 40 | GI | EXAMPLE |
| B-2 | 420 | 175 | 460 | 460 | 30 | — | 225 | GI | EXAMPLE |
| B-3 | 440 | 200 | 460 | 460 | 20 | — | 225 | GI | COMPARATIVE EXAMPLE |
| B-4 | 380 | 250 | 450 | 460 | 3 | — | 270 | GI | COMPARATIVE EXAMPLE |
| B-5 | 360 | 400 | 460 | 460 | 25 | 520 | 420 | GA | EXAMPLE |
| B-6 | 360 | 200 | 470 | 450 | 25 | 480 | 210 | GA | COMPARATIVE EXAMPLE |
| B-7 | 400 | 400 | 460 | 460 | 25 | 470 | 410 | GA | COMPARATIVE EXAMPLE |
| C-1 | 400 | 300 | 490 | 460 | 20 | — | 325 | GI | EXAMPLE |
| C-2 | 400 | 370 | 480 | 460 | 20 | 520 | 375 | GI | EXAMPLE |
| C-3 | 420 | 100 | 480 | 460 | 10 | — | 125 | GI | COMPARATIVE EXAMPLE |
| C-4 | 520 | 50 | 470 | 460 | 10 | — | 15 | GI | COMPARATIVE EXAMPLE |
| D-1 | 410 | 175 | 480 | 460 | 30 | — | 200 | GI | EXAMPLE |
| D-2 | 390 | 275 | 420 | 460 | 20 | 480 | 300 | GA | EXAMPLE |
| E-1 | 400 | 275 | 490 | 460 | 20 | — | 300 | GI | EXAMPLE |
| E-2 | 400 | 200 | 480 | 450 | 30 | — | 250 | GI | EXAMPLE |
| E-3 | 380 | 80 | 480 | 460 | 20 | — | 150 | GI | COMPARATIVE EXAMPLE |
| E-4 | 420 | 150 | 470 | 460 | 30 | 480 | 175 | GA | EXAMPLE |
| F-1 | 410 | 275 | 460 | 460 | 20 | — | 300 | GI | EXAMPLE |
| F-2 | 410 | 275 | 470 | 460 | 30 | 540 | 280 | GA | EXAMPLE |

TABLE 4-continued

| STEEL NO. | HOLDING TEMPERATURE (° C.) | HOLDING TIME (s) | REGULATED TEMPERATURE BEFORE PLATING (° C.) | PLATING BATH TEMPERATURE (° C.) | PLATING BATH FLOW RATE (m/min) | ALLOYING TEMPERATURE (° C.) | $t_s$ (s) | PRODUCT SHEET TYPE | |
|---|---|---|---|---|---|---|---|---|---|
| G-1 | 410 | 375 | 480 | 460 | 20 | — | 380 | GI | EXAMPLE |
| G-2 | 400 | 275 | 480 | 480 | 20 | — | 285 | GI | EXAMPLE |
| G-3 | 340 | 340 | 470 | 460 | 20 | — | 18 | GI | COMPARATIVE EXAMPLE |
| G-4 | 400 | 275 | 480 | 480 | 35 | 520 | 300 | GA | EXAMPLE |
| H-1 | 420 | 250 | 480 | 460 | 25 | — | 275 | GI | EXAMPLE |
| H-2 | 410 | 375 | 470 | 460 | 25 | 540 | 400 | GA | EXAMPLE |
| I-1 | 390 | 250 | 460 | 460 | 30 | — | 275 | GI | EXAMPLE |
| I-2 | 390 | 250 | 460 | 460 | 30 | — | 275 | GI | EXAMPLE |
| I-3 | 400 | 250 | 450 | 460 | 30 | — | 275 | GI | EXAMPLE |
| J-1 | 380 | 325 | 460 | 460 | 25 | 530 | 350 | GA | EXAMPLE |
| K-1 | 410 | 300 | 470 | 450 | 30 | — | 350 | GI | EXAMPLE |
| K-2 | 410 | 275 | 460 | 440 | 35 | — | 325 | GI | EXAMPLE |
| K-3 | 390 | 275 | 490 | 460 | 30 | 540 | 325 | GA | EXAMPLE |
| K-4 | 390 | 275 | 490 | 460 | 30 | 540 | 300 | GA | EXAMPLE |

THE UNDERLINES INDICATE THAT THE VALUES DO NOT SATISFY THE CONDITIONS OF THE PRESENT INVENTION.

TABLE 5

| STEEL NO. | COMPOSITION NO. | SLAB HEATING TEMPERATURE (° C.) | FINISH ROLLING TEMPERATURE (° C.) | $Ar_3$ (° C.) | COILING TEMPERATURE (° C.) | ROLL SIZE (mm) | COLD ROLLING REDUCTION (%) | |
|---|---|---|---|---|---|---|---|---|
| L-1 | L | 1230 | 940 | 712 | 550 | 1100 | 45 | EXAMPLE |
| L-2 | L | 1210 | 950 | 712 | 510 | 1100 | 55 | EXAMPLE |
| M-1 | M | 1230 | 910 | 715 | 490 | 1100 | 55 | EXAMPLE |
| M-2 | M | 1230 | 940 | 715 | 550 | 1100 | 45 | EXAMPLE |
| M-3 | M | 1220 | 950 | 715 | 510 | 1100 | 58 | COMPARATIVE EXAMPLE |
| N-1 | N | 1210 | 930 | 671 | 570 | 1100 | 55 | EXAMPLE |
| N-2 | N | 1200 | 920 | 671 | 600 | 1100 | 60 | EXAMPLE |
| O-1 | O | 1250 | 960 | 701 | 520 | 1100 | 55 | EXAMPLE |
| P-1 | P | 1230 | 960 | 693 | 520 | 1100 | 55 | EXAMPLE |
| Q-1 | Q | 1230 | 930 | 689 | 510 | 1100 | 45 | EXAMPLE |
| R-1 | R | 1220 | 950 | 683 | 550 | 1100 | 60 | EXAMPLE |
| R-2 | R | 1250 | 960 | 683 | 580 | 1100 | 45 | EXAMPLE |
| R-3 | R | 1210 | 1020 | 683 | 510 | 1100 | 45 | EXAMPLE |
| R-4 | R | 1230 | 950 | 683 | <u>710</u> | 1100 | 45 | COMPARATIVE EXAMPLE |
| R-5 | R | 1230 | 940 | 683 | 600 | 1100 | 45 | COMPARATIVE EXAMPLE |
| R-6 | R | 1230 | 950 | 683 | 630 | 1100 | 58 | COMPARATIVE EXAMPLE |
| R-7 | R | 1200 | 950 | 683 | 570 | 1100 | 55 | COMPARATIVE EXAMPLE |
| R-8 | R | 1230 | 940 | 683 | 600 | 1100 | <u>27</u> | COMPARATIVE EXAMPLE |
| S-1 | S | 1260 | 890 | 624 | 550 | 1100 | 55 | EXAMPLE |
| S-2 | S | 1220 | 930 | 624 | 510 | 1100 | 58 | EXAMPLE |
| T-1 | T | 1250 | 940 | 683 | 580 | 1100 | 45 | EXAMPLE |
| T-2 | T | 1220 | 950 | 683 | 580 | 1100 | 45 | EXAMPLE |
| T-3 | T | 1230 | 890 | 683 | 540 | 1100 | 45 | COMPARATIVE EXAMPLE |
| T-4 | T | 1260 | 930 | 683 | 550 | 1100 | 45 | EXAMPLE |
| T-5 | T | 1230 | 940 | 683 | 510 | 1100 | 58 | EXAMPLE |
| U-1 | U | 1230 | 950 | 697 | 570 | 1100 | 55 | EXAMPLE |
| U-2 | U | 1200 | 950 | 697 | 550 | 1100 | 45 | EXAMPLE |
| U-3 | U | 1230 | 940 | 697 | 560 | 1100 | 55 | EXAMPLE |
| U-4 | U | 1200 | 950 | 697 | 580 | 1100 | 45 | EXAMPLE |
| V-1 | V | 1250 | 940 | 711 | 510 | 1100 | 45 | EXAMPLE |
| V-2 | V | 1230 | 950 | 711 | 550 | 1100 | 55 | EXAMPLE |
| V-3 | V | 1210 | 930 | 711 | 510 | 1100 | 45 | EXAMPLE |
| V-4 | V | 1230 | 920 | 711 | 570 | 1100 | 45 | EXAMPLE |
| V-5 | V | 1230 | 950 | 711 | 600 | 1100 | 55 | EXAMPLE |
| V-6 | V | 1220 | 1020 | 711 | 540 | 1100 | 55 | EXAMPLE |
| W-1 | <u>W</u> | 1230 | 940 | 732 | 550 | 800 | 55 | COMPARATIVE EXAMPLE |
| X-1 | <u>X</u> | 1200 | 950 | 644 | 510 | 1100 | 45 | COMPARATIVE EXAMPLE |
| Y-1 | <u>Y</u> | 1250 | 890 | 734 | 490 | 800 | 45 | COMPARATIVE EXAMPLE |
| Z-1 | <u>Z</u> | 1230 | 1000 | 870 | 550 | 700 | 45 | COMPARATIVE EXAMPLE |
| AA-1 | <u>AA</u> | 1210 | 910 | 594 | 550 | 800 | 55 | COMPARATIVE EXAMPLE |
| AB-1 | <u>AB</u> | 1200 | 920 | 608 | 550 | 1100 | 55 | COMPARATIVE EXAMPLE |

THE UNDERLINES INDICATE THAT THE VALUES DO NOT SATISFY THE CONDITIONS OF THE PRESENT INVENTION.

TABLE 6

| STEEL NO. | $t_4$ (s) | ANNEALING TEMPERATURE (° C.) | $H_2$ CONCENTRATION (%) | DEW POINT (° C.) | PRIMARY COOLING RATE (° C./s) | INTERMEDIATE COOLING TEMPERATURE (° C.) | SECONDARY COOLING RATE (° C./s) | COOLING STOP TEMPERATURE (° C.) | |
|---|---|---|---|---|---|---|---|---|---|
| L-1 | 30 | 870 | 10 | 7 | 10 | 720 | 60 | 190 | EXAMPLE |
| L-2 | 32 | 860 | 5 | 6 | 10 | 700 | 40 | 230 | EXAMPLE |
| M-1 | 30 | 860 | 4 | -1 | 15 | 720 | 40 | 220 | EXAMPLE |
| M-2 | 27 | 850 | 4 | -6 | 5 | 720 | 45 | 230 | EXAMPLE |
| M-3 | <u>5</u> | 860 | 8 | 3 | 10 | 710 | 40 | 210 | COMPARATIVE EXAMPLE |
| N-1 | 30 | 840 | 5 | -2 | 15 | 710 | 45 | 225 | EXAMPLE |
| N-2 | 27 | 840 | 7 | 5 | 15 | 710 | 40 | 220 | EXAMPLE |
| O-1 | 27 | 830 | 4 | 7 | 2 | 710 | 40 | 230 | EXAMPLE |
| P-1 | 30 | 850 | 7 | 12 | 4 | 700 | 45 | 220 | EXAMPLE |
| Q-1 | 27 | 850 | 5 | 7 | 2 | 730 | 50 | 230 | EXAMPLE |
| R-1 | 24 | 880 | 6 | 6 | 2 | 750 | 45 | 225 | EXAMPLE |
| R-2 | 30 | 850 | 1 | -1 | 10 | 690 | 80 | 210 | EXAMPLE |
| R-3 | 20 | 850 | 2 | -6 | 3 | 710 | 30 | 230 | EXAMPLE |
| R-4 | 30 | 870 | 11 | 8 | 2 | 700 | 45 | 190 | COMPARATIVE EXAMPLE |
| R-5 | 27 | <u>730</u> | 5 | 1 | 10 | 580 | 50 | 200 | COMPARATIVE EXAMPLE |
| R-6 | <u>10</u> | 840 | 5 | 3 | 5 | 690 | 45 | 200 | COMPARATIVE EXAMPLE |
| R-7 | 30 | 840 | 4 | -2 | 10 | 700 | 35 | 280 | COMPARATIVE EXAMPLE |
| R-8 | 30 | 870 | 6 | 4 | 2 | 700 | 45 | 190 | COMPARATIVE EXAMPLE |
| S-1 | 30 | 820 | 4 | -1 | 10 | 690 | 50 | 220 | EXAMPLE |
| S-2 | 30 | 850 | 4 | -6 | 5 | 700 | 50 | 180 | EXAMPLE |
| T-1 | 32 | 870 | 5 | 5 | 20 | 730 | 50 | 230 | EXAMPLE |
| T-2 | 30 | 880 | 6 | 7 | 10 | 710 | 40 | 240 | EXAMPLE |
| T-3 | <u>15</u> | <u>730</u> | 4 | 8 | 10 | 600 | 45 | 250 | COMPARATIVE EXAMPLE |
| T-4 | 27 | 870 | 6 | -1 | 2 | 750 | 45 | 225 | EXAMPLE |
| T-5 | 25 | 890 | 9 | -6 | 4 | 710 | 45 | 220 | EXAMPLE |
| U-1 | 30 | 800 | 9 | -1 | 5 | 700 | 50 | 210 | EXAMPLE |
| U-2 | 30 | 780 | 4 | -6 | 2 | 710 | 50 | 230 | EXAMPLE |
| U-3 | 27 | 850 | 5 | 8 | 10 | 680 | 55 | 210 | EXAMPLE |
| U-4 | 30 | 760 | 7 | 1 | 2 | 700 | 50 | 200 | EXAMPLE |
| V-1 | 240 | 850 | 6 | 3 | 2 | 750 | 55 | 230 | EXAMPLE |
| V-2 | 30 | 820 | 12 | 12 | 5 | 650 | 50 | 230 | EXAMPLE |
| V-3 | 20 | 800 | 5 | 12 | 5 | 620 | 45 | 260 | EXAMPLE |
| V-4 | 30 | 760 | 10 | 7 | 2 | 690 | 50 | 240 | EXAMPLE |
| V-5 | 30 | 820 | 4 | 6 | 2 | 700 | 50 | 220 | EXAMPLE |
| V-6 | 24 | 840 | 6 | -1 | 2 | 700 | 45 | 220 | EXAMPLE |
| W-1 | 30 | 850 | 7 | -6 | 5 | 700 | 50 | 220 | COMPARATIVE EXAMPLE |
| X-1 | 30 | 850 | 2 | 1 | 5 | 700 | 45 | 240 | COMPARATIVE EXAMPLE |
| Y-1 | 30 | 840 | 2 | 3 | 2 | 730 | 45 | 250 | COMPARATIVE EXAMPLE |
| Z-1 | 27 | 850 | 5 | 12 | 5 | 700 | 45 | 230 | COMPARATIVE EXAMPLE |
| AA-1 | 25 | 840 | 3 | 12 | 2 | 720 | 50 | 160 | COMPARATIVE EXAMPLE |
| AB-1 | 30 | 840 | 2 | 5 | 3 | 720 | 40 | 300 | COMPARATIVE EXAMPLE |

THE UNDERLINES INDICATE THAT THE VALUES DO NOT SATISFY THE CONDITIONS OF THE PRESENT INVENTION.

TABLE 7

| STEEL NO. | HOLDING TEMPERATURE (° C.) | HOLDING TIME (s) | REGULATED TEMPERATURE BEFORE PLATING (° C.) | PLATING BATH TEMPERATURE (° C.) | PLATING BATH FLOW RATE (m/min) | ALLOYING TEMPERATURE (° C.) | $t_B$ (s) | PRODUCT SHEET TYPE | |
|---|---|---|---|---|---|---|---|---|---|
| L-1 | 400 | 100 | 480 | 460 | 10 | — | 150 | GI | EXAMPLE |
| L-2 | 420 | 375 | 470 | 460 | 25 | — | 400 | GI | EXAMPLE |
| M-1 | 410 | 250 | 460 | 460 | 25 | — | 275 | GI | EXAMPLE |
| M-2 | 400 | 275 | 480 | 460 | 30 | — | 300 | GI | EXAMPLE |
| M-3 | 420 | 15 | 470 | 460 | 20 | — | <u>18</u> | GI | COMPARATIVE EXAMPLE |
| N-1 | 410 | 175 | 460 | 460 | 20 | — | 200 | GI | EXAMPLE |
| N-2 | 400 | 175 | 480 | 460 | 20 | 530 | 200 | GA | EXAMPLE |

TABLE 7-continued

| STEEL NO. | HOLDING TEMPERATURE (° C.) | HOLDING TIME (s) | REGULATED TEMPERATURE BEFORE PLATING (° C.) | PLATING BATH TEMPERATURE (° C.) | PLATING BATH FLOW RATE (m/min) | ALLOYING TEMPERATURE (° C.) | $t_B$ (s) | PRODUCT SHEET TYPE | |
|---|---|---|---|---|---|---|---|---|---|
| O-1 | 400 | 200 | 470 | 460 | 30 | 470 | 225 | GA | EXAMPLE |
| P-1 | 370 | 225 | 480 | 460 | 20 | — | 250 | GI | EXAMPLE |
| Q-1 | 360 | 200 | 420 | 460 | 10 | — | 225 | GI | EXAMPLE |
| R-1 | 410 | 275 | 490 | 460 | 20 | — | 300 | GI | EXAMPLE |
| R-2 | 400 | 375 | 480 | 460 | 25 | — | 400 | GI | EXAMPLE |
| R-3 | 420 | 300 | 480 | 460 | 35 | 550 | 325 | GA | EXAMPLE |
| R-4 | 410 | 400 | 470 | 460 | 20 | — | 450 | GI | COMPARATIVE EXAMPLE |
| R-5 | 380 | 250 | 460 | 460 | 30 | — | 275 | GI | COMPARATIVE EXAMPLE |
| R-6 | 400 | 10 | 460 | 460 | <u>5</u> | — | <u>14</u> | GI | COMPARATIVE EXAMPLE |
| R-7 | — | — | 490 | 460 | 20 | 530 | <u>16</u> | GA | COMPARATIVE EXAMPLE |
| R-8 | 410 | 400 | 470 | 450 | 20 | — | 425 | GI | COMPARATIVE EXAMPLE |
| S-1 | 420 | 120 | 480 | 460 | 25 | — | 155 | GI | EXAMPLE |
| S-2 | 400 | 120 | 470 | 460 | 25 | — | 150 | GI | EXAMPLE |
| T-1 | 390 | 250 | 460 | 460 | 20 | — | 300 | GI | EXAMPLE |
| T-2 | 410 | 275 | 480 | 460 | 15 | — | 300 | GI | EXAMPLE |
| T-3 | 400 | 175 | 470 | 460 | 35 | — | 200 | GI | COMPARATIVE EXAMPLE |
| T-4 | 380 | 175 | 480 | 460 | 20 | 540 | 200 | GA | EXAMPLE |
| T-5 | 400 | 275 | 470 | 460 | 40 | 470 | 300 | GA | EXAMPLE |
| U-1 | 410 | 250 | 480 | 450 | 20 | — | 275 | GI | EXAMPLE |
| U-2 | 390 | 125 | 480 | 470 | 25 | — | 150 | GI | EXAMPLE |
| U-3 | 400 | 250 | 470 | 460 | 30 | — | 275 | GI | EXAMPLE |
| U-4 | 400 | 125 | 480 | 460 | 35 | — | 150 | GI | EXAMPLE |
| V-1 | 380 | 250 | 470 | 460 | 25 | — | 275 | GI | EXAMPLE |
| V-2 | 400 | 350 | 460 | 460 | 25 | — | 400 | GI | EXAMPLE |
| V-3 | 390 | 250 | 480 | 460 | 35 | — | 275 | GI | EXAMPLE |
| V-4 | 400 | 300 | 470 | 460 | 20 | — | 325 | GI | EXAMPLE |
| V-5 | 400 | 250 | 480 | 450 | 30 | — | 275 | GI | EXAMPLE |
| V-6 | 390 | 250 | 420 | 460 | 30 | 500 | 300 | GA | EXAMPLE |
| W-1 | 420 | 300 | 490 | 460 | 25 | — | 325 | GI | COMPARATIVE EXAMPLE |
| X-1 | 400 | 250 | 480 | 460 | 25 | — | 275 | GI | COMPARATIVE EXAMPLE |
| Y-1 | 370 | 100 | 480 | 460 | 30 | — | 150 | GI | COMPARATIVE EXAMPLE |
| Z-1 | 440 | 300 | 470 | 460 | 35 | — | 325 | GI | COMPARATIVE EXAMPLE |
| AA-1 | 400 | 275 | 460 | 460 | 30 | — | 300 | GI | COMPARATIVE EXAMPLE |
| AB-1 | 400 | 100 | 470 | 460 | 30 | — | 125 | GI | COMPARATIVE EXAMPLE |

THE UNDERLINES INDICATE THAT THE VALUES DO NOT SATISFY THE CONDITIONS OF THE PRESENT INVENTION.

In the tensile test, JIS No. 5 test pieces were cut out from the steel sheets having a thickness of 1.2 mm in a right angle direction of the rolling direction and parallel to the rolling direction to evaluate tensile properties. Each of five test pieces was subjected to a tensile test according to JIS Z 2241 (2011) and an average value of the respective values (yield strength, tensile strength, and total elongation of each of five test pieces) was obtained to calculate yield strength (YS), tensile strength (TS), total elongation (El), and yield ratio (YR) from the average value. Here, the yield ratio (YR) can be obtained by dividing the yield strength (YS) by the tensile strength (TS).

In addition, a hole expansion ratio (λ) was defined by a hole expansion test according to the Japan Iron and Steel Federation Standard JFS T 1001.

Here, when a balance index (TS×El) of the tensile strength (TS) and the total elongation (El) is more than 16000 (MPa×%), the elongation was evaluated to be excellent. When a balance index (TS×λ) of the tensile strength (TS) and the hole expansion ratio (λ) is more than 40000 (MPa×%), the hole expansibility was evaluated to be excellent.

A solution obtained by dissolving the plating layers of the plated steel sheets using a 5% aqueous HCl solution to which an inhibitor was added and removing a residue such as an undissolved oxide was subjected to ICP emission analysis to measure the amount of Fe in the plating layers. In the measurement, using three samples, an average value of the amount of Fe in the three samples was set to Fe % of the plating layers.

In addition, the microstructures of the cross sections of the plated steel sheets were observed. Using an optical microscope, a scanning type electron microscope, and a transmission type electron microscope as necessary, each phase of the microstructures was defined and the area fraction of each phase and the coarse grain area fraction (a fraction in which grains having a grain size of more than 35 μm per occupy unit area) were measured. Further, using a focused ion beam processing apparatus (FIB), the surfaces of the steel sheets in the thickness direction were processed into flakes so as to include the plating layers of the surfaces of the plated steel sheets, and then, oxides in the plating layers of the obtained flakes were observed by a field emission type transmission electron microscope (FE-TEM) to perform composition analysis (oxide identification) by an energy distributed X-ray detector (EDX). With the FE-TEM, five visual files were observed at a magnification of 10000 to 50000 times and the chemical composition (compound types) and the projection area fraction of the oxides were evaluated from data obtained by the FE-TEM and the EDX.

Next, in order to evaluate delayed fracture resistance, test pieces were prepared by a U bending test and were subjected to a delayed fracture resistance test by electrolytic charge. The delayed fracture resistance of the plated steel sheets obtained by using the above-described method was evaluated according to a method disclosed in "Materia (Bulletin of the Japan Institute of Metals) Vol. 44, No. 3 (2005), pp. 254 to 256".

Specifically, after the steel sheets were subjected to mechanical cutting, the cross sections were subjected to mechanical grinding, and then, the test pieces were subjected to the U bending test to have a 10R bend radius. A stain gauge was attached to the center of the surface of each obtained test piece, and the both ends of the test pieces were screwed by bolts to apply stress to the test pieces. The applied stress was calculated by the monitored stain gauge. The applied stress was 0.7 times of tensile strength TS (0.7×TS). For example, the applied stress is 700 MPa with respect to a 980 MPa class steel sheet, the applied stress is 840 MPa with respect to a 1180 MPa class steel sheet, and the applied stress is 925 MPa with respect to a 1320 MPa class steel sheet.

The reason for increasing the tensile strength TS as described above is that the residual stress introduced to a steel sheet during formation increases as the tensile strength TS of the steel sheet increases. Each of the obtained U bending test pieces was immersed into an ammonium thiocyanate aqueous solution and a current flowed to an electrolytic charging apparatus at a current density of 1.0 mA/cm$^2$ so that the steel sheet (U bending test piece) was used as a negative electrode and a platinum electrode was used as a positive electrode to conduct an electrolytic charge test for 2 hours.

The hydrogen generated in the electrolytic charge test penetrates into the steel sheet and may cause delayed fracture. After the electrolytic charge test, the test pieces were drawn up from the solution and the center area (bent area) of each U bending test piece was visually observed to inspect the presence of cracking. Since there is a large residual stress in the bent area, if cracks are generated in the bent area, a rapid progress is made. Therefore, when cracks are generated, there were large opening cracks in all the test pieces and the presence of cracks could be easily determined even visually.

Using a loupe and a stereomicroscope, the test pieces were carefully observed to the ends and the presence of cracks was confirmed again. When there were no opening cracks, it was also confirmed that there were no fine cracks.

Here, in the result of the delayed fracture test (delayed fracture resistance) shown in Tables 10 (the continuation of Table 9) and 13 (the continuation of Table 12), "Good" represents that cracks were not generated and "No Good" represents that cracks were generated.

Further, the plating properties (wettability) were evaluated using the stereomicroscope (at a magnification of 100 times). That is, the surface of each plated steel sheet (however, a region of 3/8 of the sheet width toward both edges from the central position of the sheet width) were observed at three view fields or more and the presence of non-plating (a defect that reaches the base material (steel sheet)) was confirmed. As a result, when the coverage of the plating layer is less than 99% (when a defect ratio is more than 1%), a large number of unplated area was present and thus, the wettability was evaluated as "No Good". In addition, when the coverage of the plating layer is 100%, the entire surface was plated and thus, the wettability was evaluated as "Good".

The measured microstructures were shown in Tables 8 and 11, the tensile properties were shown in Tables 9 (the continuation of Table 8) and 12 (the continuation of Table 11), and the delayed fracture resistance, plating properties, and Fe % in the plating layers are shown in Tables 10 and 13.

TABLE 8

| STEEL NO. | TEMPERED MARTENSITE (%) | FERRITE (%) | BAINITE (%) | MARTENSITE (%) | PEARLITE (%) | RESIDUAL AUSTENITE (%) | COARSE GRAIN AREA FRACTION (%) | |
|---|---|---|---|---|---|---|---|---|
| A-1 | 45 | 33 | 11 | 0 | 0 | 11 | 5 | EXAMPLE |
| A-2 | 9 | 39 | 35 | 7 | 0 | 10 | 11 | COMPARATIVE EXAMPLE |
| A-3 | 0 | 82 | 11 | 5 | 0 | 2 | 5 | COMPARATIVE EXAMPLE |
| A-4 | 0 | 63 | 10 | 17 | 4 | 6 | 5 | COMPARATIVE EXAMPLE |
| A-5 | 57 | 13 | 8 | 19 | 0 | 3 | 7 | COMPARATIVE EXAMPLE |
| A-6 | 0 | 35 | 8 | 49 | 5 | 3 | 5 | COMPARATIVE EXAMPLE |
| A-7 | 42 | 35 | 7 | 9 | 0 | 7 | 5 | COMPARATIVE EXAMPLE |
| A-8 | 11 | 31 | 48 | 0 | 0 | 10 | 5 | COMPARATIVE EXAMPLE |
| A-9 | 41 | 34 | 15 | 0 | 0 | 10 | 6 | EXAMPLE |
| A-10 | 0 | 34 | 39 | 13 | 0 | 14 | 6 | COMPARATIVE EXAMPLE |
| A-11 | 38 | 27 | 21 | 2 | 12 | 0 | 8 | COMPARATIVE EXAMPLE |
| A-12 | 0 | 52 | 20 | 23 | 0 | 5 | 7 | COMPARATIVE EXAMPLE |
| A-13 | 68 | 29 | 0 | 0 | 0 | 3 | 4 | COMPARATIVE EXAMPLE |
| B-1 | 48 | 30 | 13 | 0 | 0 | 9 | 6 | EXAMPLE |
| B-2 | 34 | 30 | 24 | 0 | 0 | 12 | 8 | EXAMPLE |
| B-3 | 0 | 100 | 0 | 0 | 0 | 0 | 5 | COMPARATIVE EXAMPLE |
| B-4 | 37 | 35 | 17 | 0 | 0 | 11 | 4 | COMPARATIVE EXAMPLE |
| B-5 | 42 | 30 | 16 | 0 | 0 | 12 | 3 | EXAMPLE |
| B-6 | 38 | 34 | 18 | 0 | 0 | 10 | 8 | COMPARATIVE EXAMPLE |
| B-7 | 0 | 69 | 16 | 12 | 0 | 3 | 5 | COMPARATIVE EXAMPLE |

TABLE 8-continued

| STEEL NO. | STRUCTURE VOLUME FRACTION (%) | | | | | | COARSE GRAIN AREA FRACTION (%) | |
|---|---|---|---|---|---|---|---|---|
| | TEMPERED MARTENSITE (%) | FERRITE (%) | BAINITE (%) | MARTENSITE (%) | PEARLITE (%) | RESIDUAL AUSTENITE (%) | | |
| C-1 | 37 | 39 | 11 | 0 | 0 | 13 | 5 | EXAMPLE |
| C-2 | 35 | 36 | 19 | 0 | 0 | 10 | 4 | EXAMPLE |
| C-3 | <u>0</u> | 72 | 9 | 13 | 0 | <u>6</u> | 6 | COMPARATIVE EXAMPLE |
| C-4 | <u>0</u> | 32 | 9 | 43 | 8 | 8 | 6 | COMPARATIVE EXAMPLE |
| D-1 | 35 | 37 | 15 | 0 | 0 | 13 | 6 | EXAMPLE |
| D-2 | 36 | 34 | 21 | 0 | 0 | 9 | 6 | EXAMPLE |
| E-1 | 37 | 39 | 11 | 0 | 0 | 13 | 7 | EXAMPLE |
| E-2 | 33 | 26 | 31 | 0 | 0 | 10 | 5 | EXAMPLE |
| E-3 | 34 | 30 | 27 | 0 | 0 | 9 | <u>11</u> | COMPARATIVE EXAMPLE |
| E-4 | 37 | 33 | 20 | 0 | 0 | 10 | 5 | EXAMPLE |
| F-1 | 35 | 30 | 17 | 7 | 0 | 11 | 4 | EXAMPLE |
| F-2 | 39 | 34 | 12 | 6 | 0 | 9 | 6 | EXAMPLE |
| G-1 | 35 | 35 | 21 | 0 | 0 | 9 | 6 | EXAMPLE |
| G-2 | 34 | 36 | 22 | 0 | 0 | 8 | 7 | EXAMPLE |
| G-3 | 35 | 39 | 2 | 17 | 0 | <u>7</u> | 5 | COMPARATIVE EXAMPLE |
| G-4 | 39 | 32 | 19 | 0 | 0 | 10 | 6 | EXAMPLE |
| H-1 | 35 | 29 | 24 | 0 | 0 | 12 | 6 | EXAMPLE |
| H-2 | 39 | 30 | 20 | 0 | 0 | 11 | 4 | EXAMPLE |
| I-1 | 40 | 34 | 16 | 0 | 0 | 10 | 6 | EXAMPLE |
| I-2 | 32 | 38 | 20 | 0 | 0 | 10 | 5 | EXAMPLE |
| I-3 | 36 | 34 | 21 | 0 | 0 | 9 | 5 | EXAMPLE |
| J-1 | 37 | 37 | 16 | 0 | 0 | 10 | 4 | EXAMPLE |

THE UNDERLINES INDICATE THAT THE VALUES DO NOT SATISFY THE CONDITIONS OF THE PRESENT INVENTION.

TABLE 9

| STEEL NO. | TENSILE PROPERTIES | | | | | | | |
|---|---|---|---|---|---|---|---|---|
| | YS (MPa) | TS (MPa) | El. (%) | λ (%) | TS × El. (MPa × %) | TS × λ (MPa × %) | YR (—) | |
| A-1 | 741 | 1021 | 23 | 64 | 23483 | 65344 | 0.73 | EXAMPLE |
| A-2 | 709 | 1033 | 22 | 32 | 22726 | 33056 | 0.69 | COMPARATIVE EXAMPLE |
| A-3 | 395 | <u>683</u> | 20 | 44 | 13660 | 30052 | 0.58 | COMPARATIVE EXAMPLE |
| A-4 | 425 | <u>769</u> | 22 | 38 | 16918 | 29222 | 0.55 | COMPARATIVE EXAMPLE |
| A-5 | 801 | 1099 | 12 | 53 | 13188 | 58247 | 0.73 | COMPARATIVE EXAMPLE |
| A-6 | 522 | 1311 | 8 | 9 | 10488 | 11799 | 0.40 | COMPARATIVE EXAMPLE |
| A-7 | 403 | 1001 | 11 | 52 | 11011 | 52052 | 0.40 | COMPARATIVE EXAMPLE |
| A-8 | 690 | 994 | 21 | 25 | 20874 | 24850 | 0.69 | COMPARATIVE EXAMPLE |
| A-9 | 671 | 981 | 23 | 52 | 22563 | 51012 | 0.68 | EXAMPLE |
| A-10 | 540 | 1012 | 23 | 19 | 23276 | 19228 | 0.53 | COMPARATIVE EXAMPLE |
| A-11 | 701 | <u>910</u> | 15 | 41 | 13650 | 37310 | 0.77 | COMPARATIVE EXAMPLE |
| A-12 | 487 | 981 | 16 | 14 | 15696 | 13734 | 0.50 | COMPARATIVE EXAMPLE |
| A-13 | 1021 | 1137 | 7 | 56 | 7959 | 63672 | 0.90 | COMPARATIVE EXAMPLE |
| B-1 | 803 | 997 | 19 | 54 | 18943 | 53838 | 0.81 | EXAMPLE |
| B-2 | 657 | 982 | 23 | 49 | 22586 | 48118 | 0.67 | EXAMPLE |
| B-3 | 545 | <u>682</u> | 22 | 55 | 15004 | 37510 | 0.80 | COMPARATIVE EXAMPLE |
| B-4 | 678 | 999 | 22 | 45 | 21978 | 44955 | 0.68 | COMPARATIVE EXAMPLE |
| B-5 | 706 | 1011 | 22 | 54 | 22242 | 54594 | 0.70 | EXAMPLE |
| B-6 | 680 | 1004 | 18 | 40 | 18072 | 40160 | 0.68 | COMPARATIVE EXAMPLE |
| B-7 | 549 | 1107 | 13 | 7 | 14391 | 7749 | 0.50 | COMPARATIVE EXAMPLE |
| C-1 | 724 | 1022 | 23 | 51 | 23506 | 52122 | 0.71 | EXAMPLE |
| C-2 | 709 | 992 | 21 | 46 | 20832 | 45632 | 0.71 | EXAMPLE |
| C-3 | 423 | <u>890</u> | 16 | 19 | 14240 | 16910 | 0.48 | COMPARATIVE EXAMPLE |
| C-4 | 639 | 1371 | 11 | 10 | 15081 | 13710 | 0.47 | COMPARATIVE EXAMPLE |
| D-1 | 701 | 1021 | 23 | 53 | 23483 | 54113 | 0.69 | EXAMPLE |
| D-2 | 669 | 1000 | 20 | 49 | 20000 | 49000 | 0.67 | EXAMPLE |
| E-1 | 703 | 1009 | 24 | 48 | 24216 | 48432 | 0.70 | EXAMPLE |
| E-2 | 831 | 1022 | 19 | 67 | 19418 | 68474 | 0.81 | EXAMPLE |
| E-3 | 723 | 1017 | 15 | 36 | 15255 | 36612 | 0.71 | COMPARATIVE EXAMPLE |
| E-4 | 693 | 1090 | 20 | 46 | 21800 | 50140 | 0.64 | EXAMPLE |
| F-1 | 721 | 1033 | 23 | 49 | 23759 | 50617 | 0.70 | EXAMPLE |
| F-2 | 698 | 999 | 21 | 44 | 20979 | 43956 | 0.70 | EXAMPLE |
| G-1 | 728 | 1019 | 19 | 51 | 19361 | 51969 | 0.71 | EXAMPLE |
| G-2 | 677 | 1088 | 20 | 44 | 21760 | 47872 | 0.62 | EXAMPLE |
| G-3 | 780 | 1188 | 12 | 33 | 14256 | 39204 | 0.66 | COMPARATIVE EXAMPLE |
| G-4 | 723 | 1024 | 20 | 46 | 20480 | 47104 | 0.71 | EXAMPLE |
| H-1 | 681 | 1060 | 21 | 48 | 22260 | 50880 | 0.64 | EXAMPLE |
| H-2 | 655 | 1025 | 20 | 47 | 20500 | 48175 | 0.64 | EXAMPLE |

TABLE 9-continued

| | TENSILE PROPERTIES | | | | | | | |
|---|---|---|---|---|---|---|---|---|
| STEEL NO. | YS (MPa) | TS (MPa) | El. (%) | λ (%) | TS × El. (MPa × %) | TS × λ (MPa × %) | YR (—) | |
| I-1 | 677 | 1029 | 22 | 55 | 22638 | 56595 | 0.66 | EXAMPLE |
| I-2 | 649 | 1051 | 19 | 51 | 19969 | 53601 | 0.62 | EXAMPLE |
| I-3 | 631 | 1073 | 19 | 46 | 20387 | 49358 | 0.59 | EXAMPLE |
| J-1 | 644 | 1099 | 18 | 46 | 19782 | 50554 | 0.59 | EXAMPLE |

THE UNDERLINES INDICATE THAT THE VALUES DO NOT SATISFY THE CONDITIONS OF THE PRESENT INVENTION.

TABLE 10

| | PLATING PROPERTIES | | DELAYED FRACTURE RESISTANCE | | | | |
|---|---|---|---|---|---|---|---|
| STEEL NO. | WETTABILITY | Fe CONCENTRATION IN PLATING (mass %) | OXIDE INCLUDED IN PLATING LAYER | PROJECTION AREA FRACTION (%) | DELAYED FRACTURE RESISTANCE | PRODUCT SHEET TYPE | |
| A-1 | Good | 3 | $SiO_2$, $Mn_2SiO_4$ | 45 | Good | GI | EXAMPLE |
| A-2 | Good | 3 | $SiO_2$, $Mn_2SiO_4$ | 38 | Good | GI | COMPARATIVE EXAMPLE |
| A-3 | Good | 4 | $SiO_2$, $Mn_2SiO_4$ | 40 | Good | GI | COMPARATIVE EXAMPLE |
| A-4 | Good | 4 | $SiO_2$, $Mn_2SiO_4$ | 44 | Good | GI | COMPARATIVE EXAMPLE |
| A-5 | Good | 2 | $SiO_2$, $Mn_2SiO_4$ | 50 | Good | GI | COMPARATIVE EXAMPLE |
| A-6 | Good | 3 | $SiO_2$, $Mn_2SiO_4$ | 38 | Good | GI | COMPARATIVE EXAMPLE |
| A-7 | Good | 4 | $SiO_2$ | 2 | No Good | GI | COMPARATIVE EXAMPLE |
| A-8 | No Good | 1 | $SiO_2$, $Mn_2SiO_4$ | 40 | Good | GI | COMPARATIVE EXAMPLE |
| A-9 | Good | 11 | $SiO_2$, $Mn_2SiO_4$ | 45 | Good | GA | EXAMPLE |
| A-10 | Good | 11 | $SiO_2$, $Mn_2SiO_4$ | 42 | Good | GA | COMPARATIVE EXAMPLE |
| A-11 | Good | 18 | $SiO_2$, $Mn_2SiO_4$ | 4 | No Good | GA | COMPARATIVE EXAMPLE |
| A-12 | Good | 10 | $SiO_2$, $Mn_2SiO_4$ | 77 | Good | GA | COMPARATIVE EXAMPLE |
| A-13 | Good | 11 | $SiO_2$, $Mn_2SiO_4$ | 68 | Good | GA | COMPARATIVE EXAMPLE |
| B-1 | Good | 3 | $SiO_2$, $Mn_2SiO_4$, $Al_2O_3$ | 24 | Good | GI | EXAMPLE |
| B-2 | Good | 3 | $SiO_2$, $Mn_2SiO_4$, $Al_2O_3$ | 45 | Good | GI | EXAMPLE |
| B-3 | Good | 3 | $SiO_2$, $Mn_2SiO_4$, $Al_2O_3$ | 49 | Good | GI | COMPARATIVE EXAMPLE |
| B-4 | No Good | 2 | $SiO_2$, $Mn_2SiO_4$, $Al_2O_3$ | 38 | Good | GI | COMPARATIVE EXAMPLE |
| B-5 | Good | 10 | $SiO_2$, $Mn_2SiO_4$, $Al_2O_3$ | 53 | Good | GA | EXAMPLE |
| B-6 | Good | 12 | $SiO_2$, $Mn_2SiO_4$, $Al_2O_3$ | 3 | No Good | GA | COMPARATIVE EXAMPLE |
| B-7 | Good | 13 | $SiO_2$, $Mn_2SiO_4$, $Al_2O_3$ | 60 | Good | GA | COMPARATIVE EXAMPLE |
| C-1 | Good | 4 | $Mn_2SiO_4$, $Al_2O_3$ | 42 | Good | GI | EXAMPLE |
| C-2 | Good | 11 | $Mn_2SiO_4$, $Al_2O_3$ | 40 | Good | GA | EXAMPLE |
| C-3 | Good | 3 | $Mn_2SiO_4$, $Al_2O_3$ | 42 | Good | GI | COMPARATIVE EXAMPLE |
| C-4 | Good | 3 | $Mn_2SiO_4$, $Al_2O_3$ | 6 | No Good | GI | COMPARATIVE EXAMPLE |
| D-1 | Good | 5 | $Mn_2SiO_4$ | 48 | Good | GI | EXAMPLE |
| D-2 | Good | 12 | $Mn_2SiO_4$ | 52 | Good | GI | EXAMPLE |
| E-1 | Good | 4 | $SiO_2$, $Mn_2SiO_4$ | 45 | Good | GI | EXAMPLE |
| E-2 | Good | 2 | $SiO_2$, $Mn_2SiO_4$ | 38 | Good | GI | EXAMPLE |
| E-3 | Good | 3 | $SiO_2$, $Mn_2SiO_4$ | 3 | No Good | GI | COMPARATIVE EXAMPLE |
| E-4 | Good | 3 | $SiO_2$, $Mn_2SiO_4$ | 27 | Good | GA | EXAMPLE |
| F-1 | Good | 2 | $SiO_2$, $Mn_2SiO_4$ | 44 | Good | GI | EXAMPLE |
| F-2 | Good | 12 | $SiO_2$, $Mn_2SiO_4$ | 37 | Good | GA | EXAMPLE |
| G-1 | Good | 4 | $SiO_2$, $Mn_2SiO_4$ | 56 | Good | GI | EXAMPLE |
| G-2 | Good | 2 | $SiO_2$, $Mn_2SiO_4$ | 39 | Good | GI | EXAMPLE |
| G-3 | Good | 2 | $SiO_2$, $Mn_2SiO_4$ | 40 | Good | GI | COMPARATIVE EXAMPLE |
| G-4 | Good | 11 | $SiO_2$, $Mn_2SiO_4$ | 42 | Good | GA | EXAMPLE |
| H-1 | Good | 3 | $SiO_2$, $Mn_2SiO_4$ | 39 | Good | GI | EXAMPLE |

TABLE 10-continued

| STEEL NO. | PLATING PROPERTIES WETTABILITY | Fe CONCENTRATION IN PLATING (mass %) | OXIDE INCLUDED IN PLATING LAYER | DELAYED FRACTURE RESISTANCE PROJECTION AREA FRACTION (%) | DELAYED FRACTURE RESISTANCE | PRODUCT SHEET TYPE | |
|---|---|---|---|---|---|---|---|
| H-2 | Good | 13 | SiO$_2$, Mn$_2$SiO$_4$ | 40 | Good | GA | EXAMPLE |
| I-1 | Good | 4 | SiO$_2$, Mn$_2$SiO$_4$ | 42 | Good | GI | EXAMPLE |
| I-2 | Good | 1 | SiO$_2$, Mn$_2$SiO$_4$ | 38 | Good | GI | EXAMPLE |
| I-3 | Good | 3 | SiO$_2$, Mn$_2$SiO$_4$ | 30 | Good | GI | EXAMPLE |
| J-1 | Good | 2 | SiO$_2$, Mn$_2$SiO$_4$ | 65 | Good | GA | EXAMPLE |

THE UNDERLINES INDICATE THAT THE VALUES DO NOT SATISFY THE CONDITIONS OF THE PRESENT INVENTION.

TABLE 11

| STEEL NO. | STRUCTURE VOLUME FRACTION (%) | | | | | | COARSE GRAIN AREA FRACTION (%) | |
|---|---|---|---|---|---|---|---|---|
| | TEMPERED MARTENSITE (%) | FERRITE (%) | BAINITE (%) | MARTENSITE (%) | PEARLITE (%) | RESIDUAL AUSTENITE (%) | | |
| K-1 | 48 | 30 | 11 | 0 | 0 | 11 | 5 | EXAMPLE |
| K-2 | 30 | 36 | 22 | 0 | 0 | 12 | 5 | EXAMPLE |
| K-3 | 46 | 34 | 11 | 0 | 0 | 9 | 5 | EXAMPLE |
| K-4 | 46 | 19 | 21 | 4 | 0 | 10 | 5 | EXAMPLE |
| L-1 | 42 | 33 | 13 | 0 | 0 | 12 | 5 | EXAMPLE |
| L-2 | 33 | 37 | 20 | 0 | 0 | 10 | 4 | EXAMPLE |
| M-1 | 32 | 38 | 20 | 0 | 0 | 10 | 3 | EXAMPLE |
| M-2 | 32 | 42 | 15 | 0 | 0 | 11 | 5 | EXAMPLE |
| M-3 | 31 | 40 | 3 | 20 | 0 | <u>6</u> | 4 | COMPARATIVE EXAMPLE |
| N-1 | 42 | 30 | 16 | 0 | 0 | 12 | 6 | EXAMPLE |
| N-2 | 43 | 33 | 13 | 0 | 0 | 11 | 7 | EXAMPLE |
| O-1 | 45 | 37 | 7 | 0 | 0 | 11 | 4 | EXAMPLE |
| P-1 | 39 | 32 | 18 | 0 | 0 | 11 | 4 | EXAMPLE |
| Q-1 | 42 | 30 | 16 | 0 | 0 | 12 | 4 | EXAMPLE |
| R-1 | 40 | 36 | 12 | 0 | 0 | 12 | 5 | EXAMPLE |
| R-2 | 38 | 32 | 19 | 0 | 0 | 11 | 6 | EXAMPLE |
| R-3 | 40 | 30 | 21 | 0 | 0 | 9 | 4 | EXAMPLE |
| R-4 | 39 | 26 | 23 | 0 | 0 | 12 | <u>12</u> | COMPARATIVE EXAMPLE |
| R-5 | <u>0</u> | 100 | <u>0</u> | 0 | 0 | <u>0</u> | 7 | COMPARATIVE EXAMPLE |
| R-6 | 34 | 30 | 8 | 22 | 0 | <u>6</u> | 8 | COMPARATIVE EXAMPLE |
| R-7 | 31 | 32 | 4 | 29 | 0 | <u>4</u> | 6 | COMPARATIVE EXAMPLE |
| R-8 | 37 | 27 | 25 | 0 | 0 | 11 | 7 | COMPARATIVE EXAMPLE |
| S-1 | 43 | 30 | 19 | 0 | 0 | 8 | 5 | EXAMPLE |
| S-2 | 47 | 32 | 11 | 0 | 0 | 10 | 4 | EXAMPLE |
| T-1 | 44 | 33 | 11 | 0 | 0 | 12 | 6 | EXAMPLE |
| T-2 | 52 | 21 | 15 | 0 | 0 | 12 | 6 | EXAMPLE |
| T-3 | <u>0</u> | 100 | <u>0</u> | 0 | 0 | <u>0</u> | 5 | COMPARATIVE EXAMPLE |
| T-4 | 45 | 35 | 9 | 0 | 0 | 11 | 5 | EXAMPLE |
| T-5 | 44 | 33 | 9 | 0 | 0 | 14 | 4 | EXAMPLE |
| U-1 | 45 | 34 | 9 | 0 | 0 | 12 | 6 | EXAMPLE |
| U-2 | 42 | 32 | 15 | 0 | 0 | 11 | 5 | EXAMPLE |
| U-3 | 59 | 28 | 2 | 0 | 0 | 11 | 5 | EXAMPLE |
| U-4 | 42 | 36 | 11 | 0 | 0 | 11 | 6 | EXAMPLE |
| V-1 | 62 | 22 | 4 | 0 | 0 | 12 | 4 | EXAMPLE |
| V-2 | 56 | 28 | 5 | 0 | 0 | 11 | 5 | EXAMPLE |
| V-3 | 49 | 32 | 10 | 0 | 0 | 9 | 4 | EXAMPLE |
| V-4 | 32 | 35 | 25 | 0 | 0 | 8 | 6 | EXAMPLE |
| V-5 | 36 | 37 | 15 | 0 | 0 | 12 | 7 | EXAMPLE |
| V-6 | 59 | 24 | 7 | 0 | 0 | 10 | 5 | EXAMPLE |
| W-1 | <u>0</u> | 89 | 11 | 0 | 0 | <u>0</u> | 5 | COMPARATIVE EXAMPLE |
| X-1 | <u>20</u> | 46 | 25 | 0 | 7 | <u>2</u> | 4 | COMPARATIVE EXAMPLE |
| Y-1 | <u>21</u> | 59 | 8 | 0 | 0 | 12 | 3 | COMPARATIVE EXAMPLE |
| Z-1 | <u>0</u> | 78 | <u>0</u> | 0 | <u>22</u> | <u>0</u> | 5 | COMPARATIVE EXAMPLE |
| AA-1 | 67 | 12 | 16 | 2 | 0 | <u>3</u> | 5 | COMPARATIVE EXAMPLE |
| AB-1 | <u>21</u> | 15 | 7 | 38 | <u>11</u> | <u>8</u> | 5 | COMPARATIVE EXAMPLE |

THE UNDERLINES INDICATE THAT THE VALUES DO NOT SATISFY THE CONDITIONS OF THE PRESENT INVENTION.

TABLE 12

| | TENSILE PROPERTIES | | | | | | | |
|---|---|---|---|---|---|---|---|---|
| STEEL NO. | YS (MPa) | TS (MPa) | El. (%) | λ (%) | TS × El. (MPa × %) | TS × λ (MPa × %) | YR (—) | |
| K-1 | 698 | 1071 | 19 | 46 | 20349 | 49266 | 0.65 | EXAMPLE |
| K-2 | 881 | 1181 | 18 | 53 | 21258 | 62593 | 0.75 | EXAMPLE |
| K-3 | 711 | 1051 | 23 | 48 | 24173 | 50448 | 0.68 | EXAMPLE |
| K-4 | 700 | 1121 | 23 | 39 | 25783 | 43719 | 0.62 | EXAMPLE |
| L-1 | 758 | 1083 | 22 | 60 | 23826 | 64980 | 0.70 | EXAMPLE |
| L-2 | 799 | 1011 | 28 | 53 | 28308 | 53583 | 0.79 | EXAMPLE |
| M-1 | 811 | 1101 | 27 | 49 | 29727 | 53949 | 0.74 | EXAMPLE |
| M-2 | 786 | 1131 | 21 | 46 | 23751 | 52026 | 0.69 | EXAMPLE |
| M-3 | 728 | 1211 | 11 | 19 | 13321 | 23009 | 0.60 | COMPARATIVE EXAMPLE |
| N-1 | 703 | 1051 | 24 | 63 | 25224 | 66213 | 0.67 | EXAMPLE |
| N-2 | 703 | 1059 | 21 | 59 | 22239 | 62481 | 0.66 | EXAMPLE |
| O-1 | 681 | 1022 | 21 | 49 | 21462 | 50078 | 0.67 | EXAMPLE |
| P-1 | 983 | 1199 | 17 | 45 | 20383 | 53955 | 0.82 | EXAMPLE |
| Q-1 | 827 | 1051 | 24 | 61 | 25224 | 64111 | 0.79 | EXAMPLE |
| R-1 | 781 | 1055 | 24 | 56 | 25320 | 59080 | 0.74 | EXAMPLE |
| R-2 | 911 | 1193 | 22 | 55 | 26246 | 65615 | 0.76 | EXAMPLE |
| R-3 | 799 | 1181 | 18 | 55 | 21258 | 64955 | 0.68 | EXAMPLE |
| R-4 | 909 | 1091 | 19 | 16 | 20729 | 17456 | 0.83 | COMPARATIVE EXAMPLE |
| R-5 | 499 | <u>688</u> | 16 | 26 | 11008 | 17888 | 0.73 | COMPARATIVE EXAMPLE |
| R-6 | 527 | 1051 | 15 | 22 | 15765 | 23122 | 0.50 | COMPARATIVE EXAMPLE |
| R-7 | 581 | 1321 | 10 | 18 | 13210 | 23778 | 0.44 | COMPARATIVE EXAMPLE |
| R-8 | 931 | 1151 | 13 | 19 | 14963 | 21869 | 0.81 | COMPARATIVE EXAMPLE |
| S-1 | 694 | 1083 | 21 | 46 | 22743 | 49818 | 0.64 | EXAMPLE |
| S-2 | 707 | 1021 | 23 | 48 | 23483 | 49008 | 0.69 | EXAMPLE |
| T-1 | 879 | 1291 | 18 | 56 | 23238 | 72296 | 0.68 | EXAMPLE |
| T-2 | 910 | 1391 | 15 | 44 | 20865 | 61204 | 0.65 | EXAMPLE |
| T-3 | 608 | <u>783</u> | 17 | 32 | 13311 | 25056 | 0.78 | COMPARATIVE EXAMPLE |
| T-4 | 867 | 1211 | 16 | 42 | 19376 | 50862 | 0.72 | EXAMPLE |
| T-5 | 887 | 1234 | 18 | 44 | 22212 | 54296 | 0.72 | EXAMPLE |
| U-1 | 855 | 1183 | 21 | 47 | 24843 | 55601 | 0.72 | EXAMPLE |
| U-2 | 827 | 1277 | 17 | 46 | 21709 | 58742 | 0.65 | EXAMPLE |
| U-3 | 749 | 1211 | 19 | 43 | 23009 | 52073 | 0.62 | EXAMPLE |
| U-4 | 866 | 1251 | 21 | 46 | 26271 | 57546 | 0.69 | EXAMPLE |
| V-1 | 1053 | 1362 | 19 | 47 | 25878 | 64014 | 0.77 | EXAMPLE |
| V-2 | 946 | 1344 | 17 | 39 | 22848 | 52416 | 0.70 | EXAMPLE |
| V-3 | 887 | 1281 | 17 | 47 | 21777 | 60207 | 0.69 | EXAMPLE |
| V-4 | 964 | 1211 | 20 | 48 | 24220 | 58128 | 0.80 | EXAMPLE |
| V-5 | 948 | 1381 | 20 | 46 | 27620 | 63526 | 0.69 | EXAMPLE |
| V-6 | 1038 | 1349 | 17 | 47 | 22933 | 63403 | 0.77 | EXAMPLE |
| W-1 | 308 | <u>422</u> | 22 | 39 | 9284 | 16458 | 0.73 | COMPARATIVE EXAMPLE |
| X-1 | 411 | <u>899</u> | 17 | 26 | 15283 | 23374 | 0.46 | COMPARATIVE EXAMPLE |
| Y-1 | 785 | 1239 | 16 | 9 | 19824 | 11151 | 0.63 | COMPARATIVE EXAMPLE |
| Z-1 | 516 | <u>639</u> | 21 | 23 | 13419 | 14697 | 0.81 | COMPARATIVE EXAMPLE |
| AA-1 | 1024 | 1401 | 8 | 13 | 11208 | 18213 | 0.73 | COMPARATIVE EXAMPLE |
| AB-1 | 722 | 1488 | 7 | 9 | 10416 | 13392 | 0.49 | COMPARATIVE EXAMPLE |

THE UNDERLINES INDICATE THAT THE VALUES DO NOT SATISFY THE CONDITIONS OF THE PRESENT INVENTION.

TABLE 13

| | PLATING PROPERTIES | | DELAYED FRACTURE RESISTANCE | | | | |
|---|---|---|---|---|---|---|---|
| STEEL NO. | WET- TABILITY | Fe CONCENTRATION IN PLATING (mass %) | OXIDE INCLUDED IN PLATING LAYER | PROJECTION AREA FRACTION (%) | DELAYED FRACTURE RESISTANCE | PRODUCT SHEET TYPE | |
| K-1 | Good | 3 | $SiO_2$, $Mn_2SiO_4$ | 67 | Good | GI | EXAMPLE |
| K-2 | Good | 2 | $SiO_2$, $Mn_2SiO_4$ | 60 | Good | GI | EXAMPLE |
| K-3 | Good | 10 | $SiO_2$, $Mn_2SiO_4$ | 54 | Good | GA | EXAMPLE |
| K-4 | Good | 10 | $SiO_2$, $Mn_2SiO_4$ | 48 | Good | GA | EXAMPLE |
| L-1 | Good | 2 | $SiO_2$, $Mn_2SiO_4$ | 38 | Good | GI | EXAMPLE |
| L-2 | Good | 2 | $SiO_2$, $Mn_2SiO_4$ | 42 | Good | GI | EXAMPLE |
| M-1 | Good | 2 | $SiO_2$, $Mn_2SiO_4$ | 39 | Good | GI | EXAMPLE |
| M-2 | Good | 5 | $SiO_2$, $Mn_2SiO_4$ | 37 | Good | GI | EXAMPLE |
| M-3 | Good | 2 | $SiO_2$, $Mn_2SiO_4$ | <u>3</u> | No Good | GI | COMPARATIVE EXAMPLE |
| N-1 | Good | 3 | $SiO_2$, $Mn_2SiO_4$ | 56 | Good | GI | EXAMPLE |
| N-2 | Good | 12 | $SiO_2$, $Mn_2SiO_4$ | 52 | Good | GA | EXAMPLE |
| O-1 | Good | 11 | $SiO_2$, $Mn_2SiO_4$ | 50 | Good | GA | EXAMPLE |
| P-1 | Good | 2 | $SiO_2$, $Mn_2SiO_4$ | 46 | Good | GI | EXAMPLE |
| Q-1 | Good | 3 | $SiO_2$, $Mn_2SiO_4$ | 38 | Good | GI | EXAMPLE |
| R-1 | Good | 3 | $SiO_2$, $Mn_2SiO_4$ | 42 | Good | GI | EXAMPLE |

TABLE 13-continued

| STEEL NO. | PLATING PROPERTIES WET-TABILITY | Fe CONCENTRATION IN PLATING (mass %) | DELAYED FRACTURE RESISTANCE OXIDE INCLUDED IN PLATING LAYER | PROJECTION AREA FRACTION (%) | DELAYED FRACTURE RESISTANCE | PRODUCT SHEET TYPE | |
|---|---|---|---|---|---|---|---|
| R-2 | Good | 2 | $SiO_2$, $Mn_2SiO_4$ | 50 | Good | GI | EXAMPLE |
| R-3 | Good | 12 | $SiO_2$, $Mn_2SiO_4$ | 45 | Good | GA | EXAMPLE |
| R-4 | Good | 2 | $SiO_2$, $Mn_2SiO_4$ | 41 | Good | GI | COMPARATIVE EXAMPLE |
| R-5 | Good | 3 | $SiO_2$, $Mn_2SiO_4$ | 45 | Good | GI | COMPARATIVE EXAMPLE |
| R-6 | No Good | 3 | $SiO_2$, $Mn_2SiO_4$ | 2 | No Good | GI | COMPARATIVE EXAMPLE |
| R-7 | Good | 13 | $SiO_2$, $Mn_2SiO_4$ | 41 | Good | GA | COMPARATIVE EXAMPLE |
| R-8 | Good | 2 | $SiO_2$, $Mn_2SiO_4$ | 8 | No Good | GI | COMPARATIVE EXAMPLE |
| S-1 | Good | 4 | $Mn_2SiO_4$ | 44 | Good | GI | EXAMPLE |
| S-2 | Good | 3 | $Mn_2SiO_4$ | 42 | Good | GI | EXAMPLE |
| T-1 | Good | 2 | $SiO_2$, $Mn_2SiO_4$ | 45 | Good | GI | EXAMPLE |
| T-2 | Good | 2 | $SiO_2$, $Mn_2SiO_4$ | 33 | Good | GI | EXAMPLE |
| T-3 | Good | 5 | $SiO_2$, $Mn_2SiO_4$ | 4 | No Good | GI | COMPARATIVE EXAMPLE |
| T-4 | Good | 12 | $SiO_2$, $Mn_2SiO_4$ | 45 | Good | GA | EXAMPLE |
| T-5 | Good | 10 | $SiO_2$, $Mn_2SiO_4$ | 45 | Good | GA | EXAMPLE |
| U-1 | Good | 2 | $SiO_2$, $Mn_2SiO_4$ | 35 | Good | GI | EXAMPLE |
| U-2 | Good | 2 | $SiO_2$, $Mn_2SiO_4$ | 39 | Good | GI | EXAMPLE |
| U-3 | Good | 3 | $SiO_2$, $Mn_2SiO_4$ | 42 | Good | GI | EXAMPLE |
| U-4 | Good | 3 | $SiO_2$, $Mn_2SiO_4$ | 41 | Good | GI | EXAMPLE |
| V-1 | Good | 4 | $SiO_2$, $Mn_2SiO_4$ | 28 | Good | GI | EXAMPLE |
| V-2 | Good | 3 | $SiO_2$, $Mn_2SiO_4$ | 31 | Good | GI | EXAMPLE |
| V-3 | Good | 3 | $SiO_2$, $Mn_2SiO_4$ | 32 | Good | GI | EXAMPLE |
| V-4 | Good | 4 | $SiO_2$, $Mn_2SiO_4$ | 29 | Good | GI | EXAMPLE |
| V-5 | Good | 2 | $SiO_2$, $Mn_2SiO_4$ | 19 | Good | GI | EXAMPLE |
| V-6 | Good | 11 | $SiO_2$, $Mn_2SiO_4$ | 38 | Good | GA | EXAMPLE |
| W-1 | Good | 2 | $SiO_2$, $Mn_2SiO_4$ | 37 | Good | GI | COMPARATIVE EXAMPLE |
| X-1 | Good | 3 | $SiO_2$, $Mn_2SiO_4$ | 44 | Good | GI | COMPARATIVE EXAMPLE |
| Y-1 | No Good | 3 | $SiO_2$, $Mn_2SiO_4$ | 79 | No Good | GI | COMPARATIVE EXAMPLE |
| Z-1 | Good | 2 | $SiO_2$ | 59 | Good | GI | COMPARATIVE EXAMPLE |
| AA-1 | Good | 2 | — | 45 | No Good | GI | COMPARATIVE EXAMPLE |
| AB-1 | Good | 2 | $SiO_2$, $Mn_2SiO_4$ | 48 | Good | GI | COMPARATIVE EXAMPLE |

THE UNDERLINES INDICATE THAT THE VALUES DO NOT SATISFY THE CONDITIONS OF THE PRESENT INVENTION.

In all the steel Nos. A-1, A-9, B-1, B-2, B-5, C-1, C-2, D-1, D-2, E-1, E-2, E-4, F-1, F-2, G-1, G-2, G-4, H-1, H-2, I-1, I-2, I-3, J-1, K-1, K-2, K-3, K-4, L-1, L-2, M-1, M-2, N-1, N-2, O-1, P-1, Q-1, R-1, R-2, R-3, S-1, S-2, T-1, T-2, T-4, T-5, U-1, U-2, U-3, U-4, V-1, V-2, V-3, V-4, V-5, and V-6, the chemical composition, the microstructure, and the amount of Fe in the plating layer and the oxide were properly controlled and thus, the delayed fracture resistance, the formability, and the plating properties were excellent.

In the steel Nos. A-11, B-6, and E-3, the roll size in the cold rolling was more than 1400 mm. In addition, in the steel No. R-8, the cumulative rolling reduction in the cold rolling was less than 30%. Further, in the steel Nos. A-7, C-4, M-3, R-6, and T-3, during heating for annealing, the time when the temperature of the steel sheet was within the temperature range of 550° C. to 750° C. was limit shorter than 20 seconds. Therefore, in the steel Nos. A-7, A-11, B-6, C-4, E-3, M-3, R-6, R-8, and T-3, the projection area fraction of the oxides was less than 10%, and the delayed fracture resistance was not sufficient.

In the steel Nos. A-8, B-4, and R-6, the flow rate of the molten metal in the plating bath was slower than 10 m/min. Therefore, in these steel Nos. A-8, B-4, and R-6, non-plating caused by the oxides on the surface of the steel sheet occurred, and the appearance and the durability were deteriorated by this non-plating area (area which was not coated by the plating layer).

In the steel Nos. A-2, E-3, and R-4, since the coiling temperature was higher than 700° C., the microstructure of the hot-rolled steel sheet was a coarse ferrite-pearlite structure and each phase of the microstructure of the final steel sheet after the subsequent processes (for example, cold rolling, annealing, and galvanizing and alloying treatment) was coarsened (the coarse grain area fraction was more than 30%) to cause unevenness in the microstructure. Therefore, in these steel Nos. A-2, E-3, and R-4, at least one of elongation (TS×El) and hole expansibility (TS×λ) was not sufficient.

In the steel Nos. A-3, B-3, R-5, and T-3, since the annealing temperature was lower than 750° C., oxides remained in ferrite as they were, and the volume fractions of tempered martensite and austenite, and the total volume fraction of tempered martensite and bainite were not sufficient. Therefore, in the steel Nos. A-3, B-3, R-5, and T-3, the tensile strength (TS) was less than 980 MPa, and elongation (TS×El) and hole expansibility (TS×λ) were not sufficient.

In the steel Nos. A-4 and C-3, since the cooling stop temperature of the first step of cooling was lower than 500° C., ferrite was excessively formed, and the volume fractions of tempered martensite and austenite, and the total volume fraction of tempered martensite and bainite were not sufficient. Therefore, in the steel Nos. A-4 and C-3, the tensile strength (TS) was less than 980 MPa, and at least one of elongation (TS×El) and hole expansibility (TS×λ) was not sufficient.

In the steel Nos. A-12 and B-7, the average cooling rate of the second step of cooling was slower than 1° C./sec. Thus, due to the excessive formation of ferrite and the insufficient quenching of the steel sheet, the volume fractions of tempered martensite and austenite, and the total volume fraction of tempered martensite and bainite were not sufficient. Therefore, in the steel Nos. A-12 and B-7, elongation (TS×El) and hole expansibility (TS×λ) were not sufficient.

In the steel Nos. A-2, A-8, A-10, and C-4, since the cooling stop temperature of the second step of cooling was 350° C. or higher, the microstructure was not sufficiently quenched, and the volume fraction of tempered martensite was less than 30%. Therefore, in the steel Nos. A-2, A-8, A-10 and C-4, at least one of elongation (TS×El) and hole expansibility (TS×λ) was not sufficient.

In the steel No. A-13, since the cooling stop temperature of the second step of cooling was lower than 100° C., most of austenite was transformed into martensite, and the volume fraction of austenite was less than 8%. Therefore, in this steel No. A-13, elongation (TS×El) was not sufficient.

In the steel No. A-11, since the alloying temperature after plating was higher than 600° C., pearlite was formed. As a result, the volume fraction of pearlite was more than 10%, and the volume fraction of austenite was less than 8%. Therefore, in the steel No. A-11, the tensile strength (TS) was less than 980 MPa, and elongation (TS×El) and hole expansibility (TS×λ) were not sufficient.

In the steel Nos. A-5, A-6, A-7, C-4, G-3, M-3, R-6, and R-7, the time when the temperature of the steel sheet was within a temperature range of 350° C. to 500° C. was shorter than 20 seconds until the final product was obtained after control cooling (after the second step of cooling). Therefore, in the steel Nos. A-5 and G-3, even though the steel sheet was held at less than 350° C., austenite was not sufficiently stabilized, and the volume fraction of austenite was less than 8%. In addition, in the steel Nos. A-6, in spite that the steel sheet was held at higher than 500° C., bainite transformation was not sufficiently progressed, and the volume fraction of martensite was increased. As a result, the volume fractions of tempered martensite and austenite, and the total volume fraction of tempered martensite and bainite were not sufficient. In the steel No. C-4, since the steel sheet was held immediately after the second step of cooling, the volume fraction of tempered martensite was less than 30% for the above-described reasons. In the steel Nos. A-7, M-3, and R-6, the steel sheet was held within a temperature range of 350° C. to 500° C., but the time when the temperature of the steel sheet was within a temperature range of 350° C. to 500° C. was not able to be sufficiently secured. In the steel No. R-7, the steel sheet was not held, and the time when the temperature of the steel sheet was within a temperature range of 350° C. to 500° C. was not able to be sufficiently secured. Therefore, in the steel Nos. A-7, M-3, R-6, and R-7, austenite was not sufficiently stabilized, and the volume fraction of austenite was less than 8%. Accordingly, in the steel Nos. A-5, A-6, A-7, C-4, G-3, M-3, R-6, and R-7, at least one of elongation (TS×El) and hole expansibility (TS×λ) was not sufficient.

In the steel No. W-1, the amount of C in the steel was less than 0.05%. In the steel No. X-1, the amount of Si in the steel was less than 0.5%. Therefore, in these steel Nos. W-1 and X-1, hardenability and stability of austenite (in the case of Si, concentration of C in austenite caused by the formation of ferrite) were not sufficient, and the volume fractions of tempered martensite and austenite, and the total volume fraction of tempered martensite and bainite were not sufficient. As a result, in the steel Nos. W-1 and X-1, the tensile strength (TS) was less than 980 MPa, and elongation (TS×El) and hole expansibility (TS×λ) were not sufficient.

In the steel No. Y-1, since the amount of Si in the steel was more than 3%, ferrite was stabilized and thus excessively formed, the volume fraction of tempered martensite was less than 30%, and the total volume fraction of tempered martensite and bainite was less than 40%. Therefore, in the steel No. Y-1, hole expansibility (TS×λ) was not sufficient. In addition, in the steel No. Y-1, since the amount of oxides on the surface of the steel sheet was increased, non-plating occurred, and delayed fracture resistance was not sufficient.

In the steel No. Z-1, since the amount of Mn in the steel was less than 1.5%, ferrite was excessively formed due to deterioration in hardenability, and the volume fractions of tempered martensite and austenite, and the total volume fraction of tempered martensite and bainite were not sufficient. As a result, in the steel No. Z-1, the tensile strength (TS) was less than 980 MPa, and elongation (TS×El) and hole expansibility (TS×λ) were not sufficient. In addition, in the steel No. Z-1, since the formation of pearlite was able to be suppressed by Mn, the volume fraction of pearlite was more than 10%.

In the steel No. AA-1, since the amount of Mn in the steel was more than 3%, hardenability was excessively increased, and thus most of austenite was transformed into martensite after the second step of cooling. Therefore, in this steel No. AA-1, the volume fraction of austenite was less than 8%, and elongation (TS×El) and hole expansibility (TS×λ) were not sufficient.

In the steel No. AB-1, since the amount of C in the steel was more than 0.4%, the volume fraction of cementite was more than 10%. In addition, in this steel No. AB since hardenability was excessively increased, the volume fraction of tempered martensite was less than 30%, and the total volume fraction of martensite and bainite was less than 40%. Therefore, in this steel No. AB-1, elongation (TS×El) and hole expansibility (TS×λ) were not sufficient.

The preferred examples of the present invention have been described above. However, the present invention is not limited to these examples. Additions, omissions, substitutions, and other modifications of a configuration can be made without departing the scope of the present invention. The present invention is not to be considered as being limited by the foregoing description, and is only limited by the scope of the appended claims.

INDUSTRIAL APPLICABILITY

As described above, according to the present invention, it is possible to provide the galvanized steel sheet (including the hot-dip galvanized steel sheet and the galvannealed steel sheet) which is suitable for structural members, reinforcing members, and suspension members for automobiles, has tensile strength of 980 MPa or more, and is excellent in delayed fracture resistance, plating adhesion, elongation, and hole expansibility at low cost. Therefore, since the present invention greatly contributes to a weight reduction of an automobile, industrial applicability is high.

The invention claimed is:
1. A galvanized steel sheet comprising:
   a steel sheet; and
   a plating layer on a surface of the steel sheet,
   wherein the steel sheet includes, as a steel chemical composition, by mass %,
      C: 0.05 to 0.40%,
      Si: 0.5 to 3.0%,
      Mn: 1.5 to 3.0%,
      P: limited to 0.04% or less,
      S: limited to 0.01% or less,
      N: limited to 0.01% or less,
      Al: limited to 2.0% or less,
      O: limited to 0.01% or less, and
      the balance of Fe and unavoidable impurities,
   wherein a microstructure of the steel sheet includes a ferrite, a bainite, and by volume fraction, 30% or more of a tempered martensite, 8% or more of an austenite, and limited to 10% or less of a pearlite, wherein a total volume fraction of the tempered martensite and the bainite is 40% or more, and an area fraction of grains having a grain size of more than 35 μm occupied per unit area of the microstructure is 10% or less, wherein a tensile strength of the steel sheet is 980 MPa or more, and wherein a plating metal in the plating layer includes, as a plating chemical composition, limited to 15 mass % or less of Fe, limited to 2 mass % or less of Al, and the balance of Zn and unavoidable impurities, the plating layer includes oxides including at least one chemical element selected from Si, Mn, and Al, and when seen at a cross section including the steel sheet and the plating layer in a thickness direction, a projection area fraction obtained by dividing a length that the oxides are projected onto an interface between the plating layer and the steel sheet by a length of the interface between the plating layer and the steel sheet is 10% to 67% and a coverage of the plating layer to the steel sheet is 99% or more, and wherein the projection area fraction is an average of values measured at five visual fields at a magnification of 10000 times.

2. The galvanized steel sheet according to claim 1, wherein the steel further includes, as the steel chemical composition, by mass %, at least one selected from Mo: 0.01 to 1.0%,
Cr: 0.05 to 1.0%,
Ni: 0.05 to 1.0%,
Cu: 0.05 to 1.0%,
Nb: 0.005 to 0.3%,
Ti: 0.005 to 0.3%,
V: 0.005 to 0.5%,
B: 0.0001 to 0.01%, and
a total of at least one of elements selected from Ca, Mg, and REM: 0.0005 to 0.04%.

3. The galvanized steel sheet according to claim 1, wherein the plating layer is a hot dip galvanized layer.

4. The galvanized steel sheet according to claim 1, wherein the plating layer is a galvannealed layer.

5. The galvanized steel sheet according to claim 1, wherein an amount of Fe is limited to less than 7 mass % in the plating chemical composition.

6. The galvanized steel sheet according to claim 1, wherein the plating chemical composition includes 7 mass % to 15 mass % of Fe.

7. The galvanized steel sheet according to claim 1, wherein the plating chemical composition includes more than 0 mass % and 2 mass % or less of Al.

8. A method of manufacturing the galvanized steel sheet of claim 1, the method comprising:

a first process of casting a steel which includes, as a steel chemical composition, by mass %,
C: 0.05 to 0.40%,
Si: 0.5 to 3.0%,
Mn: 1.5 to 3.0%,
P: limited to 0.04% or less,
S: limited to 0.01% or less,
N: limited to 0.01% or less,
Al: limited to 2.0% or less,
O: limited to 0.01% or less, and
the balance of Fe and unavoidable impurities;

a second process of heating the steel directly or after once cooled;

a third process of hot rolling the steel so that the hot rolling is completed at a temperature of an $Ar_3$ transformation point or higher;

a fourth process of coiling the steel at 300° C. to 700° C.;

a fifth process of pickling the steel;

a sixth process of cold rolling the steel by a cold rolling mill having a work roll with a roll size of 1,400 mm or less with a cumulative rolling reduction of 30% or more and less than 100%;

a seventh process of heating the steel and retaining the steel at 550° C. to 750° C. for 20 seconds or more;

an eighth process of annealing the steel at 750° C. to 900° C.;

a ninth process of cooling the steel to an intermediate cooling temperature in a temperature range of 500° C. or higher and lower than 750° C. at a first average cooling rate of 0.1° C./s to 30° C./s and cooling the steel from the intermediate cooling temperature to a cooling stop temperature of 100° C. or higher and lower than 350° C. at a second average cooling rate which is equal to or higher than the first average cooling rate;

a tenth process of controlling a temperature of the steel within a temperature range of a temperature, which is lower than a plating bath temperature by 40° C., or higher and a temperature, which is higher than the plating bath temperature by 40° C., or lower;

an eleventh process of galvanizing by immersing the steel into a hot dip galvanizing bath flowing at a flow rate of 10 m/min to 50 m/min; and a twelfth process of cooling the steel to a temperature of lower than 100° C.;

wherein the second average cooling rate is 1° C./s to 100° C./s, and a time when the temperature of the steel is within a temperature range of 350° C. to 500° C. is 20 seconds or more in the processes after the ninth process.

9. The method of manufacturing the galvanized steel sheet according to claim 8, wherein the steel further includes, as the steel chemical composition, by mass %, at least one selected from
Mo: 0.01 to 1.0%,
Cr: 0.05 to 1.0%,
Ni: 0.05 to 1.0%,
Cu: 0.05 to 1.0%,
Nb: 0.005 to 0.3%,
Ti: 0.005 to 0.3%,
V: 0.005 to 0.5%,
B: 0.0001 to 0.01%, and
a total of at least one of elements selected from Ca, Mg, and REM: 0.0005 to 0.04%.

10. The method of manufacturing the galvanized steel sheet according to claim 8, wherein, in the ninth process, when the first average cooling rate is equal to the second average cooling rate, the first average cooling rate is 1° C./s or more and 30° C./s or less.

11. The method of manufacturing the galvanized steel sheet according to claim 8, further comprising:

a process of reheating and holding the steel in the temperature range of 350° C. to 500° C. after the tenth process.

12. The method of manufacturing the galvanized steel sheet according to claim 8, further comprising:

a process of heating the steel to 460° C. to 600° C. so as to perform alloy treatment after the twelfth process.

13. The galvanized steel sheet according to claim 2, wherein the plating layer is a hot dip galvanized layer.

14. The galvanized steel sheet according to claim 2, wherein the plating layer is a galvannealed layer.

15. The galvanized steel sheet according to claim 2, wherein an amount of Fe is limited to less than 7 mass % in the plating chemical composition.

16. The galvanized steel sheet according to claim 2, wherein the plating chemical composition includes 7 mass % to 15 mass % of Fe.

17. The galvanized steel sheet according to claim 2, wherein the plating chemical composition includes more than 0 mass % and 2 mass % or less of Al.

18. The method of manufacturing the galvanized steel sheet according to claim 9, wherein, in the ninth process, when the first average cooling rate is equal to the second average cooling rate, the first average cooling rate is 1° C./s or more and 30° C./s or less.

19. The method of manufacturing the galvanized steel sheet according to claim 9, further comprising:
a process of reheating and holding the steel in the temperature range of 350° C. to 500° C. after the tenth process.

20. The method of manufacturing the galvanized steel sheet according to claim 9, further comprising:
a process of heating the steel to 460° C. to 600° C. so as to perform alloy treatment after the twelfth process.

* * * * *